(12) United States Patent
Hall

(10) Patent No.: US 8,245,619 B2
(45) Date of Patent: Aug. 21, 2012

(54) SHRAPNEL AND PROJECTILE CONTAINMENT SYSTEMS AND EQUIPMENT AND METHODS FOR PRODUCING SAME

(75) Inventor: Bruce Hall, Salisbury, MD (US)

(73) Assignee: Life Shield Engineered Systems, LLC, Fernley, NV (US)

( * ) Notice: Subject to any disclaimer, the term of this patent is extended or adjusted under 35 U.S.C. 154(b) by 665 days.

(21) Appl. No.: 11/289,511

(22) Filed: Nov. 30, 2005

(65) Prior Publication Data

US 2008/0092731 A1    Apr. 24, 2008

Related U.S. Application Data

(60) Provisional application No. 60/632,074, filed on Dec. 1, 2004, provisional application No. 60/642,991, filed on Jan. 12, 2005.

(51) Int. Cl.
*F41H 5/04* (2006.01)
(52) U.S. Cl. ........ 89/36.02; 89/36.04; 109/80; 52/309.1
(58) Field of Classification Search ................. 89/36.02, 89/36.04; 52/36.1, 309.1, 650, 250; 109/80
See application file for complete search history.

(56) References Cited

U.S. PATENT DOCUMENTS

| | | | |
|---|---|---|---|
| 230,228 A | 7/1880 | Boyd | |
| 1,444,405 A | 2/1923 | Wagemaker | |
| 1,990,656 A | 2/1935 | Kotrbaty | |
| 2,104,872 A | 1/1938 | Levy | |
| 2,235,001 A | 8/1938 | Allen | |
| 2,806,277 A | 5/1950 | Hand et al. | |
| 2,718,829 A | 9/1955 | Seymour et al. | |
| 3,029,172 A | 4/1962 | Glass | |
| 3,235,039 A | 2/1966 | O'Donnell | |
| 3,444,033 A * | 5/1969 | King | 428/49 |
| 3,522,140 A | 7/1970 | Hartzell et al. | |
| 3,648,615 A | 3/1972 | Wilkaitis | |
| 3,649,324 A | 3/1972 | Payne | |
| 3,703,201 A | 11/1972 | Musyt et al. | |
| 3,736,715 A | 6/1973 | Krumwiede | |
| 3,801,416 A | 4/1974 | Gulbierz | |
| 3,866,242 A | 2/1975 | Slagel | |

(Continued)

FOREIGN PATENT DOCUMENTS

FR    2 360 420 A1    3/1978
(Continued)

OTHER PUBLICATIONS

Chinese Examiner's First Report on Application No. 200480015725.2 mailed Nov. 9, 2007.

(Continued)

*Primary Examiner* — Benjamin P Lee
(74) *Attorney, Agent, or Firm* — Miles & Stockbridge P.C.; David R. Schaffer, Esq.

(57) ABSTRACT

A blast-resistant panel may include a layer of a pre-cured elastomeric material having a predetermined thickness, a body portion, and a plurality of flanges, each of the plurality of flanges having a substantially equal width and depending away from a same side and at approximately equivalent right angles to the body portion. The blast-resistant panel may also include a plurality of fastener elements for securing the cured elastomeric material layer to a surface of a structure through the plurality of flanges of cured elastomeric material.

49 Claims, 30 Drawing Sheets

U.S. PATENT DOCUMENTS

| | | | |
|---|---|---|---|
| 3,962,976 A * | 6/1976 | Kelsey | 109/82 |
| 4,062,347 A | 12/1977 | Jensen | |
| 4,104,842 A | 8/1978 | Rockstead et al. | |
| 4,125,984 A | 11/1978 | Jonas | |
| 4,139,591 A | 2/1979 | Jurisich | |
| 4,175,357 A | 11/1979 | Goldhaber | |
| 4,185,437 A | 1/1980 | Robinson | |
| 4,226,071 A | 10/1980 | Bennett | |
| 4,253,288 A * | 3/1981 | Chun | 52/454 |
| 4,269,004 A | 5/1981 | Schiebroek | |
| 4,297,820 A * | 11/1981 | Artzer | 52/309.11 |
| 4,416,096 A | 11/1983 | Schuster et al. | |
| 4,478,895 A * | 10/1984 | Makami et al. | 427/407.3 |
| 4,494,348 A * | 1/1985 | Kastelic | 52/588.1 |
| 4,498,941 A | 2/1985 | Goldsworthy et al. | |
| 4,505,208 A | 3/1985 | Goldman | |
| 4,558,552 A | 12/1985 | Reitter, II | |
| 4,562,666 A | 1/1986 | Young, III | |
| 4,616,456 A | 10/1986 | Parker | |
| 4,625,484 A | 12/1986 | Oboler | |
| 4,628,661 A | 12/1986 | St. Louis | |
| 4,640,074 A | 2/1987 | Paakkinen | |
| 4,646,498 A | 3/1987 | Schneller et al. | |
| 4,664,967 A | 5/1987 | Tasdemiroglu | |
| 4,730,023 A | 3/1988 | Sato et al. | |
| 4,731,972 A | 3/1988 | Anderson | |
| 4,732,803 A | 3/1988 | Smith, Jr. | |
| 4,780,351 A | 10/1988 | Czempoyesh | |
| 4,822,657 A * | 4/1989 | Simpson | 428/69 |
| 4,842,923 A * | 6/1989 | Hartman | 428/219 |
| 4,877,656 A * | 10/1989 | Baskin | 428/15 |
| 4,911,062 A | 3/1990 | Heyman | |
| 4,970,838 A * | 11/1990 | Phillips | 52/250 |
| 5,032,466 A * | 7/1991 | Cappa | 428/625 |
| 5,037,690 A | 8/1991 | van der Kooy | |
| 5,076,168 A | 12/1991 | Yoshida et al. | |
| 5,104,726 A | 4/1992 | Ross | |
| 5,124,195 A | 6/1992 | Harpell et al. | |
| 5,190,802 A | 3/1993 | Pilato | |
| 5,200,256 A * | 4/1993 | Dunbar | 428/212 |
| 5,242,207 A | 9/1993 | Carson et al. | |
| 5,249,534 A | 10/1993 | Sacks | |
| 5,316,839 A | 5/1994 | Kato et al. | |
| 5,347,775 A | 9/1994 | Santos | |
| 5,402,703 A * | 4/1995 | Drotleff | 89/36.02 |
| 5,447,765 A | 9/1995 | Crane et al. | |
| 5,463,929 A * | 11/1995 | Mejia | 89/36.02 |
| 5,480,955 A | 1/1996 | Primeaux, II | |
| 5,487,248 A * | 1/1996 | Artzer | 52/309.12 |
| 5,517,894 A | 5/1996 | Bohne et al. | |
| 5,522,194 A | 6/1996 | Graulich | |
| 5,524,412 A | 6/1996 | Corl | |
| 5,563,364 A | 10/1996 | Alhamad | |
| 5,576,511 A | 11/1996 | Alhamad | |
| 5,582,906 A | 12/1996 | Romesberg et al. | |
| 5,591,933 A | 1/1997 | Li et al. | |
| 5,647,180 A | 7/1997 | Billings et al. | |
| 5,649,398 A | 7/1997 | Isley, Jr. et al. | |
| 5,655,343 A * | 8/1997 | Seals | 52/217 |
| 5,681,408 A * | 10/1997 | Pate et al. | 156/71 |
| 5,681,612 A | 10/1997 | Benedict et al. | |
| 5,744,221 A | 4/1998 | Crane et al. | |
| 5,749,178 A | 5/1998 | Garmong | |
| 5,761,864 A | 6/1998 | Nonoshita | |
| 5,789,327 A | 8/1998 | Rousseau | |
| 5,811,719 A | 9/1998 | Madden, Jr. | |
| 5,813,174 A | 9/1998 | Waller | |
| 5,822,940 A | 10/1998 | Carlin et al. | |
| 5,833,782 A | 11/1998 | Crane et al. | |
| 5,937,595 A | 8/1999 | Miller | |
| 5,962,617 A | 10/1999 | Slagel | |
| 6,012,260 A | 1/2000 | Hendrick et al. | |
| 6,034,155 A | 3/2000 | Espeland et al. | |
| 6,099,768 A * | 8/2000 | Strickland et al. | 264/46.4 |
| 6,112,489 A * | 9/2000 | Zweig | 52/405.1 |
| 6,161,462 A | 12/2000 | Michaelson | |
| 6,176,920 B1 | 1/2001 | Murphy et al. | |
| 6,212,840 B1 | 4/2001 | Davidovitz | |
| 6,269,597 B1 * | 8/2001 | Haas | 52/203 |
| 6,298,607 B1 | 10/2001 | Mostaghel et al. | |
| 6,298,766 B1 | 10/2001 | Mor | |
| 6,298,882 B1 | 10/2001 | Hayes et al. | |
| 6,309,732 B1 | 10/2001 | Lopez-Anido et al. | |
| 6,314,858 B1 | 11/2001 | Strasser et al. | |
| 6,439,120 B1 | 8/2002 | Bureaux et al. | |
| 6,455,131 B2 | 9/2002 | Lopez-Anido et al. | |
| 6,460,304 B1 | 10/2002 | Kim | |
| 6,503,855 B1 | 1/2003 | Menzies et al. | |
| 6,524,679 B2 | 2/2003 | Hauber et al. | |
| 6,543,371 B1 | 4/2003 | Gardner | |
| 6,548,430 B1 | 4/2003 | Howland | |
| 6,703,104 B1 | 3/2004 | Neal | |
| 6,718,722 B2 | 4/2004 | Worrell et al. | |
| 6,745,535 B2 | 6/2004 | Nordgren et al. | |
| 6,806,212 B2 * | 10/2004 | Fyfe | 442/104 |
| 6,820,381 B1 | 11/2004 | Ballough | |
| 6,898,907 B2 | 5/2005 | Diamond | |
| 6,899,009 B2 * | 5/2005 | Christiansen et al. | 89/36.02 |
| 6,907,811 B2 | 6/2005 | White | |
| 6,927,183 B1 * | 8/2005 | Christen | 442/370 |
| 7,067,592 B2 | 6/2006 | Chino et al. | |
| 7,138,175 B2 | 11/2006 | Saito | |
| 7,148,313 B2 | 12/2006 | Koga et al. | |
| 7,189,456 B2 * | 3/2007 | King | 428/412 |
| 2002/0058450 A1 | 5/2002 | Yeshurun et al. | |
| 2002/0160144 A1 | 10/2002 | Higgins et al. | |
| 2002/0184841 A1 * | 12/2002 | Diamond | 52/203 |
| 2003/0003252 A1 | 1/2003 | Yun et al. | |
| 2003/0037586 A1 | 2/2003 | Durney | |
| 2003/0096072 A1 * | 5/2003 | Johnson | 428/36.91 |
| 2003/0104738 A1 | 6/2003 | Porter | |
| 2003/0129290 A1 | 7/2003 | Chiou | |
| 2003/0148681 A1 | 8/2003 | Fyfe | |
| 2003/0159390 A1 | 8/2003 | Fonseca | |
| 2003/0188498 A1 | 10/2003 | Lewkowitz | |
| 2003/0199215 A1 | 10/2003 | Bhatnagar et al. | |
| 2003/0233808 A1 | 12/2003 | Zuppan | |
| 2004/0123541 A1 | 7/2004 | Jewett | |
| 2004/0147191 A1 | 7/2004 | Wen | |
| 2004/0161989 A1 | 8/2004 | Dennis et al. | |
| 2004/0166755 A1 | 8/2004 | Bergmans et al. | |
| 2005/0262999 A1 * | 12/2005 | Tomczyk | 89/36.02 |
| 2006/0037463 A1 | 2/2006 | Vittoser et al. | |
| 2006/0048640 A1 | 3/2006 | Terry et al. | |
| 2006/0265985 A1 | 11/2006 | Nichols | |

FOREIGN PATENT DOCUMENTS

| | | |
|---|---|---|
| GB | 2007256 A | 5/1979 |
| GB | 1582539 A1 | 1/1981 |
| JP | 59-146847 | 8/1984 |
| JP | 62-273827 | 11/1987 |
| JP | 2-274534 | 11/1990 |
| JP | 406129137 | 10/1992 |
| JP | 6-129137 | 5/1994 |
| WO | WO 00/33015 B2 | 6/2000 |

OTHER PUBLICATIONS

Singapore Application/Patent No. 0506573-5—Australian Patent Office Written Opinion and Search Report mailed May 22, 2008.
Office Action in U.S. Appl. No. 10/510,691 dated Apr. 27, 2006.
Office Action in U.S. Appl. No. 10/510,691 dated Oct. 12, 2006.
Office Action in U.S. Appl. No. 10/510,691 dated Dec. 27, 2006.
Office Action in U.S. Appl. No. 10/510,691 dated Mar. 9, 2007.
Office Action in U.S. Appl. No. 10/510,691 dated Mar. 30, 2007.
Office Action in U.S. Appl. No. 10/510,691 dated Jun. 29, 2007.
Office Action in U.S. Appl. No. 11/264,752 dated Jul. 25, 2006.
Office Action in U.S. Appl. No. 11/264,752 dated Feb. 26, 2007.
Office Action in U.S. Appl. No. 11/264,752 dated Jun. 7, 2007.
Office Action in U.S. Appl. No. 11/264,752 dated Sep. 20, 2007.
International Search Report mailed Sep. 21, 2006 for International Application No. PCT/US05/39619.
Indian Patent Application No. 4877/DELNP/2005—First Examination Report mailed Jan. 7, 2008.
Singapore Application/Patent No. 0703931-6—Australian Patent Office Written Opinion mailed Aug. 28, 2008.

PCT/US05/42983 Written Opinion of the International Searching Authority and International Search Report mailed Sep. 13, 2007.
PCT/US05/39619 Written Opinion of the International Searching Authority mailed Sep. 21, 2006.
U.S. Appl. No. 11/264,752—Final Office Action mailed Dec. 22, 2008.
European Patent Application No. 05846915.6 (PCT/US2005/039619)—Extended European Search Report mailed Jan. 29, 2009.
Australian Patent Application No. 2004230631—Examiner's First Report mailed Jan. 30, 2009.
European Patent Application No. 04759137.5—Examination Report mailed Feb. 25, 2009.
Singapore Patent Application No. 200506573-5—Australian Patent Office Written Opinion mailed Feb. 26, 2009.
U.S. Appl. No. 10/510,691—Non-Final Office Action mailed Mar. 13, 2009.
Singapore Patent Application No. 200703931-6—Australian Examination Report mailed Jun. 2, 2009.
U.S. Appl. No. 11/264,752—Notice of Allowance mailed Apr. 20, 2009.
U.S. Appl. No. 10/510,691—Final Office Action dated Mar. 3, 2010.
Singapore Patent Application No. 200506573-5—Australian Patent Office Examination Report mailed by IPOS (Intellectual Property Office of Singapore) on Jan. 11, 2010.
Australian Patent Application No. 2005302160—Office Action (now abandoned) Examiner's First Report dated May 5, 2010.
European Patent Application No. 05858691.8—Office Action (now abandoned) Extended European Search Report dated Jan. 13, 2010.
U.S. Appl. No. 11/264,752—Notice of Allowance dated Oct. 27, 2009.
U.S. Appl. No. 12/711,501—Non-Final Office Action mailed Aug. 24, 2010.
U.S. Appl. No. 10/510,691—Final Office Action mailed Aug. 10, 2011.
U.S. Appl. No. 12/711,501—Final Office Action mailed May 12, 2011.

* cited by examiner

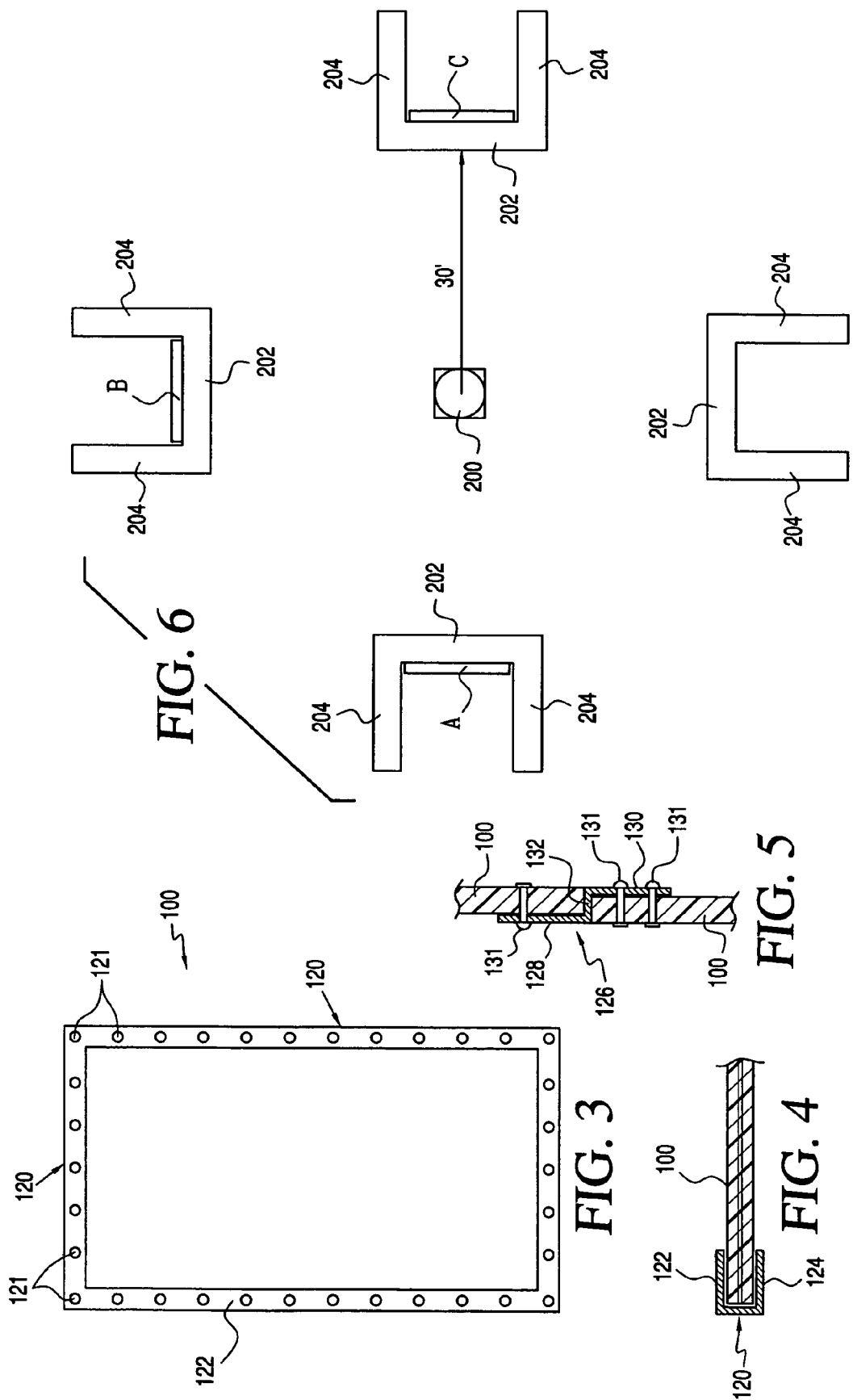

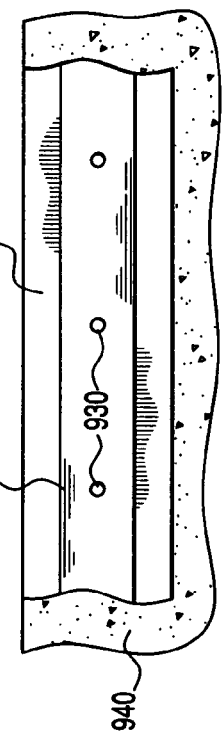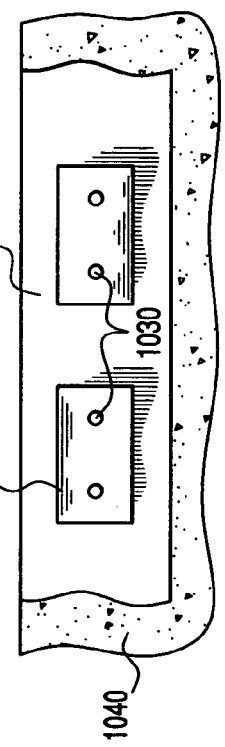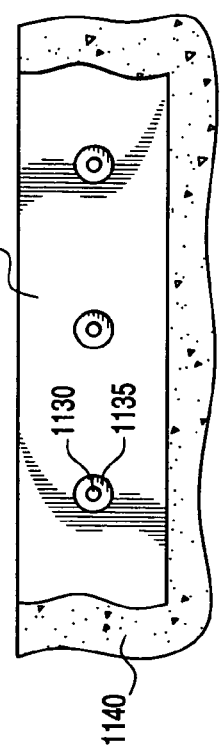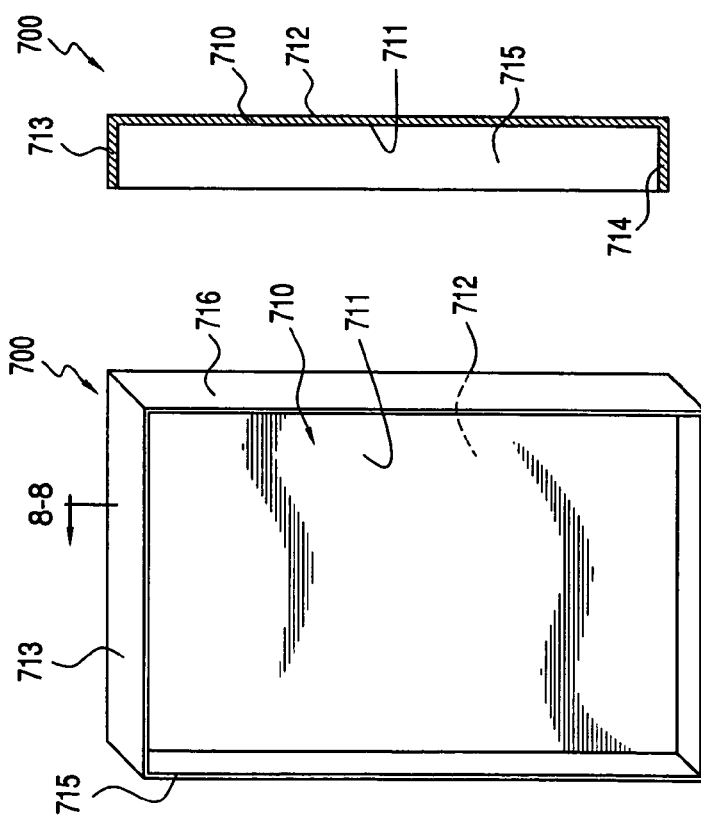

FIG. 13
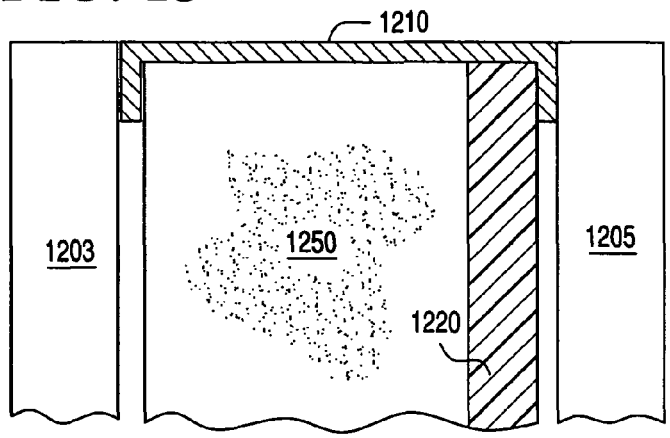
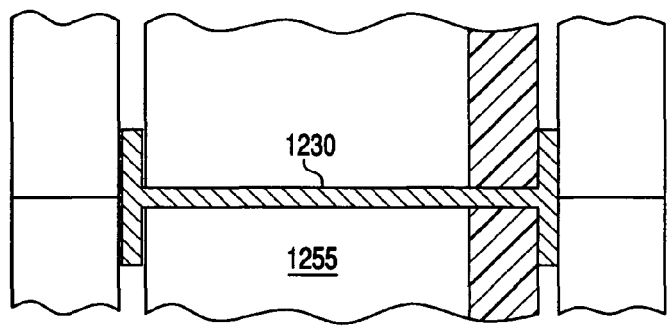
FIG. 14
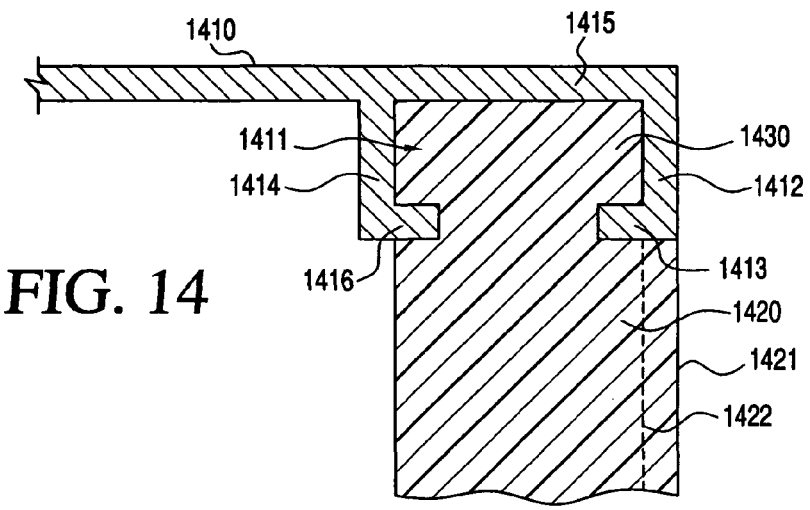
FIG. 15
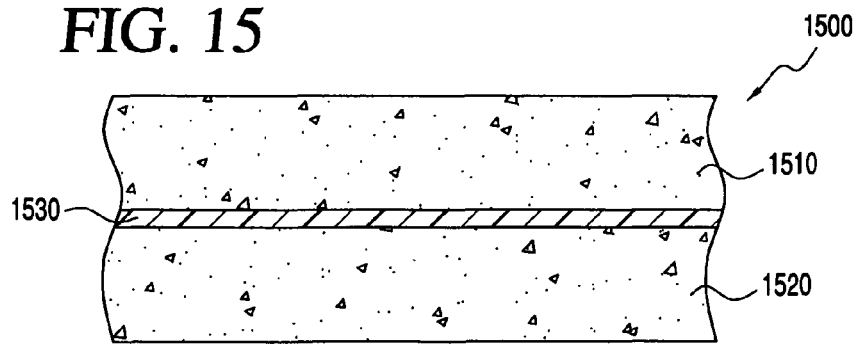

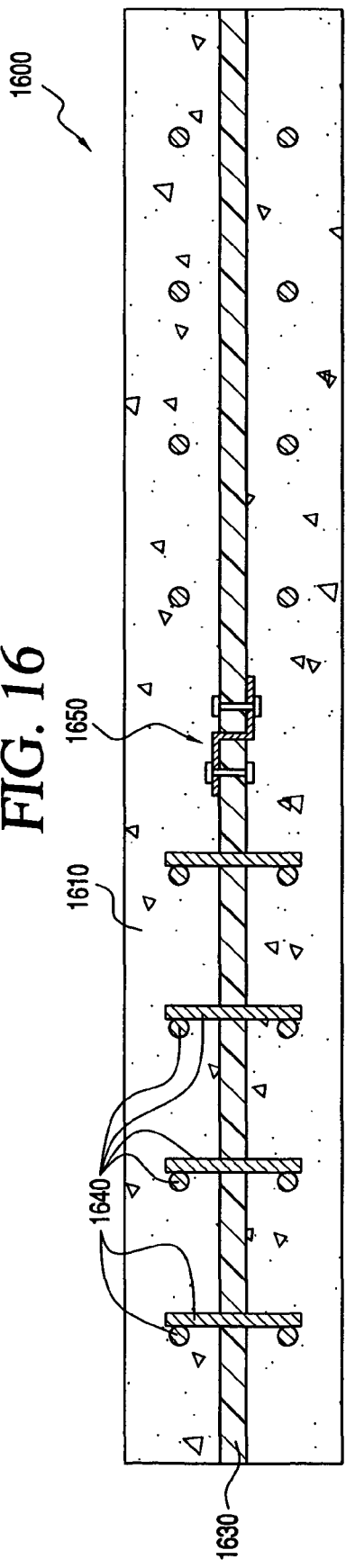
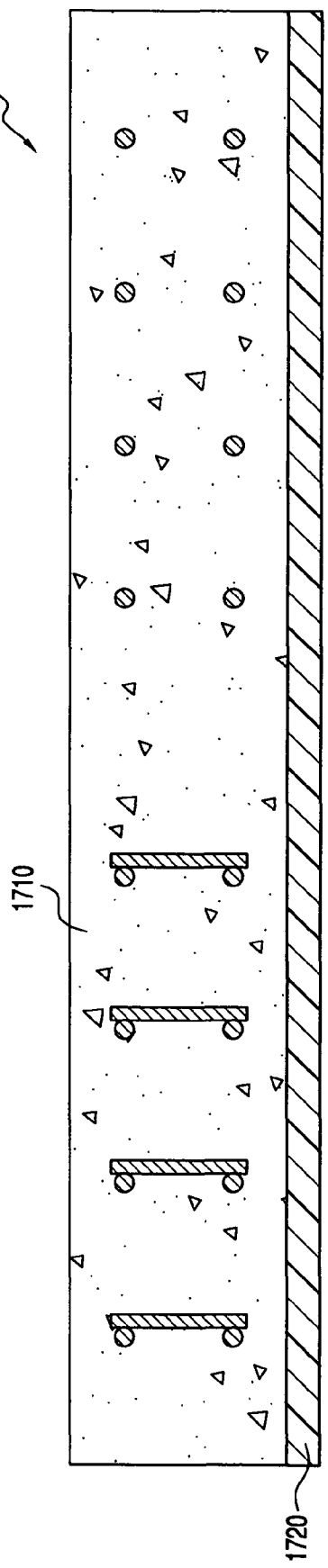

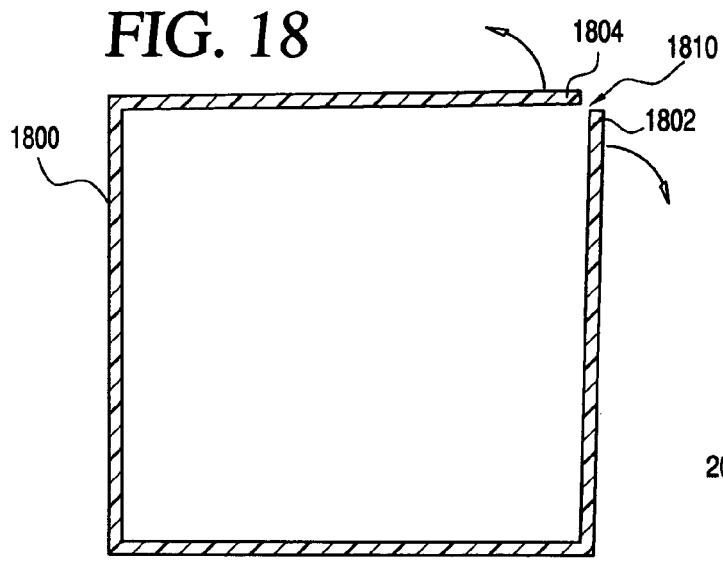
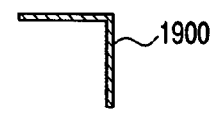
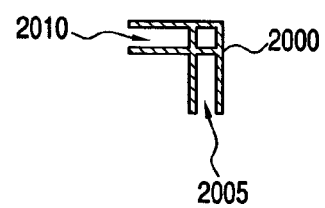
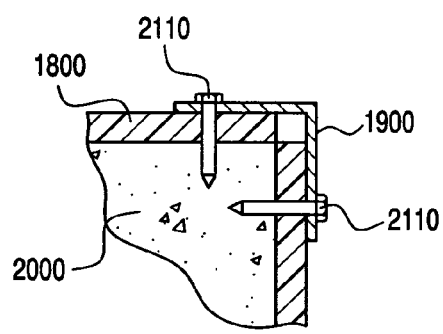
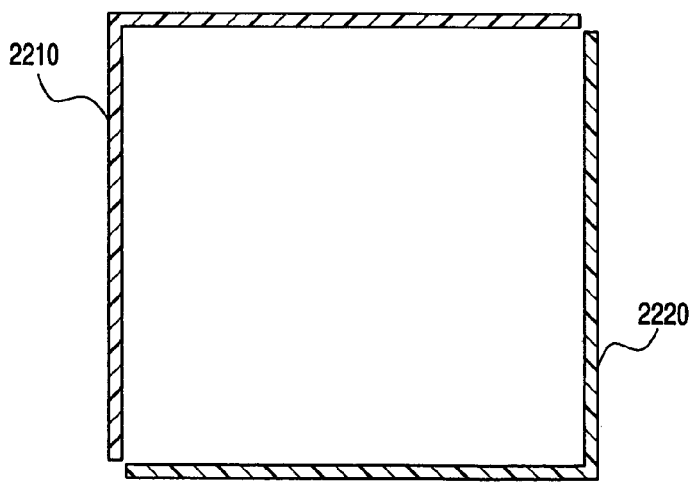
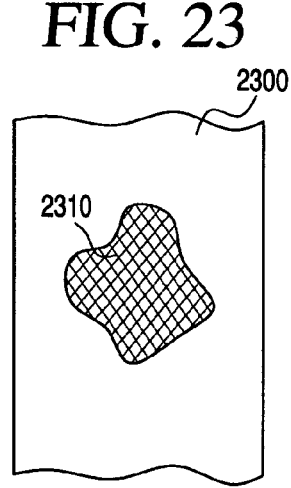

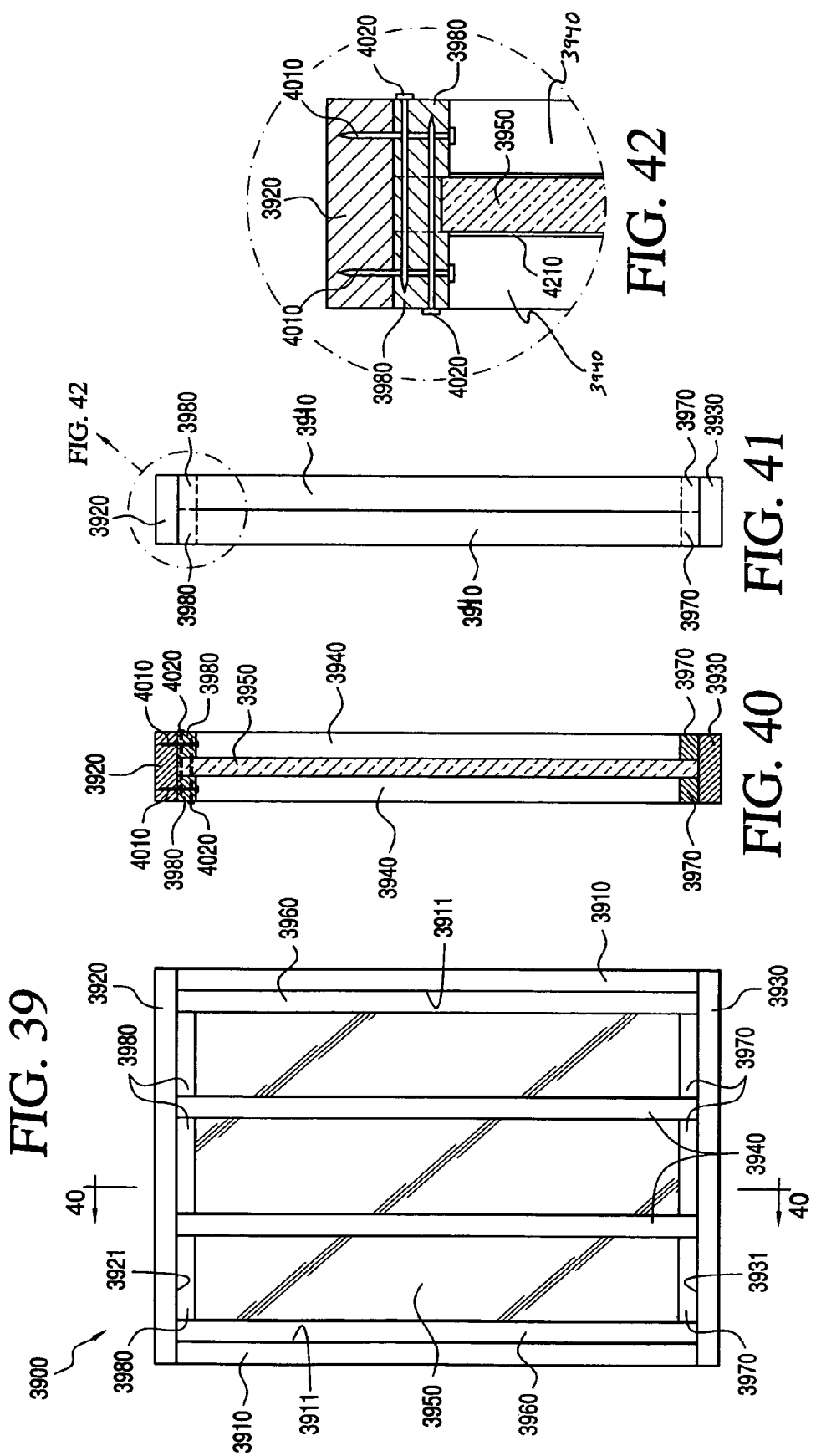

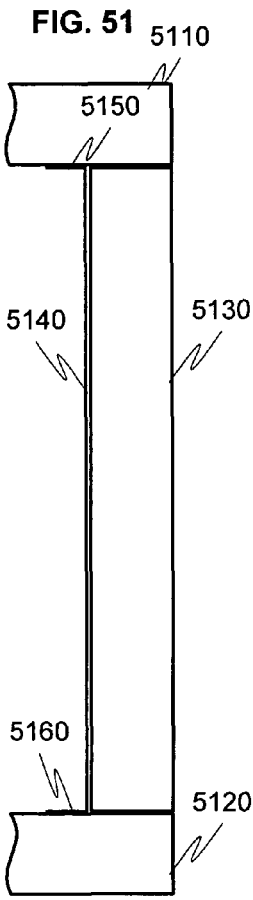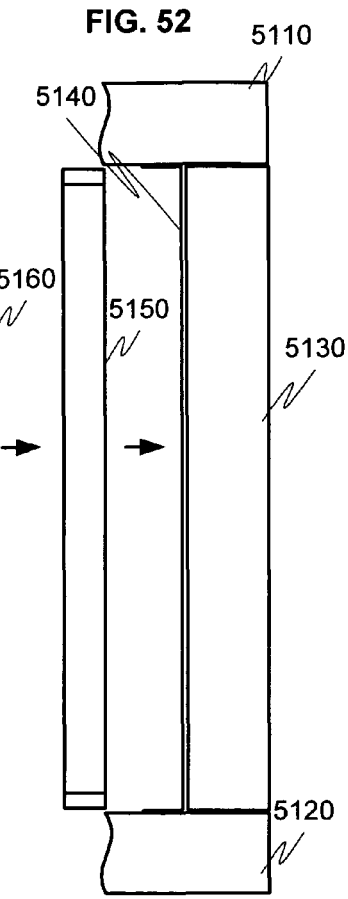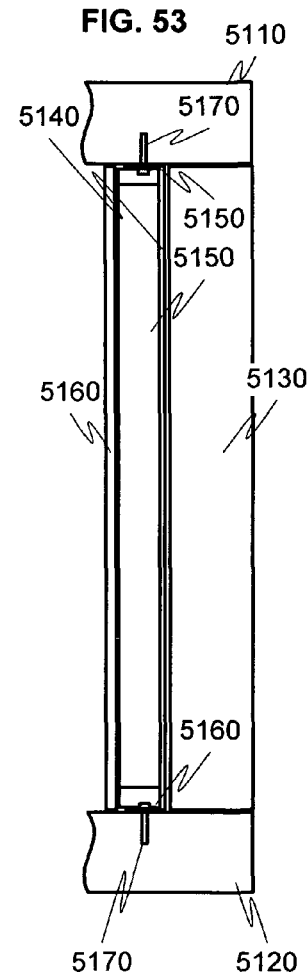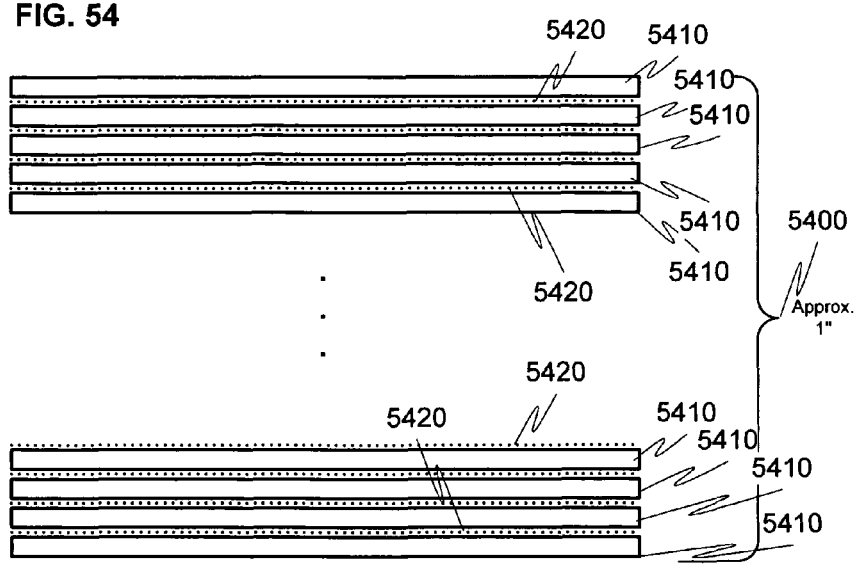

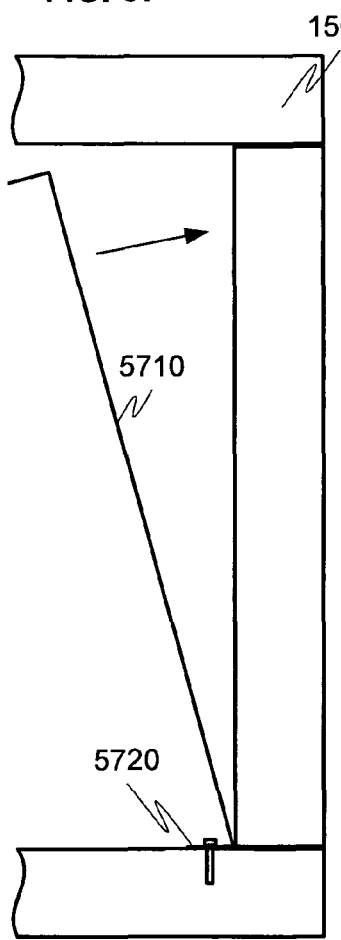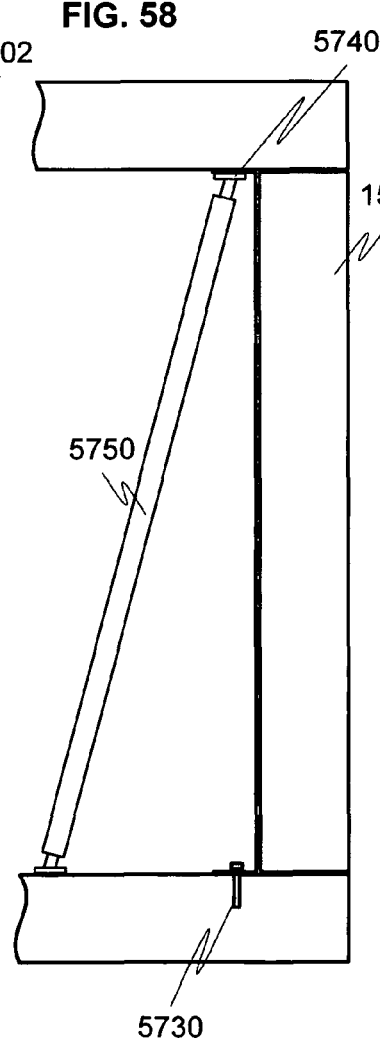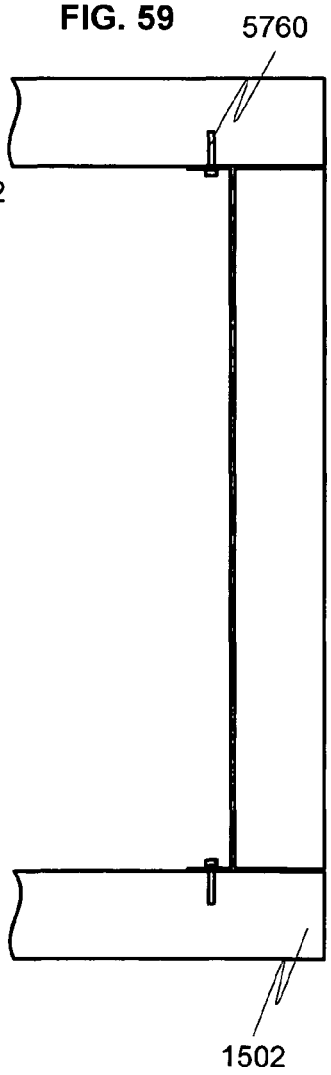

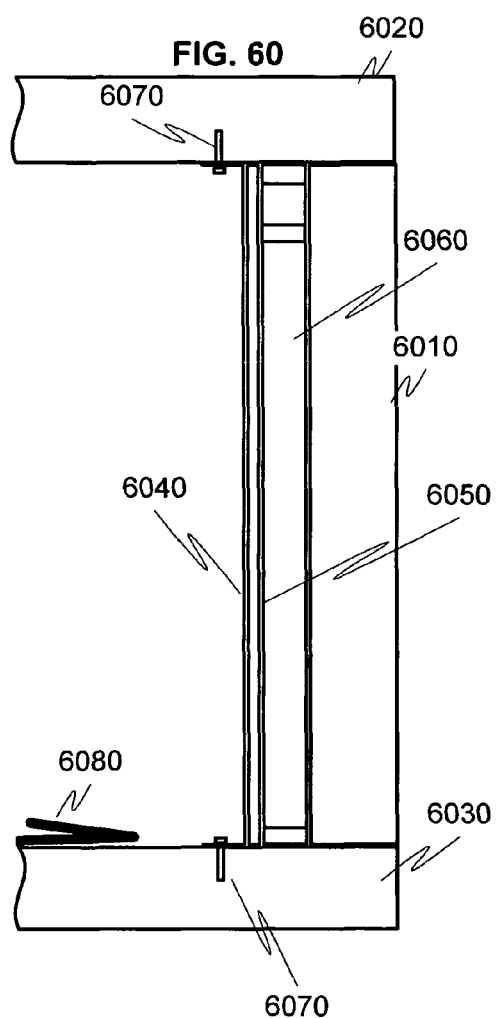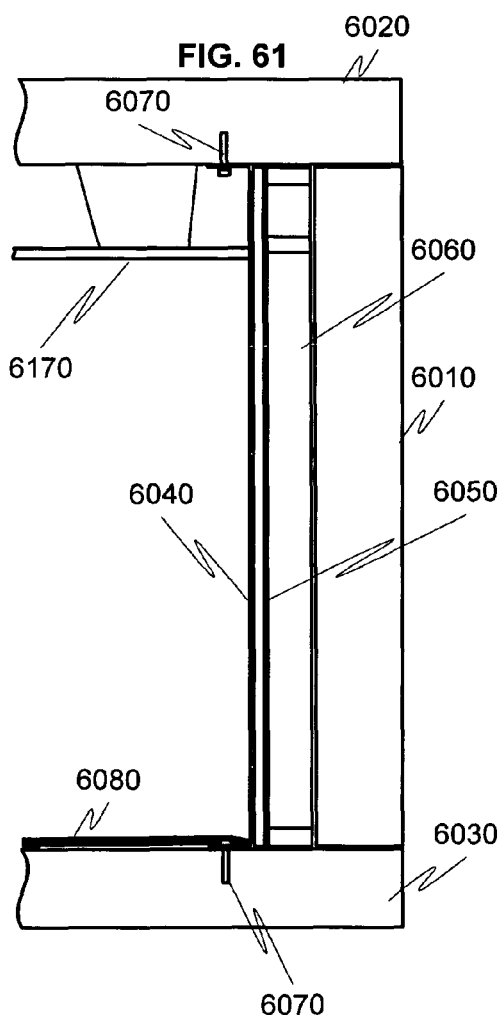

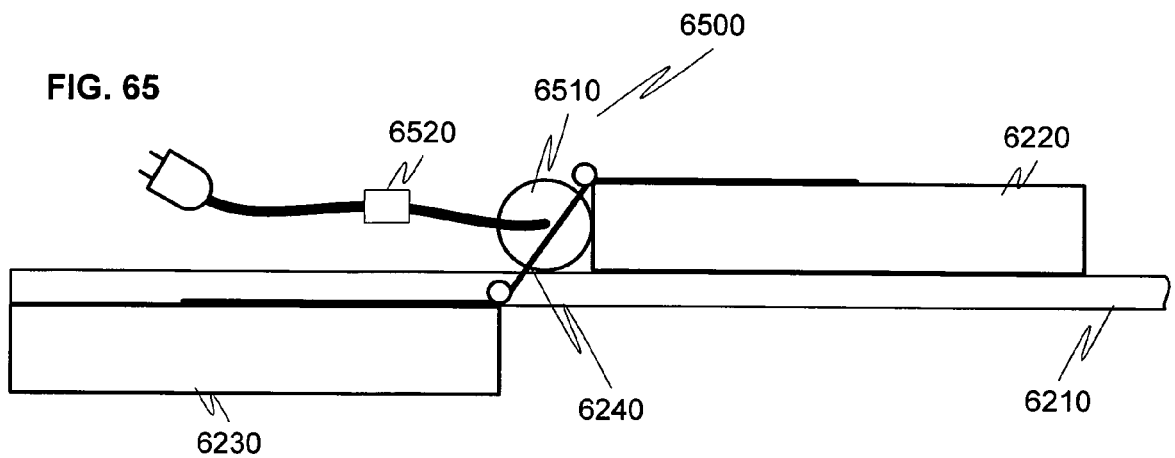
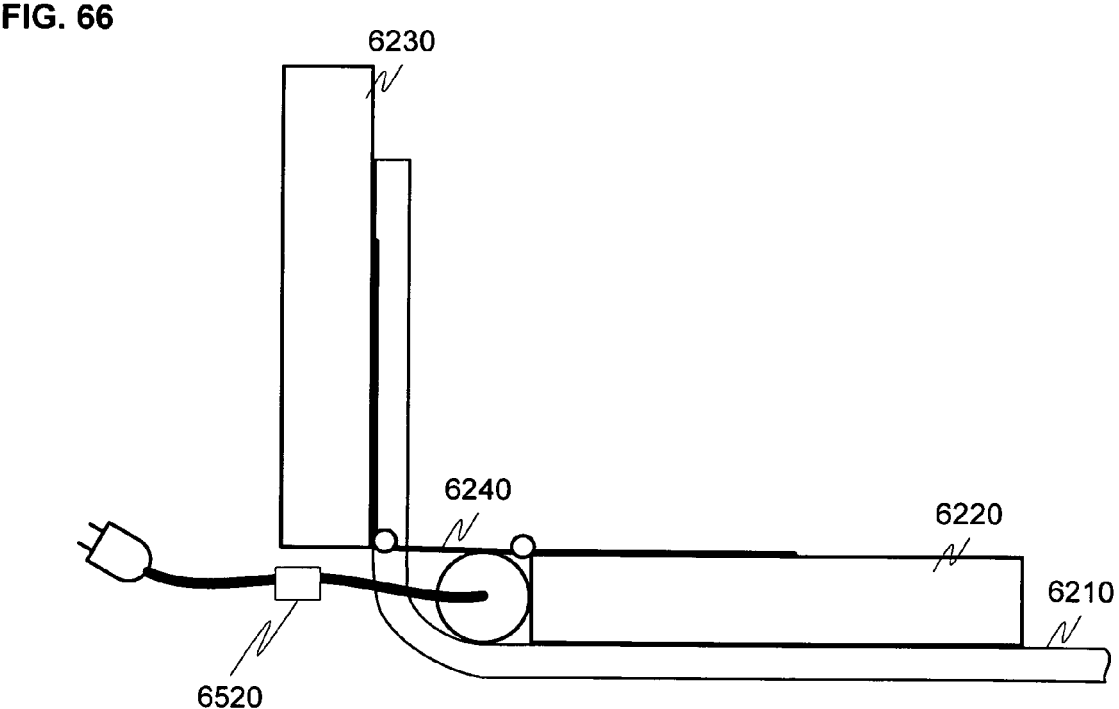

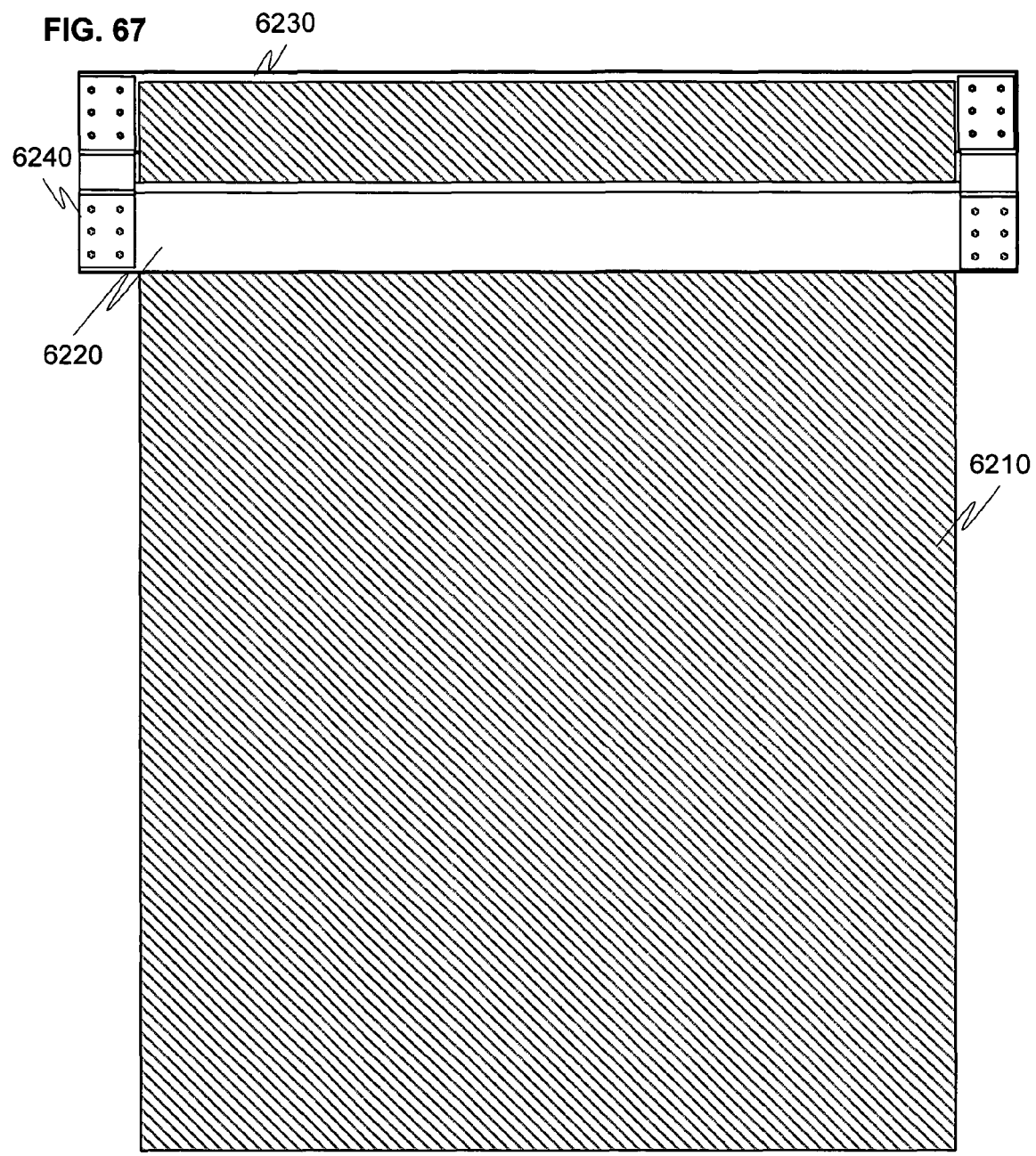

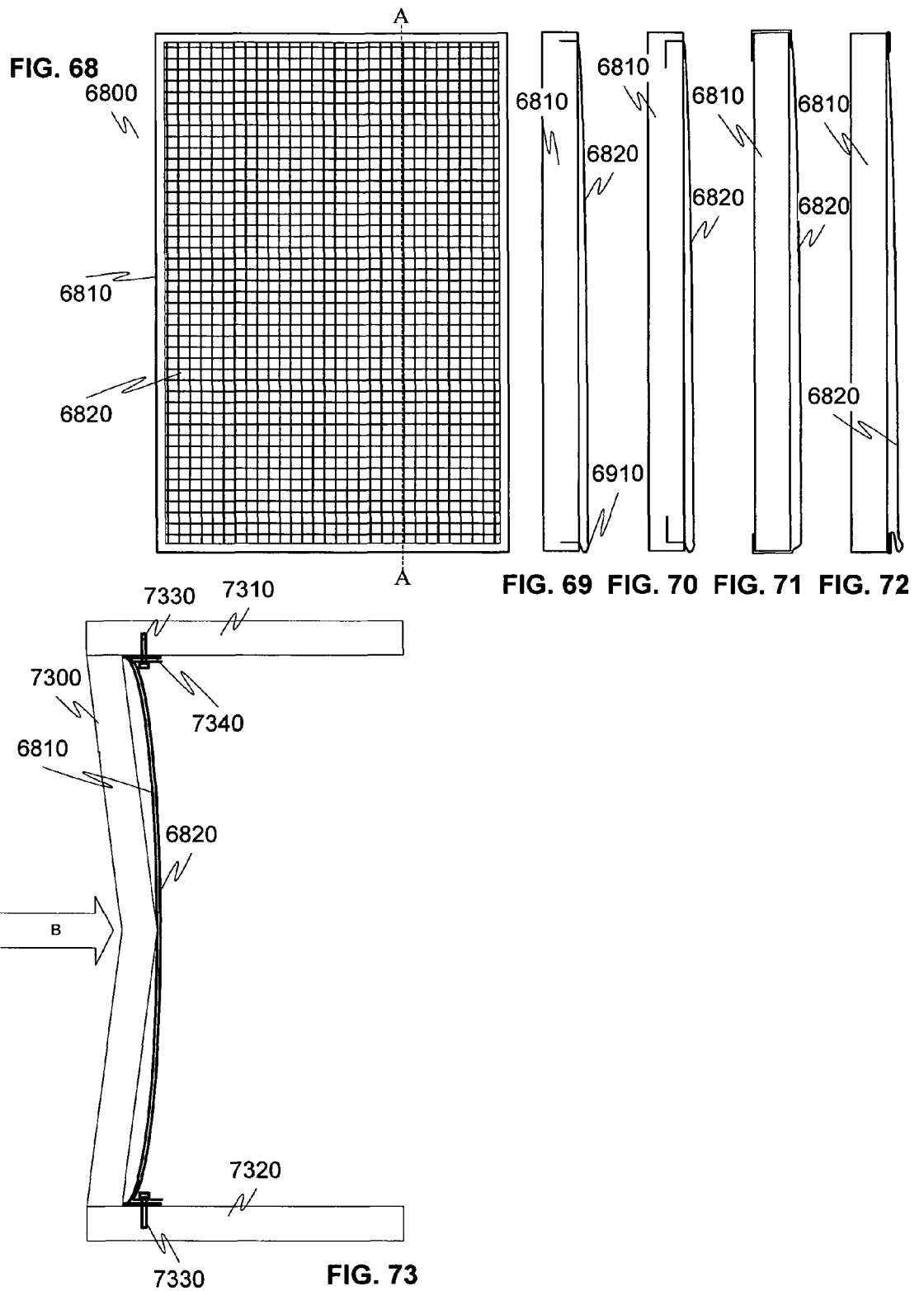

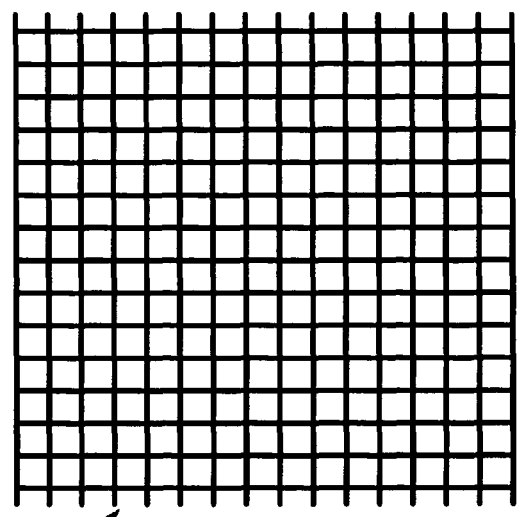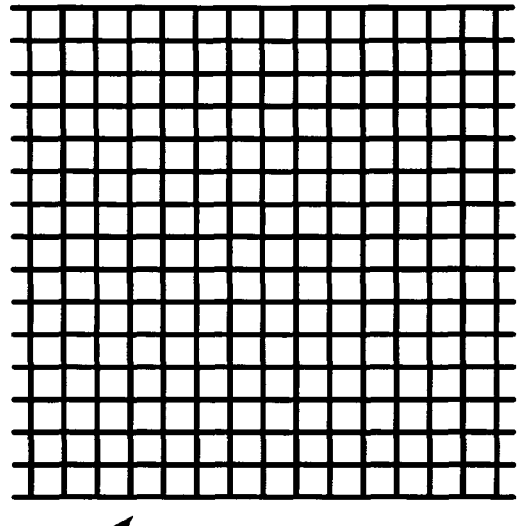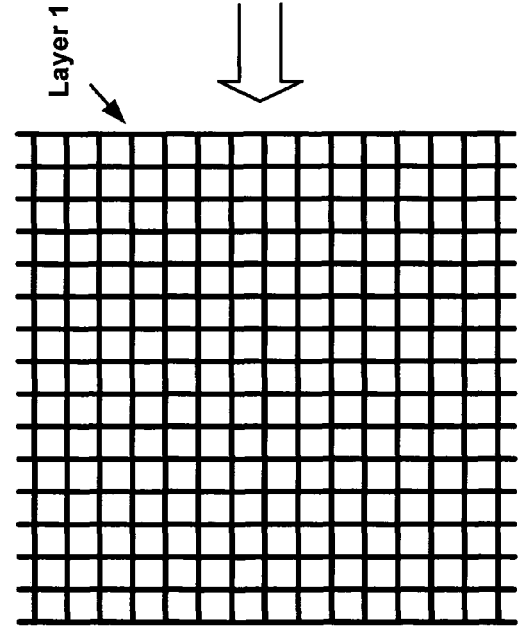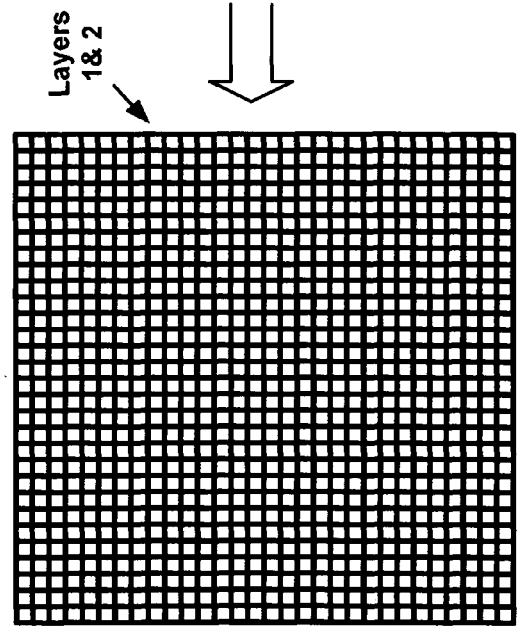
FIG. 74
FIG. 75

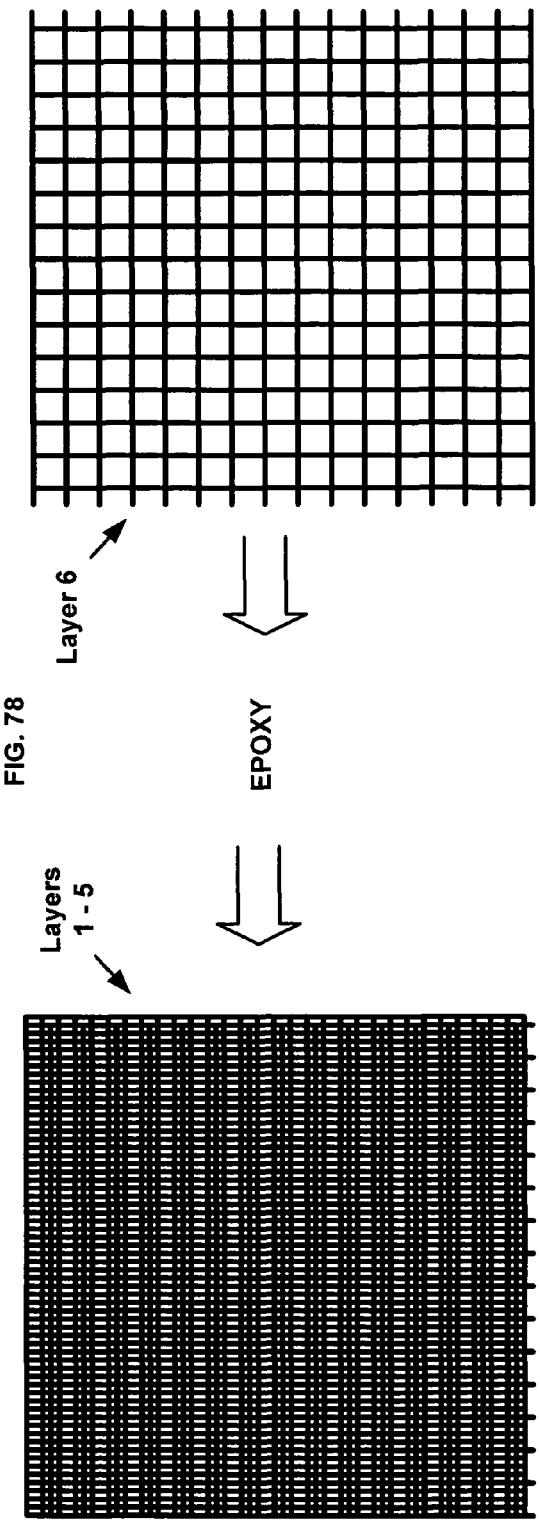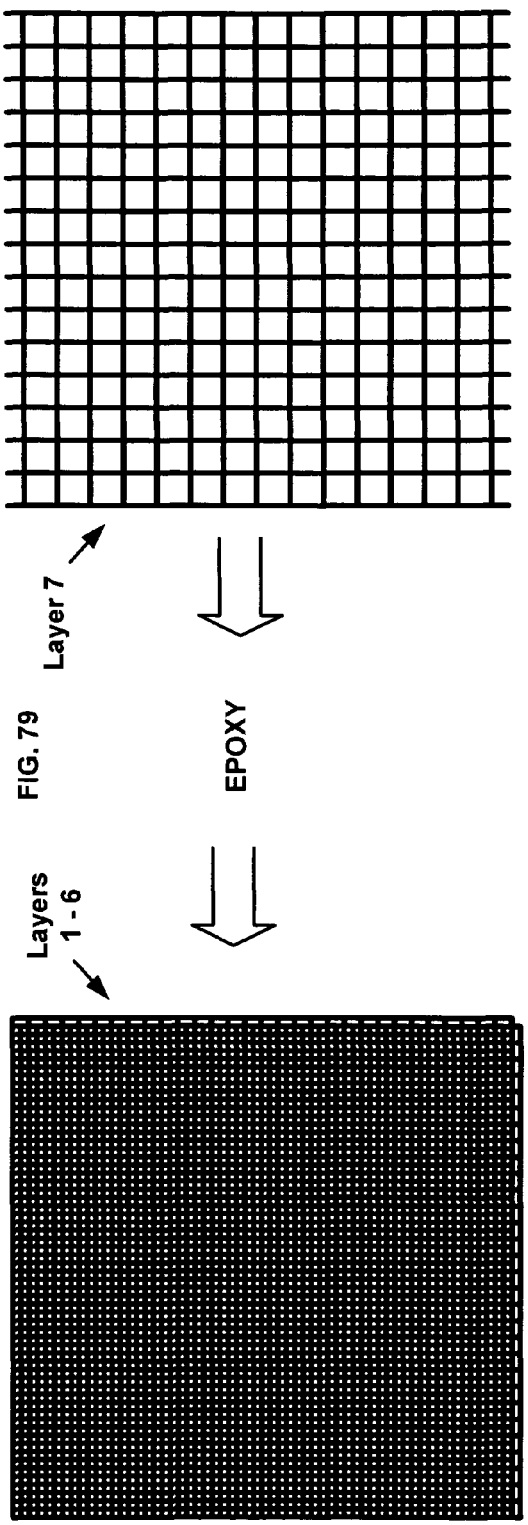

SHRAPNEL AND PROJECTILE CONTAINMENT SYSTEMS AND EQUIPMENT AND METHODS FOR PRODUCING SAME

CROSS REFERENCE TO RELATED APPLICATIONS

The present application claims the benefit of priority under 35 U.S.C. §119(e) to U.S. Provisional Patent Application Nos. 60/623,074, filed Dec. 1, 2004, entitled "Shrapnel and Projectile Containment Systems and Methods for Producing Same," and 60/642,991, filed Jan. 12, 2005, entitled "Shrapnel and Projectile Containment Systems and Methods for Producing Same," which are incorporated herein by reference in their entirety; and is related to U.S. patent application Ser. No. 10/510,691, filed Oct. 8, 2004, entitled "Shrapnel Containment System and Method for Producing Same," which is a U.S. National Phase Application of International Application No. PCT/US2004/010488, filed Apr. 6, 2004, entitled "Shrapnel Containment System and Method for Producing Same," which claims priority to U.S. Provisional Patent Application No. 60/460,422, filed Apr. 7, 2003, entitled "Blast-Resistant Panel and Method for Producing Same"

FIELD OF THE INVENTION

The present invention relates generally to a system to be installed on or adjacent to a wall, floor or ceiling in a structure or a side, bottom or top of a vehicle to contain shrapnel from a blast and/or a projectile fired from a projectile launcher, and equipment and methods for producing such systems.

BRIEF DESCRIPTION OF THE DRAWINGS

The invention will be best understood by reading the ensuing specification in conjunction with the drawing figures, in which like elements are designated by like reference numerals, and wherein:

FIG. 3 illustrates a shrapnel containment panel in accordance with an embodiment of the present invention.

FIG. 4 is a cross-sectional view of a panel having a channel member secured at its periphery, in accordance with an embodiment of the present invention.

FIG. 5 is a cross-sectional view of two abutting panels joined at their edges by a panel-fastening member according to an embodiment of the present invention.

FIG. 6 is an overhead substantially schematic view of the test layout conducted in accordance with the development of the present invention.

FIG. 7 is a side perspective view of a panel having flanges around a periphery of and substantially perpendicular to the panel, in accordance with an embodiment of the present invention.

FIG. 8 is a cross-sectional view of the panel of FIG. 7 along line 8-8, in accordance with an embodiment of the present invention.

FIG. 9 is a partial top-view of a continuous fastening strip with fasteners securing a portion of a flange of a panel to a concrete surface, in accordance with an embodiment of the present invention.

FIG. 10 is a partial top-view of non-continuous fastening strips with fasteners securing a portion of a flange of a panel to a concrete surface, in accordance with an embodiment of the present invention.

FIG. 11 is a partial top-view of a several fastening systems securing a portion of a flange of a panel to a concrete surface, in accordance with an embodiment of the present invention.

FIG. 13 is a partial, cross-sectional, top-view of another wall system manufactured with a reinforced panel fastened to existing frame elements, in accordance with an embodiment of the present invention.

FIG. 14 is a partial, cross-sectional, top-view of a slotted portion of a frame in a wall system manufactured with a reinforced panel that may be used to fasten the panel to existing frame elements, in accordance with an embodiment of the present invention.

FIG. 15 is a partial, cross-sectional, side-view of a concrete floor manufactured with a reinforced panel in the interior of the concrete floor, in accordance with an embodiment of the present invention.

FIG. 16 is a partial, cross-sectional, top-view of a concrete wall constructed with rebar and a reinforced panel in the interior of the concrete wall, in accordance with an embodiment of the present invention.

FIG. 17 is a partial, cross-sectional, top-view of a concrete wall constructed with rebar and a reinforced panel on an exterior surface of the concrete wall, in accordance with an embodiment of the present invention.

FIG. 18 is a cross-sectional, top-view of a one-piece panel system for protecting concrete columns, in accordance with an embodiment of the present invention.

FIG. 19 is a cross-sectional, top-view of an L-bracket for fastening a one or more-piece panel system around a concrete column, in accordance with an embodiment of the present invention.

FIG. 20 is a cross-sectional, top-view of an L-channel bracket for fastening a one or more-piece panel system around a concrete column, in accordance with an embodiment of the present invention.

FIG. 21 is a partial, cross-sectional, top-view of the L-bracket of FIG. 18 fastening a panel system for protecting a concrete column to a corner of the concrete column, in accordance with an embodiment of the present invention.

FIG. 22 is a cross-sectional, top-view of a two-piece panel system for protecting concrete columns, in accordance with an embodiment of the present invention.

FIG. 23 is a partial, cross-sectional, side-view of a panel system for protecting concrete columns showing a diamond-like arrangement of the reinforcing layer, in accordance with an embodiment of the present invention.

FIG. 39 is an exposed side-view of a pre-manufactured wall system with an embedded shrapnel and projectile-resistant panel therein, in accordance with an embodiment of the present invention.

FIG. 40 is a partial cross sectional-view of the pre-manufactured wall system of FIG. 40 with an embedded shrapnel and projectile-resistant panel therein along line 40-40, in accordance with an embodiment of the present invention.

FIG. 41 is a side-view of the pre-manufactured wall system of FIG. 40 with an embedded shrapnel and projectile-resistant panel therein, in accordance with another embodiment of the present invention.

FIG. 42 is a close-up side-view of a top portion of pre-manufactured wall system of FIG. 41 with an embedded shrapnel and projectile-resistant panel therein, in accordance with an embodiment of the present invention.

FIG. 51 is a side-view of a blast/shrapnel containment panel system in accordance with another embodiment of the present invention.

FIG. 52 is a view of a blast/shrapnel containment panel system in accordance with another embodiment of the present invention.

FIG. 53 is a view of a blast/shrapnel containment panel system in accordance with another embodiment of the present invention.

FIG. 54 is a view of a blast/shrapnel containment panel system in accordance with another embodiment of the present invention.

FIG. 57 illustrates an exemplary installation methodology for a blast/shrapnel containment panel system in accordance with an embodiment of the present invention.

FIG. 58 illustrates an exemplary installation methodology for a blast/shrapnel containment panel system in accordance with an embodiment of the present invention.

FIG. 59 illustrates an exemplary installation methodology for a blast/shrapnel containment panel system in accordance with an embodiment of the present invention.

FIG. 60 illustrates an exemplary installation methodology for a blast/shrapnel containment panel system in accordance with an embodiment of the present invention.

FIG. 61 illustrates an exemplary installation methodology for a blast/shrapnel containment panel system in accordance with an embodiment of the present invention.

FIG. 65 illustrates an exemplary shaping tool for a blast/shrapnel containment panel system in accordance with an embodiment of the present invention.

FIG. 66 illustrates an exemplary shaping tool for a blast/shrapnel containment panel system in accordance with an embodiment of the present invention.

FIG. 67 illustrates an exemplary shaping tool for a blast/shrapnel containment panel system in accordance with an embodiment of the present invention.

FIG. 68 is a view of a blast/shrapnel containment panel in accordance with another embodiment of the present invention.

FIG. 69 is a side-view of an exemplary blast/shrapnel containment panel of FIG. 68.

FIG. 70 is a side-view of an alternative exemplary blast/shrapnel containment panel of FIG. 68.

FIG. 71 is a side-view of an alternative exemplary blast/shrapnel containment panel of FIG. 68.

FIG. 72 is a side-view of an alternative exemplary blast/shrapnel containment panel of FIG. 68.

FIG. 73 is an environmental side-view of the blast/shrapnel containment panel of FIG. 68 showing a deformation from force B.

FIG. 74 illustrates a blast/shrapnel/projectile containment panel in accordance with another embodiment of the present invention.

FIG. 75 illustrates in further detail the blast/shrapnel/projectile containment panel of FIG. 74.

FIG. 78 illustrates in further detail the blast/shrapnel/projectile containment panel of FIG. 77.

FIG. 79 illustrates in further detail the blast/shrapnel/projectile containment panel of FIG. 78.

DETAILED DESCRIPTION OF THE PREFERRED EMBODIMENTS

Figure 2:
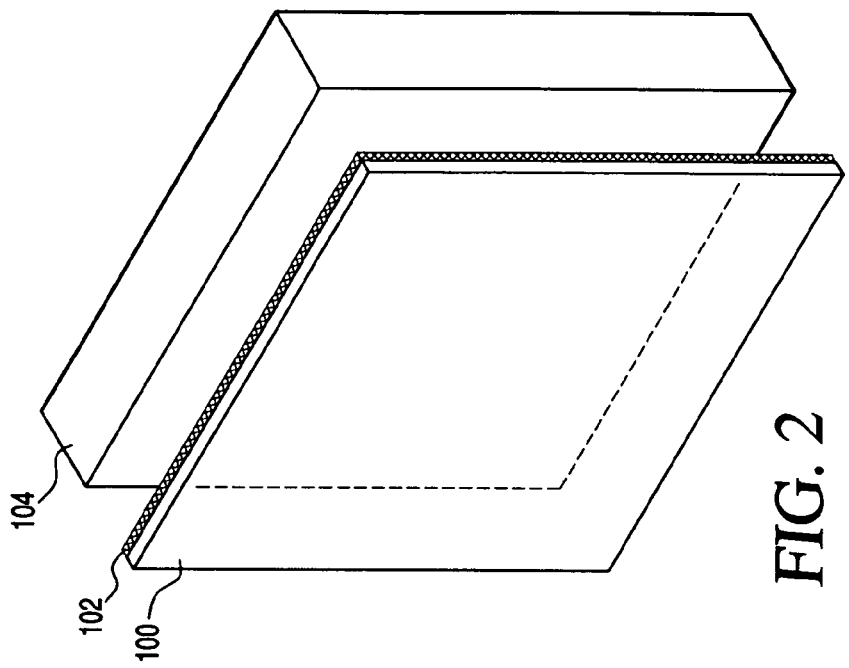
FIG. 2 is a substantially schematic view of the installation of a shrapnel containment panel at the interior of the structural wall of a building, in accordance with an embodiment of the present invention.

The present invention involves producing pre-formed panels, which may be formed in a variety of shapes, cut to size, as necessary, and installed onto or adjacent to a surface of a wall and/or door of a building. In general, to increase the effectiveness of the protection provided by the present invention, the wall may be a structural wall. The panels may be produced by spraying a polyurea or other elastomeric material specifically selected to facilitate the production process and the performance of the finished panels, in producing a material having improved elongation and tensile strength properties. The panels also may be produced by brushing, rolling and/or trowelling the polyurea material or other elastomeric material to the desired thickness to form the finished panels. Alternatively, the polyurea material or other elastomeric material may be applied (i.e., sprayed, brushed, rolled and/or trowelled) and bonded directly to the interior surface of a structural wall or building. In yet another alternative, the polyurea material or other elastomeric material may be applied (i.e., sprayed, brushed, rolled and/or trowelled) over a release agent (e.g., Teflon, silicon, wax, and/or any other release agent) that had been previously applied to the interior surface of the structural wall or building and then mechanical fasteners may be inserted through the elastomeric material and the release agent and into and anchored to the interior surface. The interior surfaces to which the elastomeric material may be applied and fastened may include walls, ceilings, floors, columns, doors, windows, etc.

Elastomers such as polysiloxane, polyurethane and polyurea/polyurethane hybrids may be employed as an alternative to polyurea in constructing the panels or in bonding a layer or layers of the material directly to the wall.

The present invention also may involve a method for producing blast, shock and projectile-resistant panels, including applying two or more layers of a two-part, high solids, polyurea elastomer material onto a releaseable substrate to a desired thickness. The two or more layers of the elastomer material may be applied with or without one or more fiber or fabric reinforcement layers disposed between the two or more layers of the elastomer material, allowing the material to cure, and removing the cured panel from the releasable substrate. Panels may be produced apart from and delivered to a building site or produced at the building site. The panels may be installed on the structural walls, doors and portions of a building, structure or vehicle to provide protection from shrapnel and projectiles. In addition, the panels may be installed inside elevator shafts and/or stair towers to provide extra structural integrity in the event of seismic activity and on the inside of walls in homes to provide added strength and wind resistance. Likewise, panels may be used to cover windows and doors and fastened in place to protect them from the effects of strong winds and severe weather, e.g., tornados and hurricanes.

In accordance with another embodiment of the present invention, the elastomer material may be injection molded to form enclosed tubes that may be used on the exterior of the hull of ships to protect the hull from damage from other ships, docks, etc.

Figure 1:
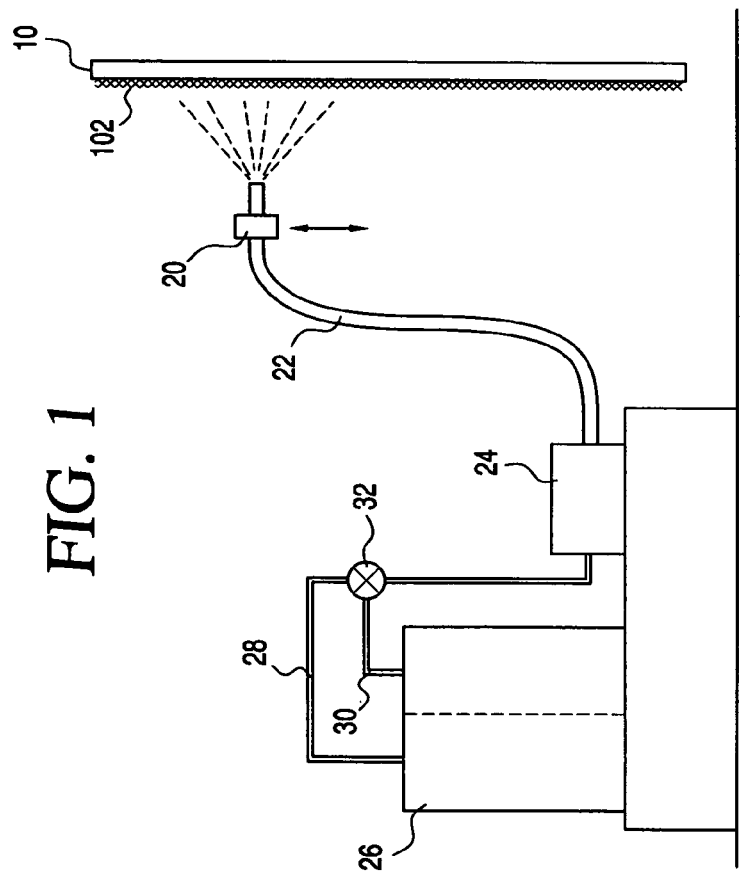
FIG. 1 schematically illustrates a panel production apparatus according to an embodiment of the present invention.

In FIG. 1, a panel substrate 10 may act as a mold surface onto which a polyurea elastomeric material may be applied, e.g., sprayed, brushed, rolled and/or trowelled, to produce blast and/or projectile resistant or shrapnel-retarding panels 100 according to the preferred embodiment of the present invention. Although panel substrate 10 is shown as a flat, planar surface, other embodiments are contemplated in which panel substrate 10 may have concave and/or convex contours and/or sides that may coincide with specific wall, door, etc., conformations to which the panels 100 may be applied. The substrate 10 may be treated, as necessary, with a release agent/compound, in order to facilitate the removal of cured panels from the substrate.

Employing standard, known, spray application equipment, a two-part, high solids, elastomer composition is sprayed in liquid (uncured) form onto substrate 10. The spray equipment, for illustrative purposes, may include spray nozzle 20, which is connected via flexible tubing 22, to an application pump 24. Reservoir or storage tank 26 may be used to feed the components making up the elastomer composition through feed lines 28, 30, where the components are mixed at valve 32. Spray nozzle 20 may be manually operated so as to apply the polyurea material over the entire substrate in producing a panel. Alternatively, the spray nozzle (more than one can be used) may be mounted to a carriage (not shown) of a known construction that has drive means for moving the nozzle 20 transversely or horizontally, and vertically, to ensure that the composition is applied in an even thickness over the entire substrate. Other spray application arrangements are also feasible, and the one shown in FIG. 1 is but one example.

It is envisioned that, for large-scale production, the spray process may be substantially completely automated, with computer control and robotic elements being used to control the spray equipment, including the movement of the sprayers and delivery of the material to be sprayed, and the handling of the panels. However, the same basic process remains pretty much the same and FIGS. 33-36 provide diagrams of two embodiments of possible automated systems for mass producing finished panels. For example, the automated systems may produce at least one finished panel at least every 5 minutes.

In a particularly exemplary embodiment, the panels may further be enhanced by including a reinforcing layer 102 which may be disposed at either the outer or inner surface of the panel 100, or which may be disposed in the interior of the panel. The method of producing such a panel, with the reinforcing layer being at an interior of the panel, may preferably include placing a reinforcing fabric material against substrate 10, and spraying the polyurea or other sprayable elastomer onto the fabric to a thickness which is approximately one-half the thickness of the finished panel. The fabric 102 with the sprayed-on polyurea is then rotated or flipped such that the polyurea faces the substrate and the fabric 102 faces the spray equipment. A second application or spraying of the polyurea onto the opposite side of the fabric 102 is then effected, to produce a panel of the desired final or finished thickness.

Modifications to this preferred process sequence may be employed. The reinforcing layer can be placed in intimate contact with substrate 10 when it is desired to have the layer at an exterior surface of the panel 100, and the elastomer can be sprayed onto the layer until the desired panel thickness is attained. Where the layer 102 is to be in the interior of the panel 100, the layer may be spaced apart from the substrate 10, with the polyurea being sprayed through the layer to encapsulate the layer 102. Alternatively, a portion of the panel may be sprayed onto the substrate, and the layer 102 may then be introduced, and the remaining thickness of the panel may then be sprayed to complete the panel.

Once the spray process is completed, and the polyurea material has either partially or fully cured, the layer may be separated from the substrate 10, thus forming a panel 100.

The panels 100 may thus be essentially mass-produced in an economical manner. This can be accomplished in a true factory setting, or in a portable or makeshift production facility constructed at a building site, if that were found to be comparably economical or desirable for any reason. Panels 100 are then transported to a building which is to be outfitted with these blast-resistant panels.

Interior structural walls 104 of a building to which the panels are to be secured are either left exposed during initial construction or, in a building retrofit, the cosmetic interior wall surfaces are removed to expose the interior surface of the structural wall. The panels 100 are cut to size, as necessary, and are affixed to the interior surface of the wall 104, preferably using any suitable adhesive, or by mechanical attachment. Because the structural wall 104 will commonly be formed either of block or poured concrete, suitable mechanical forms of attachment may include threaded concrete wall anchors, or screw and anchor sets, or nailing with an appropriate concrete-penetrating nail.

FIG. 2 is a substantially schematic view of the installation of a shrapnel containment panel at the interior of the structural wall of a building, in accordance with an embodiment of the present invention.

FIG. 3 illustrates a preferred embodiment of the panel 100 as it is readied for installation. In this embodiment, panel 100 is bounded at its periphery by channel members 120 which retain the edges of the panel 100 between two rails 122, 124 positioned at opposite sides (e.g., front and back) of the panel (see FIG. 4). The channel members, which are preferably made of stainless steel, aid in structurally reinforcing the panels at the edges, adding stiffness thereto. In addition the use of channels at the edges of the panel improves the reliability of mechanical fasteners 121, such as, but not limited to, concrete wall anchors, screws, nails, etc. in securing the panels to the building walls.

FIG. 5 illustrates a further panel fastening member 126 suitable for use when two panels are to be joined to span a distance wider than the width of a single panel. Adjacent edges of two panels are secured to the two rails 128, 130 of this panel fastening member using suitable mechanical fasteners 131. The rails 128, 130 are offset by a web 132, such that the fastening member retains the two panels in essentially an edge-abutting relationship. The fastening member 126 may be used in addition to, or in lieu of, the channel member 120 at the edges to be joined. The fastening member can be secured to the building wall, as well, by appropriate mechanical fasteners, for example, but not limited to, concrete wall anchors, etc.

An explosive blast, or other type of impact force at the exterior of a building, can cause the structural wall to fracture and generate wall fragments of varying sizes, which are generally referred to as shrapnel. The panels 100, with their improved elongation and tensile strength characteristics, will act to effectively absorb a significant portion of the kinetic energy imparted to the pieces of shrapnel. This absorption of kinetic energy will prevent the shrapnel from flying through the interior of the building. In situations in which the explosive blast also causes the panels 100 to fracture, the kinetic energy absorbed or dissipated by the panels will significantly reduce the amount and/or speed of the shrapnel that may enter the interior of the building. Persons inside the building are thus better protected against a principal cause of injury resulting from an attack on a building.

The panels are also believed to contribute to the structural integrity of the wall itself, particularly when fastened to the wall by mechanical fasteners at the periphery of the panels.

In order to be effective at absorbing or dissipating the potentially high levels of kinetic energy that may come from an explosion or other concussive event, it is preferred that the panel thickness be in the range of about 100 to about 250 mil. Even more preferably, the panel thickness will be about 180 mil. Panels thicker than 250 mil may also be used, however, it is expected that the possible incremental increase in shrapnel containment or blast resistance afforded by the thicker panels may be outweighed by the increased cost (material cost), in a cost/benefit analysis.

The elastomeric material employed in the shrapnel-containing panels preferably has particular combinations of physical or other material properties in its cured state. Of particular significance are percent elongation at break and tensile strength. The elastomer preferably will have an elongation at break in a range between about 100-800%, and more preferably at the higher end of this range, e.g., 400-800%. The tensile strength of the elastomer is preferably a minimum of 2000 psi.

In addition, the adhesion properties of the elastomer are believed to be important, whether the panels are constructed separately or are formed in place on the walls of the building or other structure to be protected. It is preferred that the elastomer exhibit an adhesion to concrete of 300 psi minimum (or at concrete failure), and an adhesion to steel of 1200 psi minimum.

As noted previously, polyurea, polysiloxane, polyurethane and polyurea/polyurethane hybrids can produce the desired physical and material properties. Currently, in an embodiment an elastomer is used that is a 100% solids, spray-applied, aromatic polyurea material that is available as a two-part (isocyanate quasi-polymer; amine mixture with pigment), sprayable material designed principally as a flexible, impact resistant, waterproof coating and lining system.

The lining system has been tested in panels produced having a fabric reinforcement layer. The fabric reinforcement layer provides a framework to which the uncured elastomer will adhere in forming a panel shape. The fabric reinforcement will preferably also contribute to the structural integrity of the panel in resisting blast and in containing shrapnel, particularly in helping restrict the amount of elongation experienced by the elastomer as the energy of the blast or other impact is being absorbed.

To date, the fabrics that have been used in producing panels for testing are produced from aramid or polyester yarns or fibers, with an open grid (opening between warp and fill yarns) on the order of 0.25 in. by 0.25 in., or 0.5 in. by 0.25 in. Smaller or larger grid opening sizes are, however, believed to be suitable for use. The tensile strength of the fabric employed in panels tested to date is on the order of 1200 psi by 1200 psi. Fabric made from Technora and Twaron-brand aramid yarns or fibers produced by Teijin Fibers are believed to be particularly suitable for use in this application.

The shrapnel containment system and method of the present invention can also be in the form of a layer of the elastomeric material applied and bonded directly to the wall or other structure that is to be reinforced. In this instance, the wall would preferably be cleared of loose and foreign materials, with the elastomer applied by spraying, in a manner similar to that employed in spraying the panels onto the panel substrate. The elastomer, as noted above, will preferably be selected to have a bonding strength or adhesion to concrete of 300 psi minimum, and the concrete will generally have a sufficient number of small surface irregularities such that the elastomer will find regions where mechanical attachment enhances the adhesion.

When the system is to have a fabric or fiber reinforcing element, the elastomer may also preferably be partially applied, with the reinforcing element then being positioned, and the remainder of the elastomer layer is then spray-applied. Alternatively, the reinforcing element could first be positioned against the wall, with the entire thickness of the elastomer layer then being applied thereto.

Testing of blast-resistant/shrapnel-containment panels in accordance with the present invention have been conducted. One physical test layout (not to scale) is shown in a schematic overhead view in FIG. 6. In FIG. 6, an explosive charge 200 was positioned centrally to four (4) identically constructed concrete block masonry target walls 202, spaced on a 30' radius circle from the explosive. The masonry target walls 202 were constructed having two reinforcing legs 204, which together with the target walls formed a squared-off "U" shape, such that the target walls 202 facing the explosive charge would have some degree of structural reinforcement, as they generally would in a building.

Panels A, B, and C (thickness not to scale relative to wall thickness) were installed at the interior of three of the walls, while the fourth wall had no panel or lining installed. The panels included stainless steel channels 120 surrounding their peripheries, and were secured to the interior of the walls 202 using concrete anchor fasteners.

All of Panels A, B and C were produced at a nominal thickness of 180 mil of polyurea material having a fabric reinforcement layer disposed therein. Further constructional details of the panels are as follows:

TABLE I

| Panel | Elastomer | Fabric Reinforcement |
|---|---|---|
| A | AR425, 180 mil | Technora T200 fabric, 0.5 × 0.25" grid opening |
| B | AR425, 180 mil | Technora T200 fabric, 0.5 × 0.25" grid opening |
| C | AR425, 180 mil | Twaron T1000 fabric, 0.25 × 0.25" grid opening |

The explosive charge 200 comprised 42 blocks (52.5 lbs.) of C-4 explosive configured to generate a uniform blast overpressure on the face of each target wall 202. This quantity of C-4 explosive is equivalent to 67.2 pounds of TNT. The charge was elevated four feet above the ground to align it with the center point of each wall (walls 202 were 8 feet in height). The explosive charge was statically detonated, creating a peak incident overpressure of 17.67 psi, and a reflected pressure of 51.22 psi.

Initial post-explosion observations revealed that the unprotected wall (no panel secured to interior) suffered catastrophic structural failure, with virtually none of the concrete of either the target wall 202 or the reinforcing legs 204 remaining in place above the base of the wall. Fragments of the wall, or shrapnel, caused by the blast were found up to 54 feet behind the wall (i.e., to the interior of the wall).

In contrast, the three target walls having the panels installed at the interior surface remained standing, with somewhat varying levels of damage to the concrete blocks. Regions at which the target wall 202 was joined to reinforcing legs 204 appeared to suffer the most damage, due to the stresses induced at those joints by the blast. The target walls themselves contained varying degrees of cracking and fracture.

Inspection of the panels revealed that small areas of a marking paint coating on the interior surfaces of the panel had spalled or been knocked off, presumably by concrete fragments impacting the opposite side of the panel during the explosion. Little or no plastic deformation, and no fracture or perforation, of the panels was observed. No concrete fragments were found behind (to the interior of) the panels.

Upon removal of the panels, fragments of the target walls were found behind each of the test panels. Tables 2-5 present data relating to wall fragments (shrapnel) found subsequent to the test. It is to be noted that no data is provided relative to "Distance from Wall" for the walls having the panels secured thereto, in that none of the fragments passed through the panels.

TABLE 1

| Fragments found behind the Baseline target wall | | |
|---|---|---|
| Fragment No. | Mass (oz) | Distance from wall (ft) |
| 1 | 1.0 | 49 |
| 2 | .4 | 45.2 |
| 3 | .3 | 54 |
| 4 | .1 | 41.5 |
| 5 | .3 | 41 |
| 6 | 1.7 | 33 |
| 7 | 13.0 | 30 |
| 8 | 1.5 | 24.4 |
| 9 | 1.1 | 19 |
| 10 | 3.4 | 19 |
| 11 | .5 | 18.5 |
| 12 | 6.7 | 19 |
| 13 | .1 | 19 |

TABLE 2

Fragments contained by Test panel T1402

| Fragment No. | Mass (oz) |
| --- | --- |
| 1 | .9 |
| 2 | 1.1 |
| 3 | 1.1 |
| 4 | .2 |
| 5 | .1 |

TABLE 3

Fragments contained by Test panel T1403

| Fragment No. | Mass (oz) |
| --- | --- |
| 1 | .5 |
| 2 | .2 |
| 3 | 1.2 |
| 4 | .3 |
| 5 | .1 |
| 6 | .1 |
| 7 | 2.1 |
| 8 | .6 |

TABLE 4

Fragments contained by Test panel T1404

| Fragment No. | Mass (oz) |
| --- | --- |
| 1 | .8 |
| 2 | 1.3 |
| 3 | 5.2 |

FIG. 7 is a side perspective view of a panel having flanges around a periphery of and substantially perpendicular to the panel, in accordance with an embodiment of the present invention. In FIG. 7, a panel 700 may be made in any size necessary, may include a body portion 710 having an inner surface 711 and an outer surface 712, and body portion 710 may be, for example, but not limited to, a 2' by 2', a 2' by 3', a 2' by 4', a 4' by 8', as well as larger and/or smaller sizes, to cover a wall or portion thereof. Panel 700 may also include 2, 3 or 4 flanges, for example, a top flange 713, a bottom flange 714, a left-side flange 715, and a right-side flange 716, where each of the flanges generally depends from body portion 710 on a single side of body portion 710, for example, on the side with inner surface 711. However, embodiments are contemplated in which the flanges, for example top flange 713 and bottom flange 714 may depend away from body portion 710 on opposite sides, for example, top flange 713 may depend away from body portion 710 on the side with outer surface 712 and bottom flange 714 may depend away from body portion 710 on the side with inner surface 711.

In general, flanges 713, 714, 715, 716, in FIG. 7, depend away from body portion 710 at substantially a 90° angle, although other angles, both more and less than 90° are also contemplated. In embodiments with only 2 flanges, the flanges are generally located on opposite edges of panel 700, for example, top and bottom or left and right. As seen in FIG. 7, with four flanges panel 700 resembles an open box or container with relatively short sides represented by flanges 713, 714, 715, 716. Each flange may extend 1 inch or more from body portion 710 and may generally extend the length of the side of panel 700 on which the flange is located.

Panel 700 and flanges 713, 714, 715, 716 of FIG. 7 may be formed as a single piece having a substantially uniform thickness using a variety of methods. For example, in accordance with an embodiment of the present invention, in one method panel 700 and flanges 713, 714, 715, 716 may be formed by spraying an elastomeric material into a mold (not shown) having a shape substantially similar to that of panel 700, allowing the elastomeric material to set and removing panel 700 from the mold. Panels with 2, 3 and 4 flanges may be produced using this method. Although producing panels in the form illustrated in FIG. 7 may help speed the installation process, because they are ready to be installed, it may present some logistic issues related to the shipping and storing of panels configured in this manner. Specifically, when panel 700 is manufactured with flanges 713, 714, 715, 716, it may become more difficult to stack and/or combine multiple such panels 700 for shipping and, thus, be more expensive than flat panels.

Panel 700, in FIG. 7, may be placed against a wall in a structure and, in general, top flange 713 and bottom flange 714 may be fastened to a ceiling and a floor near the wall in the structure, respectively. If panel 700 includes one or more side flanges 714, 715 and these side flanges abut wall(s) and/or column portion(s) of the structure, the side flanges may also be fastened to the wall(s) and/or column portion(s). For example, panel 700 may be fastened to the structure using mechanical fasteners, such as, concrete anchors, screws and/or nails. In one embodiment of the present invention, the fasteners may be a concrete fastener, for example, but not limited to, a ¼" diameter by 1¾" long Kwik-Con II+ fastener, manufactured by Hilti USA, with or without a washer and spaced approximately 12" on center along the length of the flange being fastened. Alternatively, if panel 700 only has 2 or 3 flanges, then the edges without flanges that abut similarly configured edges from adjacent panels without flanges may be fastened together using, for example, a Z-channel fastening member as described above in relation to FIGS. 3, 4 and 5, as well as by using wall framing, for example, wood and/or metal base (i.e., bottom) and cap (i.e., top) plates and/or studs along the side flanges, which will be described in subsequent paragraphs herein.

FIG. 8 is a cross-sectional view of the panel of FIG. 7 along line 8-8, in accordance with an embodiment of the present invention. In FIG. 8, the substantially uniform thickness of panel 700 may be seen to be consistent between body portion 710 and top flange 713 and bottom flange 714. Although panel 700 may be shown as having relatively sharp outer edges where top flange 713 and bottom flange 714 depend from body portion 710, slightly rounded and/or curved edges may also be provided by using a mold with rounded and/or curved edges.

FIG. 9 is a partial top-view of a continuous fastening strip with fasteners securing a portion of a flange of a panel to a concrete surface, in accordance with an embodiment of the present invention. In FIG. 9, a flange 910 may have disposed thereon a continuous fastening strip 920 and multiple fasteners 930 may pass through continuous fastening strip 920 and flange 910 into concrete 940, which, for example, may be a floor, ceiling, wall and/or column in a structure. Continuous fastening strip 920 may be made from metal (for example, ⅛", ¼", etc. thick by 1", 2", 3", etc. wide cold rolled steel and/or steel plate), wood (for example, 2" by 4", 2" by 6", etc. boards used as plates and/or studs to frame walls), and/or any other material having similar strength and durability as metal and/or wood. Fasteners 930 may be screws, for example, Kwik-Con+ II screws, concrete nails, bolts and/or other concrete fastening systems. Fasteners 930 may be used in combination with an epoxy and/or other adhesive or fixative to aid in setting fasteners 930 in concrete 940.

FIG. 10 is a partial top-view of non-continuous fastening strips with fasteners securing a portion of a flange of a panel to a concrete surface, in accordance with an embodiment of the present invention. In FIG. 10, a flange 1010 may have disposed thereon at least one non-continuous fastening strip/section 1020 and multiple fasteners 1030 may pass through each non-continuous fastening strip/section 1020 and flange 1010 into concrete 1040, which may be a floor, ceiling, wall and/or column in a structure. Non-continuous fastening strip 1020 may be made from metal (for example, ⅛", ¼", etc. thick by 1", 2", 3", etc. wide cold rolled steel and/or steel plate), wood (for example, 2" by 4", 2" by 6", etc. boards used as plates and/or studs to frame walls), and/or other material having similar strength and durability as metal and/or wood. Fasteners 1030 may be used in combination with an epoxy and/or other adhesive or fixative to aid in setting fasteners 1030 in concrete 1040.

FIG. 11 is a partial top-view of several individual fastening systems securing a portion of a flange of a panel to a concrete surface, in accordance with an embodiment of the present invention. In FIG. 11, each of multiple fasteners 1130 may pass through a washer 1135 and a flange 1110 into concrete 1140, which may be a floor, ceiling, wall and/or column in a structure. Washer 1135 may be made from a metal (for example, steel, zinc, etc.) and/or other material having similar strength and durability as metal. Fasteners 1130 may be used in combination with an epoxy and/or other adhesive or fixative to aid in setting fasteners 1130 in concrete 1140.

Figure 12:
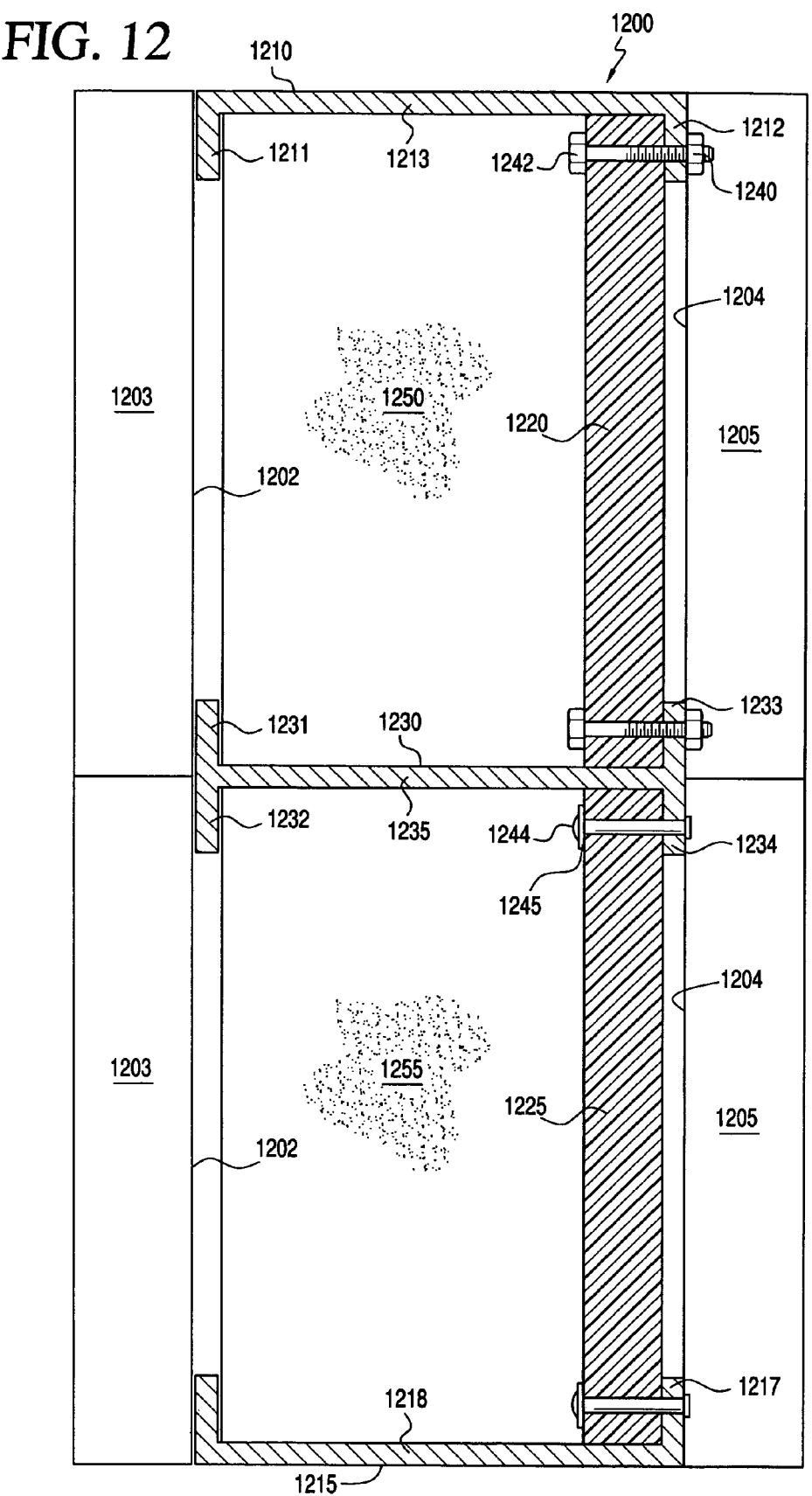
FIG. 12 is a cross-sectional, top-view of a wall system manufactured with a reinforced panel fastened to existing frame elements with fasteners, in accordance with an embodiment of the present invention.

FIG. 12 is a cross-sectional, top-view of a wall system manufactured with a reinforced panel fastened to existing frame elements with fasteners, in accordance with an embodiment of the present invention. In FIG. 12, one side of a wall system section 1200, for example, in a metal building and/or vehicle is shown connected to an exterior side 1202 of an interior wall 1203 and an opposite side of wall system 1200 is connected to an interior side 1204 of an exterior siding 1205. Wall system section 1200 may include a pair of opposing U-channel components a first U-channel component 1210 and a second U-channel component 1215 that may each extend along the entire vertical length of opposing sides of wall system section 1200. Each opposing U-channel component may include a pair of left and right flanges 1211, 1212 and 1216, 1217, respectively, where each depend away from a body portion 1213 and 1218, respectively, at generally a 90 degree angle, and generally extend the vertical height of wall system section 1200.

Although not shown, additional sections of U-channel may also be positioned along top and bottom edges of wall system section 1200 to form a frame. These additional sections of U-channel may be adapted to fit evenly with first and second U-channel components 1210, 1215. Between U-channel components 1210, 1215 may be disposed one or more sections of a reinforced panel 1220, 1225 that may be fastened along the vertical height of right flange 1212. In general, each reinforcing panel 1220, 1225 may be manufactured in a variety of sizes, for example, but not limited to, 2' by 2', 2' by 3', 4' by 8', etc., and may have a thickness ranging from approximately 100 mil to 250 mil or more. If necessary, wall system section 1200 may also include one or more I-channel components 1230 disposed between and substantially parallel with first U-channel component 1210 and second U-channel component 1215. Each I-channel component 1230 resembles an I-beam and may have two pairs of opposing flanges, a first flange 1231 paired with a second flange 1232 and a third flange 1233 paired with a fourth flange 1234 depending generally perpendicularly from a body portion 1235 of I-channel component 1230.

In FIG. 12, reinforced panel 1220 may be fastened to and along the length of right flange 1212 of first U-channel 1210 and fastened to and along the length of third flange 1233 of I-channel component 1230 using, for example, multiple nuts 1240 and bolts 1242. Alternatively, the fastening may be accomplished using multiple rivets 1244 and washers 1245. Wall system section 1200 may also include one or more foam sections 1250, 1255 between the reinforced panel and flanges 1211, 1231, 1232, 1216.

In general, the U-channel and I-channel components 1210, 1215 and 1230, respectively, of FIG. 12 may be made from a material having sufficient strength and rigidity, for example, metal, composite and the like, to support wall system section 1200 and to impart structural strength to support the interior wall sections and exterior siding attached thereto and wall and floor sections placed on top of wall system section 1200.

FIG. 13 is a partial, cross-sectional, top-view of another wall system manufactured with a reinforced panel fastened to existing frame elements, in accordance with an embodiment of the present invention. In FIG. 13, a wall system section 1300 similar to wall system section 1200 of FIG. 12 is shown in which mechanical fasteners are not used to connect reinforcing panel 1220 to either of first U-channel 1210 and I-channel 1230. Instead, reinforcing panel 1220 may be adhesively attached to the flanges on first U-channel 1210 and I-channel 1230. Alternatively, flanges on U-channel 1210 and I-channel 1230 may be configured to have a slotted portion into which a vertical edge of reinforced panel 1220 may be inserted. This design is shown and described herein in relation to FIG. 14. The slotted portion may be located next to one or both flanges on each of U-channel 1210 and I-channel 1230.

FIG. 14 is a partial, cross-sectional, top-view of a slotted portion of a frame in a wall system manufactured with a reinforced panel that may be used to fasten the panel to existing frame elements, in accordance with an embodiment of the present invention. In FIG. 14, a right side of a U-channel component 1410 is shown with a slotted-portion 1411 defined by a first flange 1412 depending substantially perpendicularly from a body portion 1415 of U-channel component 1410 and a first flange lip 1413 depending at a substantially perpendicular angle from a lower end of flange 1412 and substantially parallel to body portion 1415. Similarly, a second flange 1414 is shown depending substantially perpendicularly from the same side of body portion 1415 of U-channel component 1410 as first flange 1412. Second flange 1414 may also have a second flange lip 1414 depending at a substantially perpendicular angle from a lower end of flange 1412 and that is substantially parallel to body portion 1415. In general, first flange lip 1413 and second flange lip 1416 are coplanar and of substantially equal length.

As seen in FIG. 14, reinforcing panel 1420 may include a keyed portion 1430 along its edges to fit within slotted portion 1411 and keyed portion 1430 may be variably located along the edge of reinforcing panel 1420 to permit an outer surface 1421 of reinforcing panel 1420 to align with an outer edge of first flange 1412 or an outer surface 1422 to align with an inner edge of first flange 1412. Installation of keyed portion 1430 into slotted portion 1411 may be accomplished by, for example, sliding keyed portion 1430 into slotted portion 1411 or by snapping keyed portion 1430 into slotted portion 1411. In the contemplated embodiments of wall system section 1200, reinforcing panel may be manufactured with or without one or more fabric/fiber reinforcing layers in reinforcing panel 1220 used to make wall system section 1200.

FIG. 15 is a partial, cross-sectional, side-view of a concrete floor manufactured with a reinforced panel in the interior of the concrete floor, in accordance with an embodiment of the present invention. In FIG. 15, a concrete slab 1500 may include an upper concrete portion 1510 and a lower concrete portion 1520 between which may be sandwiched a reinforcing panel 1530. Reinforcing panel 1530 may include panels having one or more layers of elastomer both with and without one or more fabric/fiber reinforcing layers therein. In one embodiment of the present invention, concrete slab 1500 may be manufactured by pouring concrete to create lower concrete portion 1520, placing one or more reinforcing panels 1530 on top of lower concrete portion 1520 either before and/or after the concrete sets, and pouring concrete onto reinforcing layer 1530 to form upper concrete portion 1510. The one or more reinforcing panels 1530, in general, are pre-manufactured, cured panels with or without one or more fabric/fiber layers as described herein. However, reinforcing panel 1530, regardless of whether it is with and/or without one or more fabric/fiber layers, may also be spray applied to lower concrete portion 1520 and then upper concrete portion 1510 may be poured on reinforcing panel 1530.

In FIG. 15, although not shown, concrete slab 1500 may also include I-beams, rebar, wire and/or other reinforcement and/or structural support elements. For example, one or both of upper concrete portion 1510 and lower concrete portion 1520 may include a mesh and/or cage of rebar that may have been wired together to improve the strength and rigidity of concrete slab 1500. Examples of possible reinforcement and/or structural support elements are described in relation to FIGS. 16 and 17.

FIG. 16 is a partial, cross-sectional, top-view of a concrete wall constructed with rebar and a reinforced panel in the interior of the concrete wall, in accordance with an embodiment of the present invention. In FIG. 16, a concrete wall 1600 may include a first concrete side 1610, a second concrete side 1620 and reinforcing panel layer 1630 sandwiched in between first concrete side 1610 and second concrete side 1620. Reinforcing layer 1630 may include panels having one or more layers of elastomer both with and without one or more fabric/fiber reinforcing layers therein. Although concrete wall 1600 is similar in appearance to concrete slab 1500 in FIG. 15, the method of construction may be different. For example, unlike concrete slabs in which the concrete is, generally, 4 inches to 12 or more inches thick (high) and oriented along a horizontal plane, in a concrete wall the concrete is, generally, 4 inches to 12 or more inches thick (wide) and oriented along a vertical plane standing from 4 feet to 10 or more feet high and running along an entire side/portion of a structure. As a result, concrete walls must be poured into tall forms that are generally made of reinforced metal and held together with pieces of rebar and/or other metal reinforcing element. In general, concrete walls in a house and/or building may be from about 4 feet to 12 feet tall. Of course, the walls may be shorter and/or taller, as required by the particular building application. In addition, rebar and/or wire mesh and/or cages may also be placed inside the forms so that the concrete may encase the rebar and/or wire when it is poured into the forms.

For example, in accordance with an embodiment of the present invention, a method of construction of concrete wall 1600 may include assembling one or more rebar and/or wire mesh layers and placing the one or more rebar and/or wire mesh layers inside a form. One or more reinforcing panels 1630 may be placed in approximately the middle of the form and between the one or more rebar 1640 and/or wire mesh layers. In at least one embodiment, at least one or more reinforcing panels 1630 may be connected using a Z-channel and/or I-channel connector 1650 and fasteners, bolts, screws, staples, tape, etc. In addition, the one or more rebar and/or wire mesh layers may be wired together by passing rebar and/or wire through holes in one or more reinforcing panels 1630. In the method, concrete is poured into the form and around the panel and rebar and/or wire mesh and allowed to set. Once the concrete is set, the forms may be removed to reveal concrete wall 1600 with reinforcing layer 1630 embedded therein.

FIG. 17 is a partial, cross-sectional, top-view of a concrete wall constructed with rebar and a reinforced panel on an exterior surface of the concrete wall, in accordance with an embodiment of the present invention. In FIG. 17, a concrete wall 1700 may include a concrete portion 1710, and at least one reinforcing panel portion on one or bother sides of concrete wall 1700. Concrete wall 1700 may be constructed by placing one or more reinforcing panels 1720 against one or both sides of a form and a rebar and/or wire mesh and/or cage in substantially the middle of the form. Concrete may be poured into the form and once it has set, the form may be removed to reveal concrete wall 1700 with reinforcing panels 1720 on one side. As in FIG. 16, adjacent reinforcing panels used in concrete wall 1700 in FIG. 17 may be fastened together as described above in relation to FIG. 16.

FIG. 18 is a cross-sectional, top-view of a one-piece panel system for protecting concrete columns, in accordance with an embodiment of the present invention. In FIG. 18, a column panel cover 1800 may be formed as a substantially rectangular, for example, square, or any other configuration (e.g., oval, circular, etc.) to match the external dimensions of a column. Regardless of the shape of the column, column panel cover 1800 may be pre-molded around an appropriately shaped mold to conform to the shape of the column. As seen in FIG. 18, this may be a substantially square shape such that the outer edges 1802, 1804 of column panel cover 1800 are not connected to provide an opening 1810 that runs along the length of outer edges 1802, 1804.

In FIG. 18, opening 1810 permits edges 1802, 1804 to be spread apart and column panel cover 1800 to be placed around the column. Alternatively, column panel cover 1800 may be formed by heating and then bending a flat reinforcing panel around the exterior of the column. In general, when column panel cover 1800 is installed around a column, outer edges 1802, 1804 will be as close to each other as possible to completely close opening 1810 or make it as small as possible. Alternatively, outer edges 1802, 1804 may actually overlap. Regardless of whether edges 1802, 1804 overlap, mechanical fasteners as discussed herein may be used, both with and without epoxy, to fasten column panel cover 1800 to the column at least around a corner of the column along the seam formed by edges 1802, 1804. If desired, column panel cover 1800 may also be fastened around each edge as well as on each face/surface of the column. An adhesive may also be used with the mechanical fasteners to attach column panel cover 1800 to the column.

In another embodiment of the present invention, column panel cover 1800 in FIG. 18 may include two or more separate panels that may be manufactured and/or cut to fit against each side of the column so that the separate panels abut and/or overlap at each corner of the column. For example, column panel cover 1800 may include two L-shaped halves; a U-shaped piece that will cover three sides and a flat piece to cover the fourth side; and/or four separate flat pieces to cover each of the sides of the column.

FIG. 19 is a cross-sectional, top-view of an L-bracket for fastening a one or more-piece panel system around a concrete column, in accordance with an embodiment of the present invention. In FIG. 19, an L-bracket 1900, for example, 2 inch, 3 inch, 4 inch, etc. L-brackets with widths ranging from ½ inch to 4 inches or more, may be used with the mechanical fasteners to fasten column panel cover 1800 around a corner of the column. In general, multiple L-brackets 1900 with two or more fasteners per L-bracket may be evenly spaced along opening 1810 and over edges 1802, 1804 from the bottom to the top of column panel cover 1800 and anchored into the column. In an alternative embodiment, L-bracket 1900 may be a single piece with a width that may be substantially equal to the height of column panel cover 1800 to effectively completely cover opening 1810 and/or each outer edge of column panel cover 1800.

FIG. 20 is a cross-sectional, top-view of an L-channel bracket for fastening a one or more-piece panel system around a concrete column, in accordance with another embodiment of the present invention. In FIG. 20, an L-channel bracket 2000, for example, 2 inch, 3 inch, 4 inch, etc. L-channel brackets with widths ranging from ½ inch to 4 inches or more, may be used with the mechanical fasteners to fasten column panel cover 1800 to the column similar to L-bracket 1900. In general, multiple L-channel brackets 2000 with two or more fasteners per L-bracket will be evenly spaced along opening 1810 and edges 1802, 1804 may be inserted into channels 2005, 2010 in L-channel bracket from the bottom to the top of column panel cover 1800 and anchored around a corner of and into the column with fasteners that may pass through L-channel bracket 2000 and column panel cover 1800. In general, multiple L-channel brackets 2000 with two or more fasteners per L-channel bracket may be evenly spaced along opening 1810 and over edges 1802, 1804 from the bottom to the top of column panel cover 1800 and anchored into the column. In an alternative embodiment, L-channel bracket 2000 may be a single piece with a width that may be substantially equal to the height of column panel cover 1800 to effectively completely cover opening 1810 and/or each outer edge of column panel cover 1800.

FIG. 21 is a partial, cross-sectional, top-view of the L-bracket of FIG. 18 fastening a panel system for protecting a concrete column to a corner of the concrete column, in accordance with an embodiment of the present invention. In FIG. 21, a completed installation of column panel cover 1800 around a concrete column 2000 with L-bracket 1900 and two fasteners 2110 passing through L-bracket 1900, column panel cover 1800 and into concrete column 2000. Although not shown, an epoxy may also be used to adhere column panel cover 1800 to concrete column 2000 and attach fasteners 2110 in concrete column 2000.

FIG. 22 is a cross-sectional, top-view of a two-piece panel system for protecting concrete columns, in accordance with an embodiment of the present invention. In FIG. 22, a two-piece column panel cover 2200 is shown to include a first half 2210 and a second half 2220. Two-piece column panel cover 2200 may be installed using similar methods and fastening materials discussed above for column panel cover 1800 to cover the two openings present with two-piece column panel cover 2200.

FIG. 23 is a partially exposed side-view of a panel system for protecting concrete columns showing a diamond-like arrangement of a reinforcing layer, in accordance with an embodiment of the present invention. In FIG. 23, a column panel cover 2300 is seen to include a fabric/fiber layer 2310 arranged in a diamond-like pattern. Alternatively, fabric/fiber layer 2310 may also be arranged in a cross-hatch and/or overlapping pattern.

Figure 24:
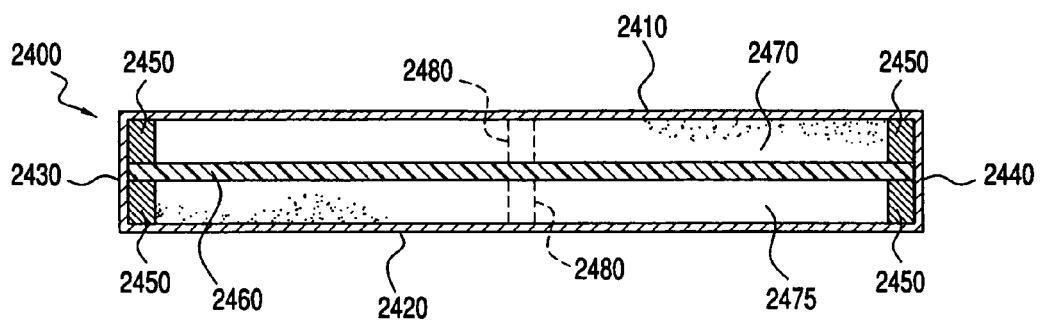
FIG. 24 is a partial cross-sectional, top-view of a hollow-core door with a shrapnel and projectile-resistant panel disposed within the door, in accordance with an embodiment of the present invention.

FIG. 24 is a partial cross-sectional, top-view of a hollow-core door with a shrapnel and projectile-resistant panel disposed within the door, in accordance with an embodiment of the present invention. In FIG. 24, a hollow-core door/wall section 2400 may include a first side 2410, an opposing second side 2420, a first end 2430, and an opposing second end 2440. One or more pieces of a structural support 2450 may run along substantially all of an inner surface of first end 2430 and an inner surface of second end 2440 from the bottom to the top of hollow-core door/wall section 2400. For example, structural support 2450 may be made of wood, metal, masonite, and/or composite. Although not shown, a similar structural support(s) may run across the top and bottom of hollow-core door/wall section 2400 to provide a complete structural internal frame. As seen in FIG. 24, a reinforcing panel 2460, in accordance with one or more of the embodiments described herein, may be disposed inside hollow-core door/wall section 2400 and between structural supports 2450. In general, reinforcing panel 2460 may extend substantially the entire width and height of hollow-core door/wall section 2400 and be fastened using any of the variety of fastening methods described herein. Any spaces 2470, 2475 between reinforcing panel 2460 and first side 2410 and second side 2420 may be empty and/or filled with foam, insulation, and/or other material to provide additional sound/thermal insulation, density and/or reinforcement. The reinforcing panel 2460 could also be extended to include flanges that extend onto one or more sides or ends of the door. For example, the flanges could extend onto the hinge-side portion of door 2400 and would allow the reinforcing panel 2460 to further be secured to the hinges (not shown) of the door 2400.

The basic construction of hollow-core door/wall section 2400, in FIG. 24, may be used to manufacture an aircraft cockpit door as well as bulkhead walls using materials suited for aircraft construction, for example, aluminum, carbon composite, etc. The reinforcing panels may also include one or more layers of fabric/fiber and be of a variable thickness. Examples of possible alternative embodiments of the reinforcing panels are described below in relation to FIGS. 27 and 28.

Hollow-core door/wall section 2400, in FIG. 24, also may be made as a pre-manufactured wall section 2400 using standard construction materials, for example, two inch by four inch (2×4) or larger (2×6, 2×8, etc.) board lumber. In such an embodiment of the present invention, wall section 2400, first end 2430 and second end 2440 may be, for example, 2×4 board and reinforcing panel 2460 may be just wide enough to fit between first edge 2430 and second edge 2440 and pairs of structural supports 2450 may be attached to first edge 2430 and one edge of reinforcing panel 2460 and second edge 2440 and the other edge of reinforcing panel 2460. Pre-manufactured wall section 2400 may also have one or more intermediate supports 2480 placed at substantially equal distances apart between first edge 2430 and second edge 2440. For example, in wall 2400, with first and second ends 2430, 2440 being a 2×4, each intermediate support 2480 may be a 2×2, 2×3, and/or a 2×4 board. In the case of intermediate support 2480 being a 2×4, intermediate support 2480 may have a slot cut down and through substantially the middle of the 4-inch side and along substantially the entire length of the 2×4 to permit reinforcing panel 2460 to pass therethrough. If pairs of 2×2, 2×3 and/or 2×4 boards are used reinforcing panel 2460 may be sandwiched between and attached to the pair. In this embodiment, first side 2410 and second side 2420 may be any standard building material, including, but not limited to, for example, drywall, plywood, particle board, foam-core insulation, and the like.

Figure 25:
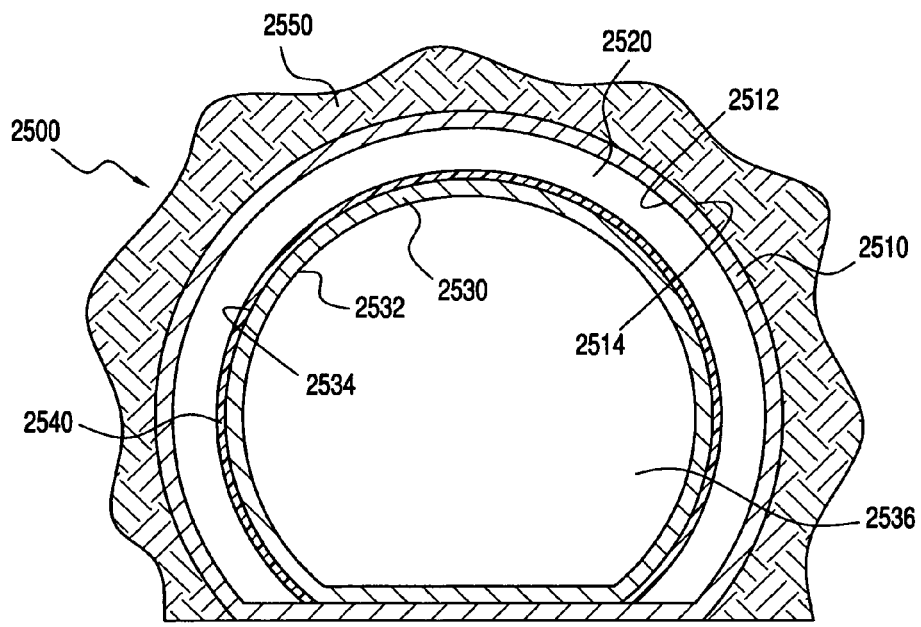
FIG. 25 is a partial cross-sectional, front-view of a two-tube tunnel system with a shrapnel and projectile-resistant panel disposed on an outside of an interior one of the two tubes, in accordance with an embodiment of the present invention.

FIG. 25 is a partial cross-sectional, front-view of a two-tube tunnel system with a shrapnel and projectile-resistant panel disposed on an outside of an interior one of the two tubes, in accordance with an embodiment of the present invention. In FIG. 25, a two-tube tunnel system 2500 may include an outer tunnel 2510 having an inner surface 2512 defining an outer tunnel open space 2520 and an outer surface 2514; and a smaller inner tunnel 2530 having an inner surface 2532 defining an inner tunnel open space 2536 and an outer surface 2534 disposed within open space 2520 such that inner tunnel 2530 does not completely fill open space 2520. For example, as seen in the embodiment in FIG. 25, inner tunnel 2530 and outer tunnel 2510 may each have substantially flat and co-planar bottom portions and substantially circular walls and a portion of open space 2520 remains unfilled by inner tunnel 2530. Other embodiments are contemplated in which the tunnels may have a variety of shapes, including, but not limited to, for example, a more rectangular shape with straight side walls and an arched roof, a triangular shape, etc. In addition, in still other embodiments, outer tunnel 2510 inner surface 2512 may have embodiments of panels installed thereon.

In FIG. 25, multiple protective panels 2540, which may be pre-manufactured using an elastomer using any of the designs disclosed herein both with and without one or more fabric/fiber layers. Each protective panel 2540 may be pre-manufactured with a contour having approximately the same shape as outer surface 2534 of inner tunnel 2530 and may be attached thereto using mechanical fasteners and/or epoxy to seal outer surface 2534 of inner tunnel 2530. Alternatively, the elastomer and/or fiber/fiber layers may be directly applied to outer surface 2534 of inner tunnel 2530. However, in general, for the direct application to be successful, outer surface 2534 of inner tunnel 2530 should be clean and dry.

Figure 26:
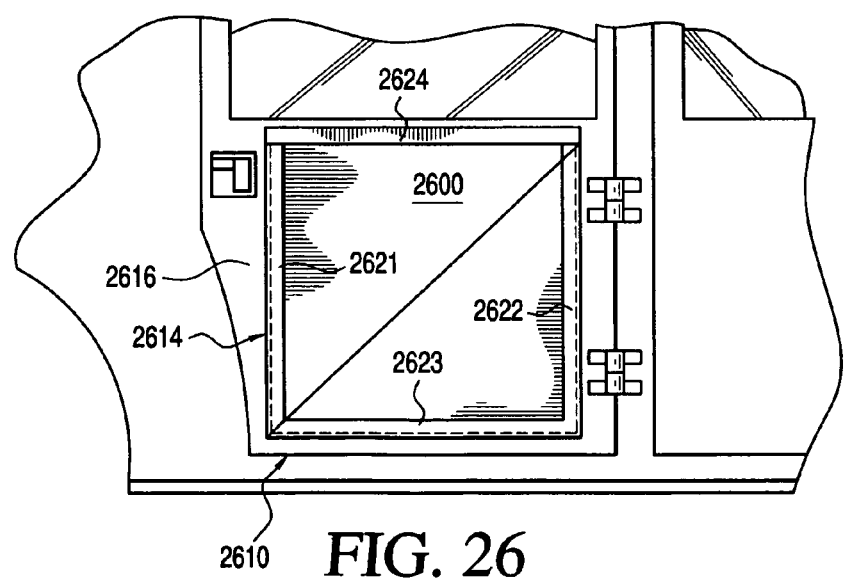
FIG. 26 is a side-view of a removable shrapnel and projectile-resistant door panel disposed on an interior surface of the door, in accordance with an embodiment of the present invention.

FIG. 26 is a side-view of a removable shrapnel and projectile-resistant door panel disposed on an interior surface of a door of a vehicle, in accordance with an embodiment of the present invention. In FIG. 26, a shrapnel and projectile-resistant door panel 2600 is shown positioned on a door 2610 in a channel holding unit 2614 on an inside surface 2616 of door 2610. In the embodiment shown in FIG. 26, shrapnel and projectile-resistant door panel 2600 is removable, however, embodiments are contemplated in which shrapnel and projectile-resistant door panel 2600 may be permanently fastened to inside surface 2616 of door 2610 as well as throughout the interior surface of the vehicle.

In general, channel holding unit 2614 may include a left-upright channel 2621, a right-upright channel 2622, and a bottom channel 2623 connected to bottom ends of each of left-upright channel 2621 and right-upright channel 2622, all of which may be permanently fastened to inside surface 2616 of door 2610. Channel holding unit 2614 may also include a top channel 2624 that may be connected at either end to a top portion of each of left-upright channel 2621 and right-upright channel 2622. In general, channel holding unit 2614 is made from U-channel shaped material, as previously described herein, for example, in relation to FIGS. 4, 13 and 14. Alternatively, top channel 2624 may be permanently attached to shrapnel and projectile-resistant door panel 2600 and may be configured to be removably connected to each of left-upright channel 2621 and right-upright channel 2622. For example, top channel 2623 and left-upright channel 2621 and right-upright channel 2622 may have cooperating latch and/or locking mechanisms to permit the removable installation of shrapnel and projectile-resistant door panel 2600 in channel holding unit 2614. In addition, hand tightenable fasteners may be permanently affixed to and pass through each channel 2621, 2622, 2623, 2624 and pass through shrapnel and projectile-resistant door panel 2600 to engage and affix to door 2610.

In FIG. 26, in accordance with an alternative embodiment of the present invention, left-upright channel 2621 and right-upright channel 2622 may be configured as slotted channels similar to that described above in relation to FIG. 14. Accordingly, the left and right edges of shrapnel and projectile-resistant door panel 2600, as shown and described in FIG. 14, may also be keyed to fit within the slotted channels in left-upright channel 2621 and right-upright channel 2622. Because embodiments of shrapnel and projectile-resistant door panel 2600 include the panel being removable, shrapnel and projectile-resistant door panel 2600 may be taken from the vehicle and similarly installed on an interior wall of a building in which personnel traveling in the vehicle may be located.

In addition, in accordance with another embodiment of the present invention, shrapnel and projectile-resistant door panel 2600 may be configured to be a floor panel that would, in general most likely be permanently mounted on a floor of a vehicle. For example, the floor panel could be contoured to match the shape of the floor and predrilled to accept bolts extending upwardly from the floor on which washers and nuts may be affixed to attach the floor panel to the floor of the vehicle. The floor panel could be contoured to the shape of the floor by manufacturing the floor panel in mold having the shape of the floor of the vehicle or heating and working a substantially flat panel to conform to the shape of the floor. In general, the floor panel could have a thickness ranging from approximately ¼ of an inch to ¾ of an inch or more.

Figure 27:
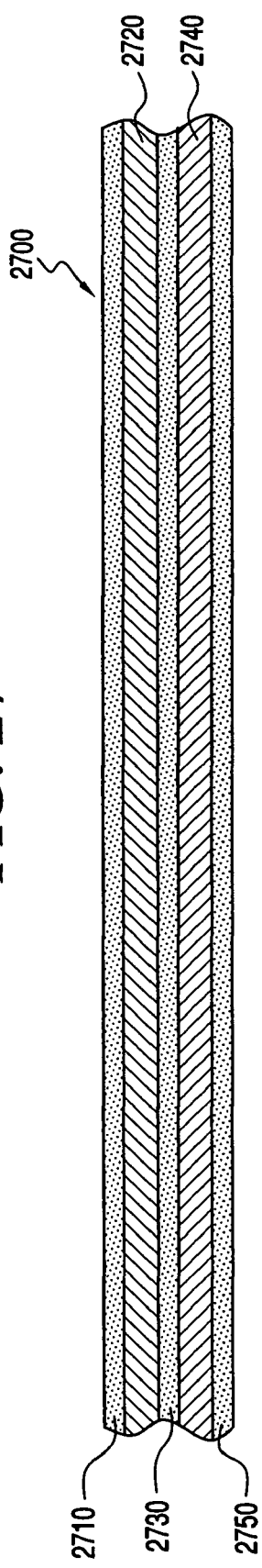
FIG. 27 is a side-view of a multi-layer shrapnel and projectile-resistant panel, in accordance with an embodiment of the present invention.

FIG. 27 is a side-view of a multi-layer shrapnel and projectile-resistant panel, in accordance with an embodiment of the present invention. In FIG. 27, a reinforcing panel 2700 with two-layers of fabric/fiber embedded therein includes a top layer of elastomer 2710 on top of a top layer of fabric/fiber 2720, which is on top of a middle layer of elastomer 2730, which is on top of a bottom layer of fabric/fiber 2740, and which is on top of a bottom layer of elastomer 2750.

Figure 28:
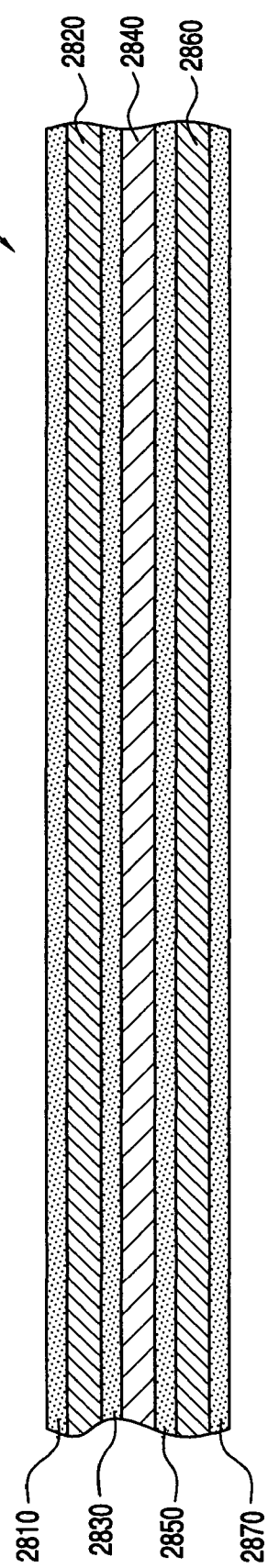
FIG. 28 is a side-view of a multi-layer shrapnel and projectile-resistant panel, in accordance with another embodiment of the present invention.

In general, the fabric/fiber layers in FIG. 28 may include an open weave fabric, such as, for example, the fabric described previously that is made from Technora and Twaron-brand aramid yarns or fibers from Teijin. In addition, the layers may be offset and/or laid in alternating patterns to minimize the size of any openings between the open weaves of each layer of fabric/fiber. Embodiments of reinforcing panel 2700 may provide resistance against ballistic projectiles.

FIG. 28 is a side-view of a multi-layer shrapnel and projectile-resistant panel, in accordance with another embodiment of the present invention. In FIG. 28, a reinforcing panel 2800 with three-layers of fabric/fiber embedded therein includes a first layer of elastomer 2810 on top of a first layer of an open weave fabric/fiber 2820, which is on top of a second layer of elastomer 2830, which is on top of a second layer of a tight weave fabric/fiber 2840, which is on top of a third layer of elastomer 2850, which is on top of a third layer of open weave fabric/fiber 2860, which is on top of a fourth layer of elastomer 2870. As seen in the embodiment in FIG. 28, although tight weave fabric/fiber 2840 is in between the two layers of open weave fabric/fiber 2820, 2860, other embodiments are contemplated in which the order of layers of fabric/fiber may be the opposite of FIG. 28, as well as any of the other various possible combinations. Although reinforcing panel 2800 of FIG. 28 may only have three layers of fabric/fiber, other embodiments are contemplated in which many more layers of fabric/fiber may be used, and the direction of the fabric/fiber in each layer may be offset from the other fabric layers. For example, this offset may be accomplished by rotating an orientation of each subsequent layer of fabric/fiber, for example, but not limited to, a fixed degree amount around a circle, such as, 1, 2, 3, etc. degrees. In addition, embodiments are contemplated in which the fabric/fiber layers are layered on each other and epoxied together and then coated with elastomer.

In general, the fabric/fiber layers include a fabric, such as, for example, the fabric described previously that is made from Technora and Twaron-brand aramid yarns or fibers from Teijin. In addition, the layers may be offset and/or laid in alternating patterns to minimize the size of any openings between the open weaves of each layer of fabric/fiber. Embodiments of reinforcing panel 2800 may provide resistance against ballistic projectiles.

Figure 29:
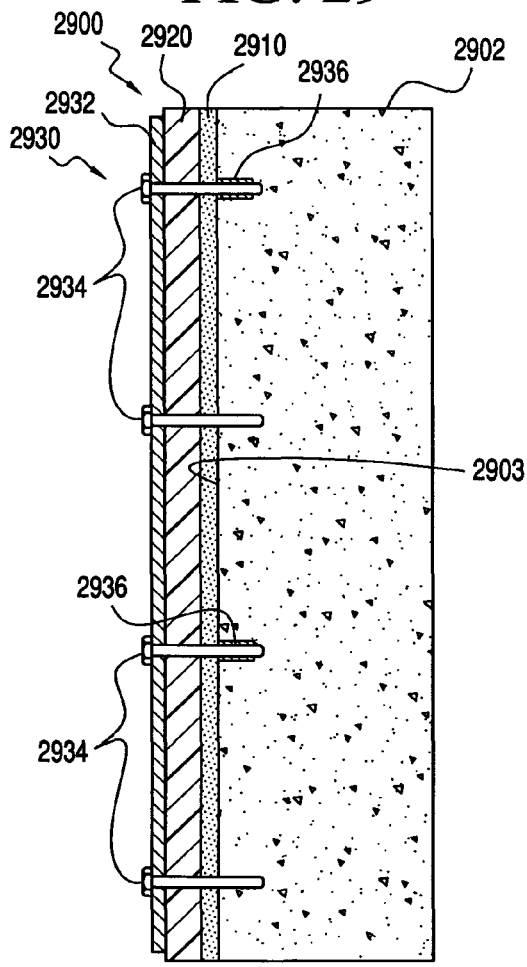
FIG. 29 is a side-view of a shrapnel and projectile-resistant panel directly applied over a release agent on and fastened with mechanical fasteners to a surface of a structure, in accordance with an embodiment of the present invention.

FIG. 29 is a cross-sectional side-view of a shrapnel and projectile-resistant panel directly applied over a release agent on and fastened with mechanical fasteners to a surface of a structure, in accordance with an embodiment of the present invention. In FIG. 29, an installation 2900, in accordance with an embodiment of the present invention, may include a structural wall 2902 of a building and/or structure with a release agent 2910 applied to a surface 2903 of structural wall 2902. Release agent 2910 may be applied by spraying, brushing, rolling, trolling, etc. it onto surface 2903 and release agent 2910 may include, for example, but not limited to, polytetra-flouroethylene (PTFE), oil, wax, silicon, and other release agents. Structural wall 2902 may also be a floor and/or ceiling. A layer of elastomer 2920 may be directly applied to surface 2903 similar to and over release agent 2910 and fastened to structural wall 2902 using a mechanical fastening system 2930. Mechanical fastening system 2930 may include a continuous metal fastening strip/flange 2932, multiple metal fastening elements 2934 and an anchoring mechanism 2936 (e.g., epoxy, concrete anchors, etc.) to help secure metal fastening element 2934 in structural wall 2902. Other embodiments of mechanical fastening system 2930 may include any of the fastening systems described above in FIGS. 9, 10 and/or 11.

Figure 30:
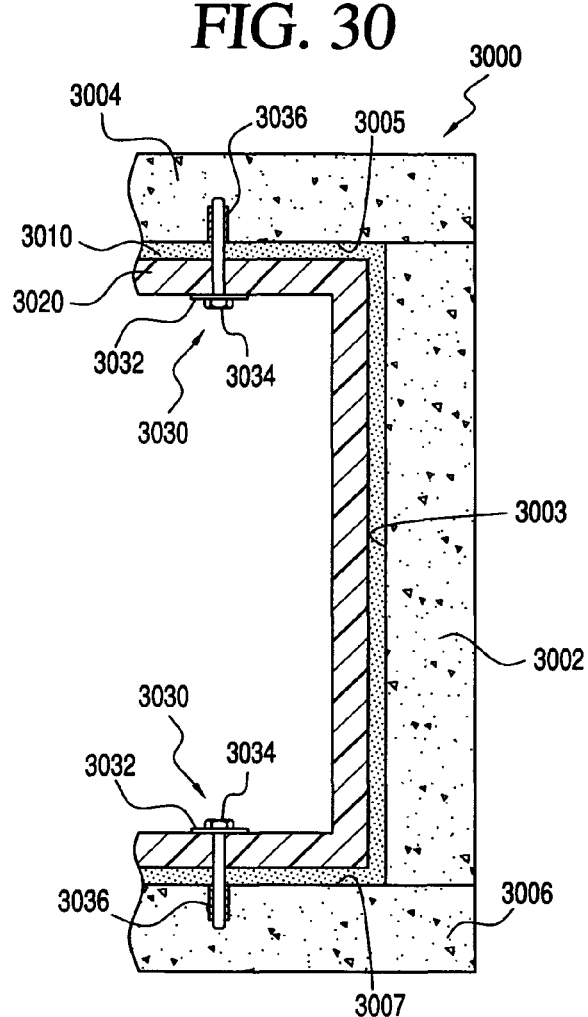
FIG. 30 is a side-view of a shrapnel and projectile-resistant panel directly applied over a release agent on and fastened with mechanical fasteners to surfaces of a structure, in accordance with another embodiment of the present invention.

FIG. 30 is a cross-sectional side-view of a shrapnel and projectile-resistant panel directly applied over a release agent on and fastened with mechanical fasteners to a surface of a structure, in accordance with another embodiment of the present invention. In FIG. 30, an installation 3000, in accordance with an embodiment of the present invention, may include a structural wall 3002 connected at a top end to a structural top slab 3004 and connected at a bottom end to a structural bottom slab 3006 of a building and/or structure with a release agent 3010 applied to a surface 3003 of structural wall 3002, a surface 3005 of top slab 3004 and to a surface 3007 of bottom slab 3006. Release agent 3010 may be applied by spraying, brushing, rolling, trolling, etc. it onto surfaces 3003, 3005, 3007 and release agent 3010 may include, for example, but not limited to, polytetraflouroethylene (PTFE), oil, wax, silicon, and other release agents.

A layer of elastomer 3020 may be similarly directly applied to and over release agent 3010 that is on surfaces 3003, 3005, 3007 and fastened to structural top slab 3004 and structural bottom slab 3006 using a mechanical fastening system 3030. Elastomer 3020 also may be fastened to structural wall 3002 as shown in FIG. 29 using mechanical fastening system 3030. Mechanical fastening system 3030 may include a continuous metal fastening strip/flange 3032, a metal fastening element 3034 and an anchoring mechanism 3036 (e.g., epoxy, concrete anchors, etc.) to help secure metal fastening element 3034 in structural wall 3002. Other embodiments of mechanical fastening system 3030 may include any of the fastening systems described above in FIGS. 9, 10 and/or 11.

Figure 31:
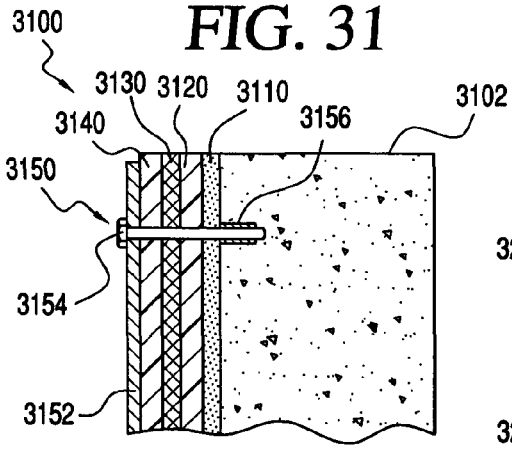
FIG. 31 is a side-view of a shrapnel and projectile-resistant panel with a fabric/fiber reinforcing layer between two layers of elastomer directly applied over a release agent on and fastened with mechanical fasteners to a surface of a structure, in accordance with another embodiment of the present invention.

FIG. 31 is a cross-sectional side-view of a shrapnel and projectile-resistant panel with a fabric/fiber reinforcing layer between two layers of elastomer directly applied over a release agent on and fastened with mechanical fasteners to a surface of a structure, in accordance with another embodiment of the present invention. In FIG. 31, an installation 3100, in accordance with an embodiment of the present invention, may include a structural wall 3102 of a building and/or structure with a release agent 3110 applied to a surface 3103 of structural wall 3102. Release agent 3102 may be applied by spraying, brushing, rolling, trolling, etc. it onto surface 3103. Structural wall 3102 may also be a floor and/or ceiling. A first layer of elastomer 3120 may be directly applied to surface 3103 similar to and over release agent 3110.

A fabric/fiber layer 3130 may be adhered to first layer of elastomer 3120 and a second layer of elastomer 3140 may be applied using one of the above-described methods over fabric/fiber layer 3130 and all of the layers may be fastened to structural wall 3102 using a mechanical fastening system 3150. Mechanical fastening system 3150 may include a continuous metal fastening strip/flange 3152, a metal fastening element 3154 and an anchoring mechanism 3156 (e.g., epoxy, concrete anchors, etc.) to help secure metal fastening element 3154 in structural wall 3102. Other embodiments of mechanical fastening system 3150 may include any of the fastening systems described above in FIGS. 9, 10 and/or 11.

Figure 32:
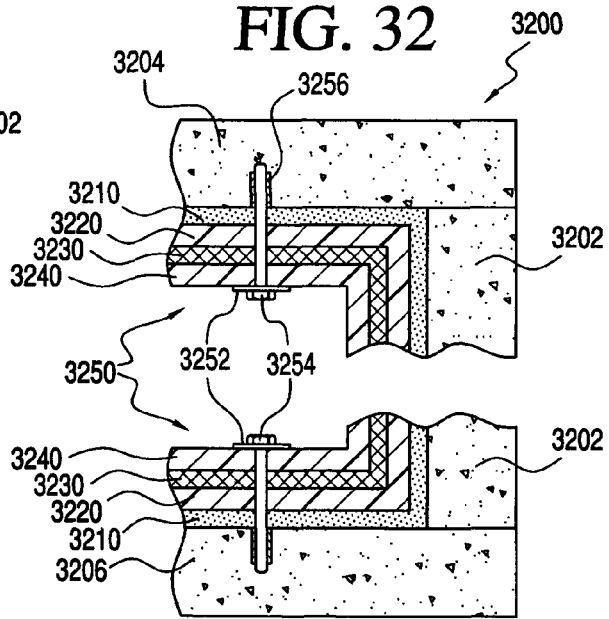
FIG. 32 is a side-view of a shrapnel and projectile-resistant panel with a fabric/fiber reinforcing layer between two layers of elastomer directly applied over a release agent on and fastened with mechanical fasteners to surfaces of a structure, in accordance with another embodiment of the present invention.

FIG. 32 is a cross-sectional side-view of a shrapnel and projectile-resistant panel with a fabric/fiber reinforcing layer between two layers of elastomer directly applied over a release agent on and fastened with mechanical fasteners to surfaces of a structure, in accordance with another embodiment of the present invention. In FIG. 32, an installation 3200, in accordance with an embodiment of the present invention, may include a structural wall 3202 connected at a top end to a structural top slab 3204 and connected at a bottom end to a structural bottom slab 3206 of a building and/or structure with a release agent 3210 applied to a surface 3203 of structural wall 3202, a surface 3205 of top slab 3204 and to a surface 3207 of bottom slab 3206. Release agent 3210 may be applied by spraying, brushing, rolling, trolling, etc. it onto surfaces 3203, 3205, 3207.

A layer of elastomer 3220 may be similarly directly applied to release agent 3210 that is on surfaces 3203, 3205, 3207. A fabric/fiber layer 3230 may be adhered to first layer of elastomer 3220 and a second layer of elastomer 3240 may be applied using one of the above-describe methods over fabric/fiber layer 3230 and all of the layers may be fastened to structural top slab 3204 and structural bottom slab 3206 using a mechanical fastening system 3250. Elastomer 3220 also may be fastened to structural wall 3202 as shown in FIGS. 29, 30 and/or 31 using mechanical fastening system 3250. Mechanical fastening system 3250 may include a continuous metal fastening strip/flange 3252 and a metal fastening element 3254 and an anchoring mechanism 3256 (e.g., epoxy, concrete anchors, etc.) to help secure metal fastening element 3254 in structural wall 3202. Other embodiments of mechanical fastening system 3250 may include any of the fastening systems described above in FIGS. 9, 10 and/or 11.

Figure 33:
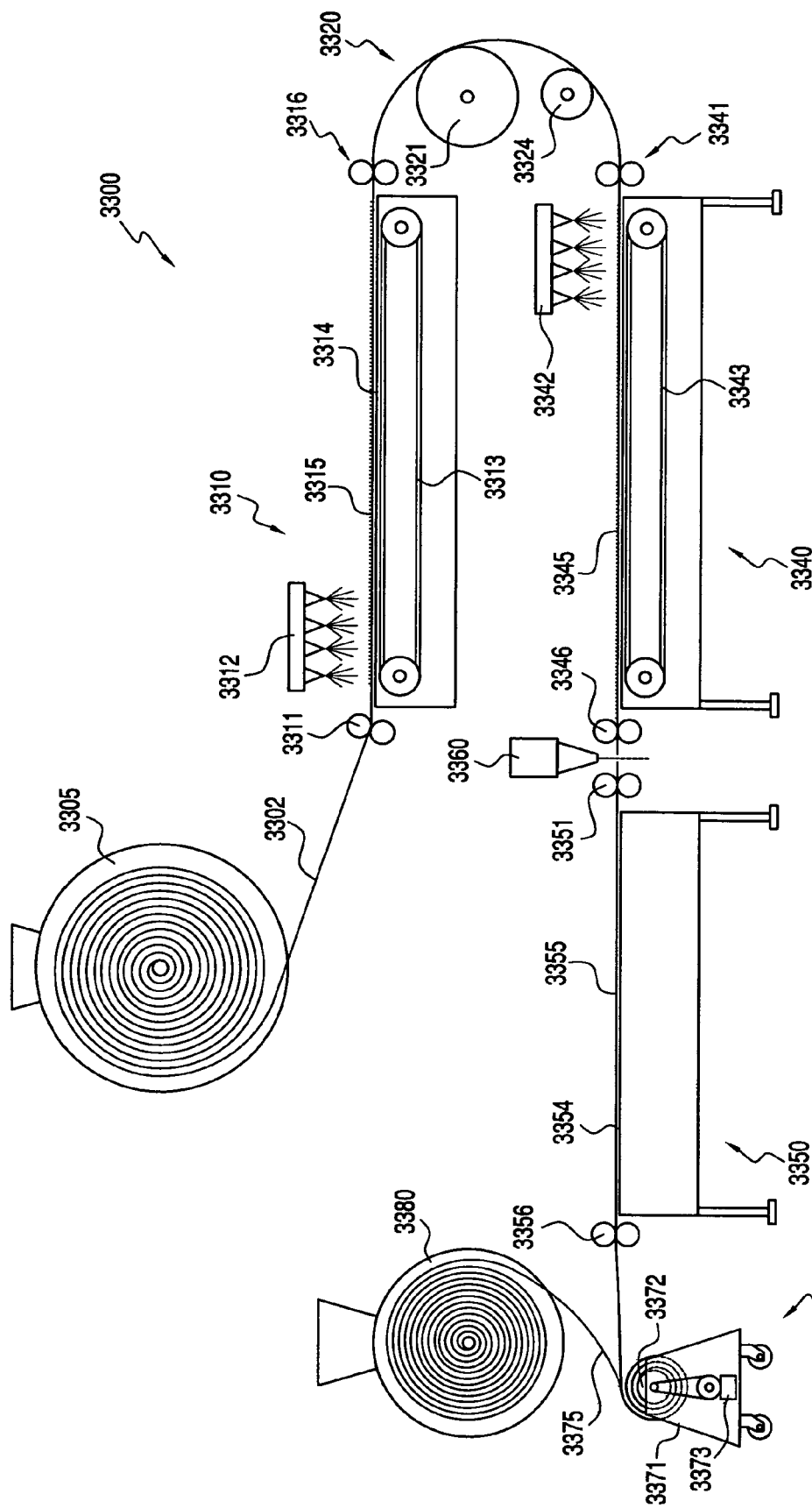
FIG. 33 is a side-view of an automatic shrapnel and projectile-resistant panel manufacturing system, in accordance with an embodiment of the present invention.

FIG. 33 is a side-view of an automatic shrapnel and projectile-resistant panel manufacturing system, in accordance with an embodiment of the present invention. In FIG. 33, an automatic shrapnel and projectile-resistant panel manufacturing system 3300 may include a first spray application section 3310, which may include a first pair of drive rollers 3311 to help pull a fabric/fiber layer 3302 off a fabric/fiber roller system 3305 and into first spray application section 3310. First spray application section 3310 may further include one or more automatic first spray nozzles 3312 to spray the elastomer onto a first side of fabric/fiber layer 3302 a conveyer system 3313 (e.g., but not limited to, a conveyor belt system) to form an intermediate panel layer 3315 move the combined fabric/fiber layer 3302 and first layer of elastomer 3314 through first spray application section 3310. First spray application section 3310 may still further include a second pair of drive rollers 3316 located at an output end of first spray application section 3310. Second pair of drive rollers 3316 may operate to pull intermediate panel layer 3315 out of first spray table section 3310 and feed it into a turning section 3320 that may be operatively connected to the output end of first spray application section 3310 to receive intermediate panel layer 3315.

In FIG. 33, turning section 3320 may include at least one large roller/drum 3321, or a structure to perform the equivalent function, and may also include one or more smaller drums 3324 around which intermediate panel layer 3315 may pass and be effectively turned so that fabric/fiber layer 3302 in intermediate panel layer 3315 is facing up as it is pulled into second spray table section 3340 through third drive rollers 3341. Although turning section 3320 may appear to operate to flip intermediate panel layer 3315 through a U-shaped turn, which results in what may appear to be a two-level configuration for automatic panel manufacturing system 3300, other configurations and turn shapes are contemplated.

For example, one or more rollers at an angle(s) to and disposed after and at a level above spray table section 3310 to completely turn intermediate panel layer 3315. For example, a single roller placed at the end of spray table section 3310 and at a 45 degree angle from the path of travel of intermediate panel layer 3315 so that when intermediate panel layer 3315 travels over the roller, the second side of the fabric layer is revealed and intermediate panel layer 3315 may now be traveling at a substantially 90 degree angle to the path of travel of the intermediate panel layer 3315 while on spray table section 3310. At this point intermediate panel layer 3315 will likely be at a level above the surface of spray table section 3310 so that second spray table section 3310 may need to be higher or intermediate panel layer 3315 may need to be returned to its pre –45 degree roller height. This may be effectuated by, for example, passing intermediate layer 3315 beneath a roller that is disposed at a 90 degree angle in from of second spray table section 3310 and at substantially the same height as the 45 degree roller height.

Alternatively, in another embodiment of turning section 3320 in FIG. 33, a three roller system may be implemented with, for example, a first roller at a 45 degree angle as in the previously described embodiment. The three roller system may also include a second roller at a 90 degree angle to the end of spray table section 3310 parallel to the path of travel of intermediate panel layer 3315 on spray table section 3310 and above the first roller to permit intermediate panel layer 3315 to pass beneath the second roller and wrap back around the second roller so that intermediate panel layer 3315 is traveling 180 degrees in the opposite direction.

The three roller system may finally include a third roller at an opposite 45 degree angle to the first roller and third roller may be disposed at a level above the first and second rollers and be physically disposed substantially directly above the first roller so that, from above, the first roller and the third roller may appear to form an "X" shape. Intermediate panel layer 3315 may travel beneath and wrap over the third roller so that intermediate panel layer 3315 is again traveling in substantially the same direction and path as it was on spray table section 3310, albeit at a slightly elevated level.

If desired, returning intermediate panel layer 3315 to the same level it was on spray table section 3310 may be effectuated using an additional roller after the third roller that may be located just before second spray table section 3340 at a substantially equivalent height to the first roller and at a 90 degree angle across the path of intermediate panel layer 3315 and passing intermediate panel layer 3315 beneath the additional roller and onto second spray table section 3340. Of course, the above alternatives may also be implemented with the rollers below and/or above the surface of each of spray table section 3310 and second spray table section 3340, as appropriate.

It should clear that the above alternative roller embodiments for turning section 3320 are merely illustrative and in no way should be construed as the only, nor to limit the, contemplated possible embodiments.

Second spray table section 3340 may further include one or more automatic second spray nozzles 3342 to spray the elastomer onto a second side of fabric/fiber layer 3302 and another conveyer system 3343 (e.g., but not limited to, a conveyor belt system, multiple free-moving rollers, etc.) to form a final panel layer 3345 and move final panel layer 3345 through and out of second spray table section 3340. Second spray table section 3340 may still further include a fourth pair of drive rollers 3346 located at an output end of second spray table section 3340. Fourth pair of drive rollers 3346 may operate to pull final panel layer 3345 out of second spray table section 3340 and feed it into a finishing section 3350 that may be operatively connected to the output end of second spray application section 3340 to receive final panel layer 3315 through a fifth pair of drive rollers 3351.

Fifth pair of drive rollers 3351 may operate to pull final panel layer 3345 into and through finishing section 3350 across a finishing bed 3354 and into a sixth pair of drive rollers 3356. Sixth pair of drive rollers 3356 may operate to pull final panel layer 3345 across finishing bed 3354 and out of finishing section 3350. A cutting apparatus 3360 may be disposed between second spray application section 3340 and finishing section 3350 and, if desired, may cut final panel layer 3345 into panels 3355 of predetermined lengths. Cutting apparatus 3360 may include a large blade, an anvil cutter, a high-pressure water-jet cutter, and/or any other cutting mechanism that can quickly cut across the entire width of final panel layer 3345 and not impede the movement of final panel layer 3345 through second spray table section 3340. Alternatively, in another embodiment, cutting apparatus 3360 may be disposed at the output end of finishing section 3350 proximal to sixth pair of drive rollers 3356. Alternatively, cutting apparatus 3360 may insert perforations in final panel layer in any orientation.

In FIG. 33, automatic panel manufacturing system 3300 may also include a take-up system 3370 that may include a take-up roller system 3371 to receive final panel layer 3345 as it exits finishing section 3350 through sixth pair of drive rollers 3356. Take-up roller system 3371 may include a roller 3372 driven by a motor 3373 to which a leading end width of final panel layer 3345 may be attached and around which it may be wound. Roller 3372 may receive an empty pressed board or the like take up roll. A leading edge of final panel layer 3345 may be attached to the take up roll and a thin plastic sheeting 3375, for example, similar to a plastic wrap, may be supplied from a roll of plastic sheeting 3380 and applied to a side of final panel layer 3345 as it is being rolled on roller 3372 to help prevent final panel layer 3345 from sticking to itself while rolled up.

Figure 34:
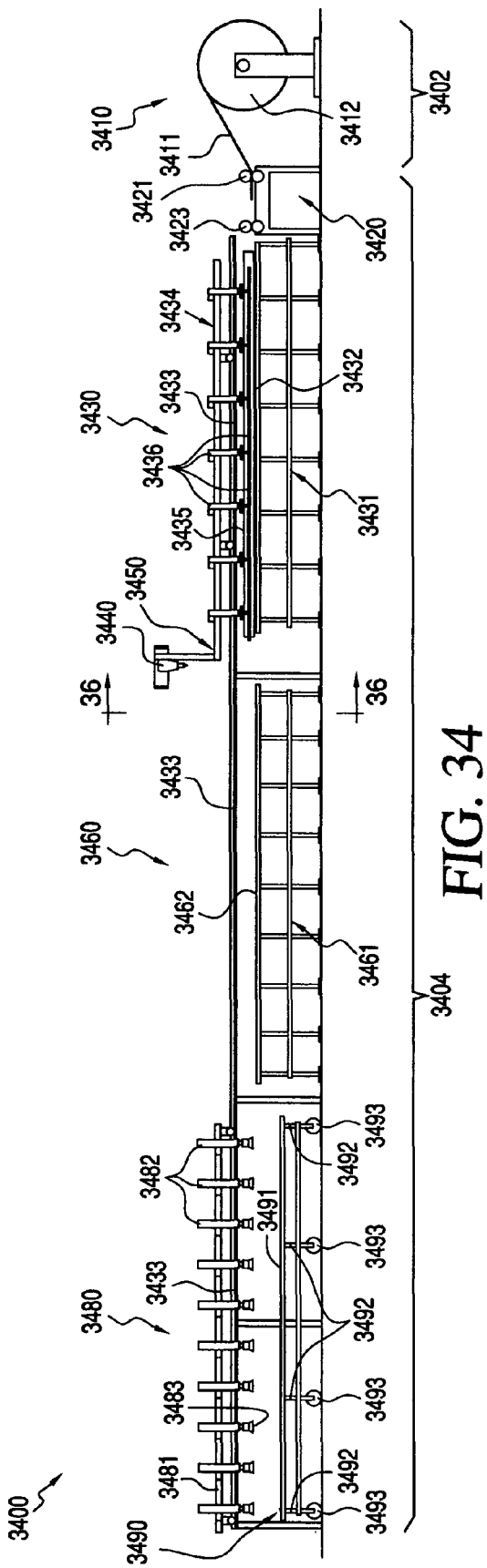
FIG. 34 is a side-view of an automatic shrapnel and projectile-resistant panel manufacturing system, in accordance with another embodiment of the present invention.
Figure 35:
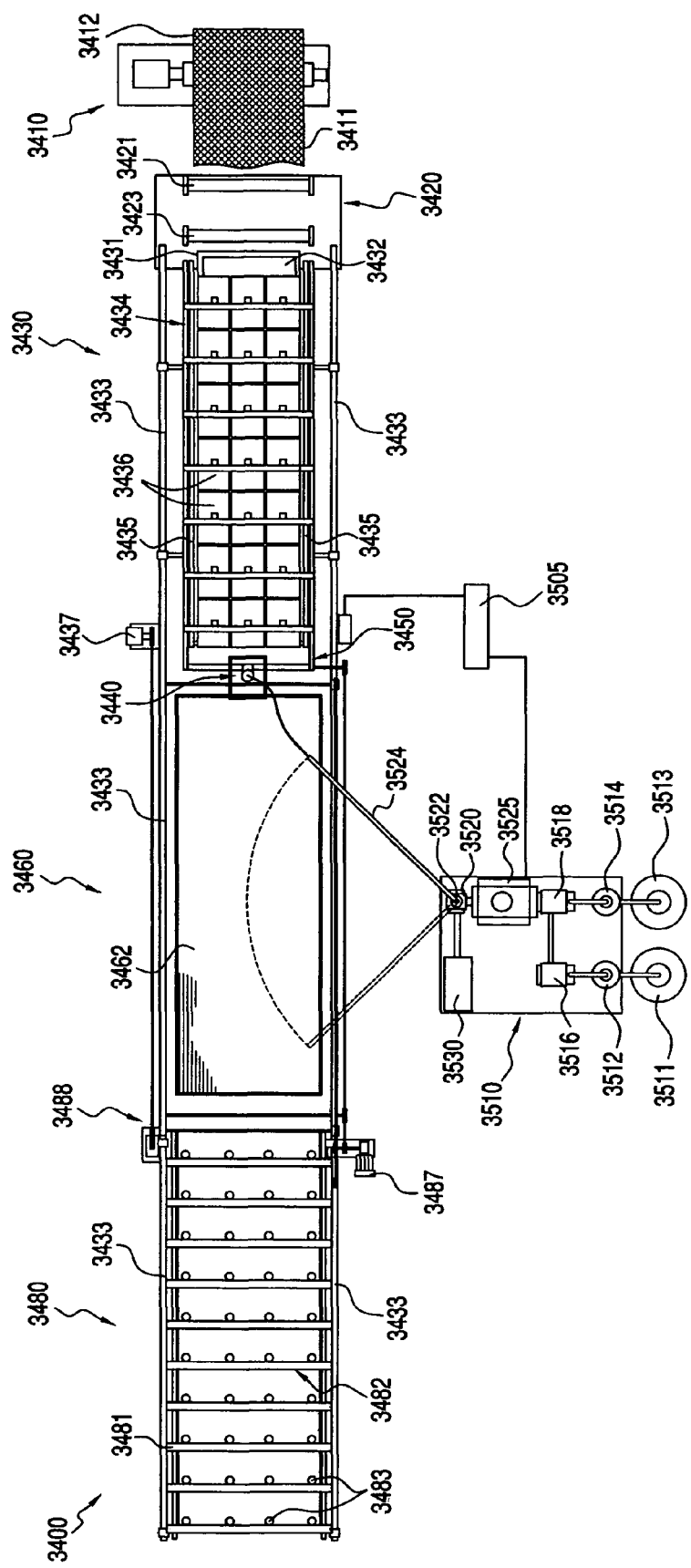
FIG. 35 is a top-view of the automatic shrapnel and projectile-resistant panel manufacturing system in FIG. 34, in accordance with an embodiment of the present invention.

FIG. 34 is a side-view and FIG. 35 is a top-view of an automatic shrapnel and projectile-resistant panel manufacturing system, in accordance with another embodiment of the present invention. In FIGS. 34 and 35, an automatic shrapnel and projectile-resistant panel manufacturing system 3400 may include a fabric supply system 3402 to supply a fabric to a panel manufacturing system 3404.

Fabric supply system 3402 that may include a fabric supply subsystem 3410 operative to feed fabric 3411 from a roll 3412 to a fabric feeder/cutter 3420. Fabric feeder/cutter 3420 may include a tensioning roller 3421 to receive fabric 3411 from roll 3412 and a feeder roller/drive 3423 that may be operative to pull fabric 3411 across tensioning roller 3421 and feed fabric 3411 into a fabric table section 3430 in panel manufacturing system 3404. Feeder roller/drive 3423 may include an electrical drive unit to drive one or more rollers to feed fabric 3411 into fabric table section 3430 and a cutter mechanism after the one or more rollers to cut fabric 3411 into sheets having desired lengths for manufacturing a panel. Panel manufacturing system 3404 may also include a spray table section 3460 connected to fabric table section 3430 at an end opposite to fabric feeder/cutter 3420 and a panel peeler section 3480 connected at an opposite end of spray table section 3460.

Fabric table section 3430, in FIGS. 34 and 35, may include a fabric table 3431 having a table surface 3432 at substantially the same height as the height at which feeder roller/drive 3423 may output fabric 3411. Table surface 3432 may be implemented as a solid surface, a series of substantially parallel to each other rollers across a width of table surface 3432, set of substantially equivalently spaced rails along a length of table surface 3432, etc. Fabric table section 3430 may further include a guide rail 3433 that may be affixed to and run above fabric table 3431 to permit a fabric carriage 3434 to travel back and forth along it. Guide rail 3433 may run along the entire length of and be affixed to the other sections of panel manufacturing system 3404, including spray table section 3460 and panel peeler section 3470. Fabric carriage 3434 may include a fabric clamping mechanism 3435 that may operate to grab a cut sheet of fabric 3411 longitudinally along opposite sides of the cut sheet, lift it off table surface 3432 and to tension the cut sheet of fabric 3411 by pulling it taught it across its width. Fabric carriage 3434 may still further include a fabric tamping mechanism 3436, which may be moveably connected to a top portion of fabric carriage 3434 and disposed between the top portion of fabric carriage 3434 and table surface 3432. Fabric tamping mechanism 3436 may be of approximately the same size as the sheet of fabric 3411 and may include a single section or multiple, separately controlled sections that may move up and down relative to table surface 3432. In general, fabric tamping mechanism 3436 will be made of and/or coated with a material to which the polymer used to manufacture the panel does not stick. For example, this may include, but is not limited to, polytetrafluoroethylene (PTFE), oil, wax, silicon, and other non-stick materials.

Fabric carriage 3434 may still further include a first drive mechanism 3437 located near a front end 3450 of fabric carriage 3434 and first drive mechanism 3737 may operate to move fabric carriage 3434 to and from spray table 3460 along guide rails 3433 or, alternatively, may move a panel peeler assembly 3482 from panel peeler section 3480 to and from spray table 3460 along guide rails 3433. Fabric carriage 3434 may still further include a spray gun 3440 affixed to front end 3450 of fabric carriage 3434. In general, spray gun 3440 may be rigidly affixed to fabric carriage 3434 to ensure that an even and consistent distribution of polymer may be obtained from spray gun 3440.

In accordance with an embodiment of the present invention, spray table section 3460 may include a spray table 3461 having a substantially flat spray table surface 3462 with a length and width appropriate to produce a variety of different, generally rectangular, panel sizes. For example, in one embodiment, spray table surface 3462 may be rectangular in shape and at least 48 inches wide by approximately 15 feet in length. Alternatively, spray table surface 3462 may be larger and/or smaller, but, in general, spray table surface 3462 is not designed to be quickly and easily removed/replaced. In order to facilitate the production of smaller panels, spray table surface 3461 may have attachable thereto a variety of smaller table surfaces and the system may be programmed to cut fabric to different sizes, spray elastomer in a specific pattern (including, but not limited to, for example, a smaller rectangle, a square, an oval, an ellipse, a circle, a parallelogram, etc.) only on the smaller table surface, accurately place the cut fabric on the sprayed elastomer on smaller table surface, and selectively pick up and remove the finished panel from the smaller table surface. Although this may not be as efficient as manufacturing a larger panel and then cutting it into smaller sections for standard rectangular sizes (for example, 2 feet by 4 feet, etc.), these components and this procedure may prove beneficial in producing specially configured panels with non-rectangular shapes. Moreover, the spray table surface 3462 may include a pattern or design such that the pattern or design is imparted into the surface of the finished panel. For example, the pattern or design may be multi-dimensional and for aesthetic purposes and/or multi-dimensional to enhance utility of the panel such as sound deadening/dissipation capabilities.

In addition, the system may be configured to selectively spray the elastomer on spray table surface 3462 to provide pre-manufactured panels with openings (for example, window and door openings) having predetermined sizes and being located at predetermined positions on the panel. In general, the sheet of fabric 3411 cut from fabric roll 3412 will not have an opening precut for the window or door, but instead will be left intact to provide stability for handling and shipping and to permit it to be appropriately cut and wrapped around structural wall elements during installation. For example, in a panel with a pre-manufactured rectangular window, the fabric from the sheet of fabric 3411 may be cut across both diagonals to create four essentially triangular flaps of fabric 3411 that may be wrapped around and fastened to the framing for the window. A similar process may be used for differently shaped windows as well as doors and other openings (for example, heating and cooling vents, electrical outlets, etc.).

Panel peeler section 3480 may include a panel peeler frame 3481, a panel peeler assembly 3482 moveably engaged with panel peeler frame 3481 and capable of movement to and from spray table section to pick up and return with a finished panel. Panel peeler assembly 3482 may include selectively engageable panel pickup elements 3483 that may be symmetrically arranged in a pattern over an area equivalent in size to spray table surface 3462. Panel peeler assembly 3482 may further include a second drive mechanism 3487 located near a back end 3488 of panel peeler assembly 3482 and second drive mechanism 3487 may operate to move fabric carriage 3434 to and from spray table 3460 along guide rails 3433 or, alternatively, may move panel peeler assembly 3482 from panel peeler section 3480 to and from spray table 3460 along guide rails 3433.

In FIG. 35, automatic shrapnel and projectile-resistant panel manufacturing system 3400 may further include a control panel 3505 that may be separately in communication with and in control of each element in automatic shrapnel and projectile-resistant panel manufacturing system 3400, a plural component metering machine 3510 that may be in fluid communication with spray gun assembly 3440. Machine 3510 may include a pair of fluid storage tanks 3511, 3513 for separately storing a polymer base and an isocyanate and a pair of heat exchangers 3512, 3514 for cooling the return polymer base and the isocyanate on their return to their respective storage tanks 3511, 3513. Machine 3510 may also include a hydraulic pump system 3516, 3518, 3525 with each being coupled to only one of the pair of fluid storage tanks 3511, 3513. Hydraulic pump system 3516, 3518, 3525 may also be in fluid communication with spray gun 3440 via multiple supply lines that may be supported by a swing arm unit 3520 that may include a two-part, rotatable upright portion 3522 having a fixed lower portion and a rotatable upper portion, which may be fixedly attached to a boom portion 3524 so that rotatable upper portion and boom portion 3524 may move in concert with spray gun 3440. Machine 3510 may also include a power supply for powering the spray gun 3440 and hydraulic pump system 3516, 3518, 3525 all under the control of control panel 3505.

Figure 36:
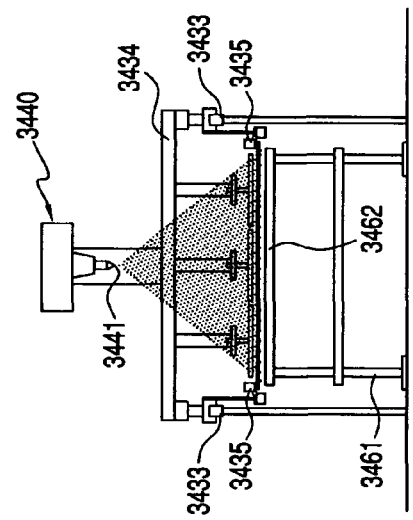
FIG. 36 is a cross-sectional-view along line 36-36 in FIG. 35 of an automatic shrapnel and projectile-resistant panel manufacturing system, in accordance with another embodiment of the present invention.

FIG. 36 is a cross-sectional-view along line 36-36 in FIG. 34 of the automatic shrapnel and projectile-resistant panel manufacturing system, in accordance with an embodiment of the present invention. In FIG. 36, spray gun 3440 is shown in operation by the substantially triangular spray pattern shown from a spray head 3441 on spray gun 3440.

Figure 37:
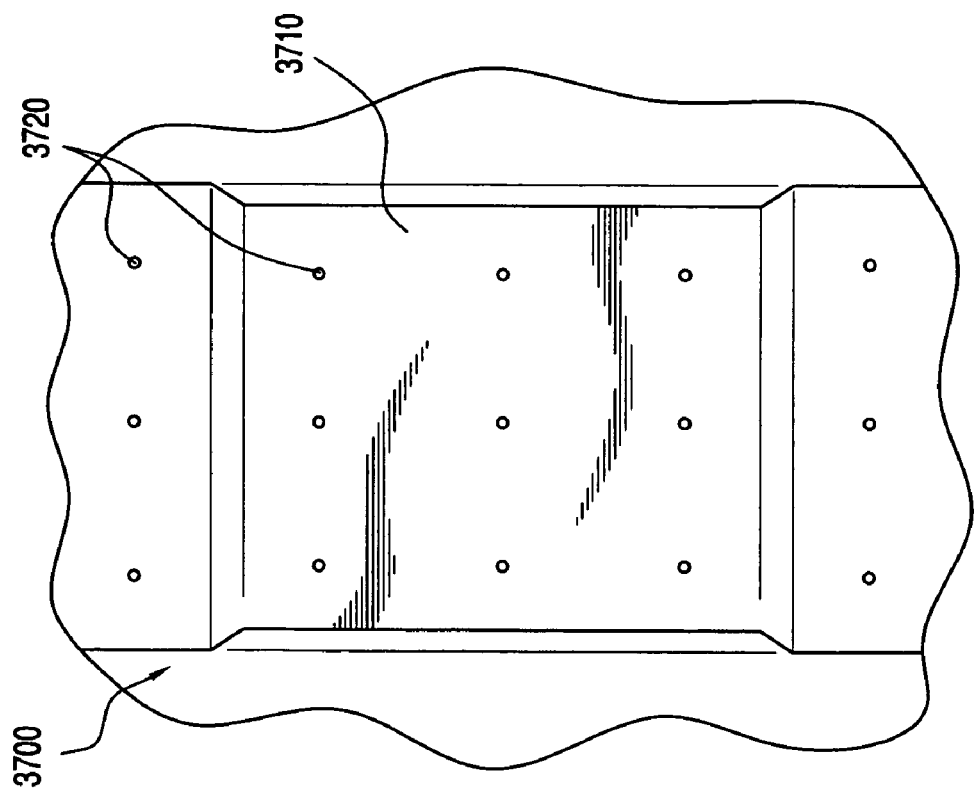
FIG. 37 is a top-view of a section of a vehicle with pre-positioned anchor posts for anchoring a shrapnel and projectile-resistant panel to the vehicle, in accordance with an embodiment of the present invention.

FIG. 37 is a top-view of a section of a vehicle with pre-positioned anchor posts for anchoring a shrapnel and projectile-resistant panel to the vehicle, in accordance with an embodiment of the present invention. In FIG. 37, a portion of a vehicle surface 3700 may include, for example, but not limited to, a floor pan 3710 with multiple, substantially evenly spaced pre-positioned posts 3720. Alternatively, portion of a vehicle surface 3700 may also include a wall, a door and/or a roof pan. Other embodiments are contemplated in which pre-positioned posts 3720 may not be evenly spaced, but spaced around floor pan 3710 to conform to a shape of floor pan 3710 to minimize loose and/or poorly fitting portions between floor pan 3710 and a shrapnel and projectile-resistant panel installed thereon. Pre-positioned posts may be solid and smooth and/or threaded as well as partially hollow with internal and/or external threads.

Alternatively, vehicle surface 3700, in FIG. 37, may not actually be in a vehicle, but instead may be a separate mold having similar properties as other molds described herein. As a result, vehicle surface 3700 may be designed to be and may be used repeatedly to prepare new pre-formed shrapnel and projectile-resistant panels that may be installed in vehicles having a similar configuration. In general, if vehicle surface 3700 is a mold, pre-positioned posts 3720 will be solid and unthreaded to permit the easy removal of a molded panel.

Figure 38:
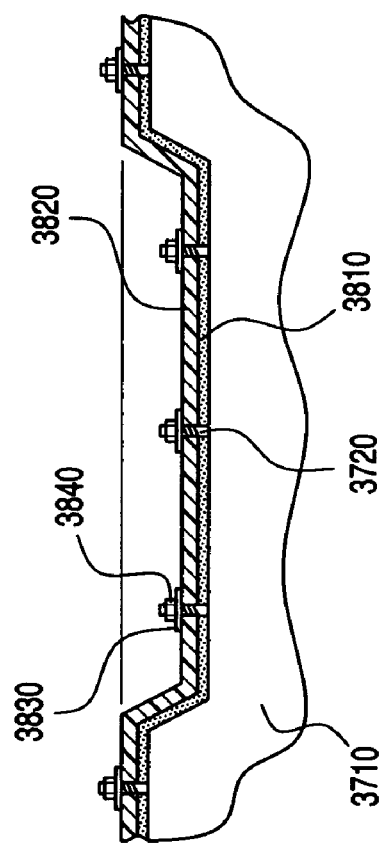
FIG. 38 is a side-view of the section of the vehicle floor, wall, door and/or roof pan in FIG. 37, in accordance with an embodiment of the present invention.

FIG. 38 is a side-view of the section of the vehicle floor, wall, door and/or roof pan in FIG. 37, in accordance with an embodiment of the present invention. In FIG. 38, a release agent layer 3810 may be applied directly onto floor pan 3710 and multiple, substantially evenly spaced pre-positioned posts 3720 and an elastomer layer 3820 may be applied directly onto release agent layer 3810 and multiple, substantially evenly spaced pre-positioned posts 3720. Both release agent layer 3810 and elastomer layer 3820 may be applied by spraying, rolling, brushing, trowelling, pouring, etc., and any agent layer 3810 and elastomer layer 3820 that may be covering multiple, substantially evenly spaced pre-positioned posts 3720 may be removed using a sharp cutting instrument, for example, a utility knife, circular cutter, etc. to uncover each of the multiple, substantially evenly spaced pre-positioned posts 3720. A washer and/or other fastening mechanism 3830, for example, but not limited to, at least those described above in FIGS. 9, 10, 11 and 12, and may be formed to substantially conform to the shape of floor pan 3710. A locking mechanism 3840, for example, but not limited to, a nut, a lock nut, etc., may be affixed to each of the multiple, substantially evenly spaced pre-positioned posts 3720 and each may be tightened down onto their respective fastening mechanism 3830 to securely hold elastomer layer 3820 to floor pan 3710.

In other embodiments of the present invention, elastomer layer 3820, in FIG. 38, may also include one or more fabric layers embedded in elastomer layer 3820 and elastomer layer 3820, both with and without fabric layers, may be applied directly to floor pan 3710.

FIG. 39 is an exposed side-view of a pre-manufactured wall system with an embedded shrapnel and projectile-resistant panel therein, in accordance with an embodiment of the present invention. In FIG. 39, a pre-manufactured wall system 3900 may be made to a variety of heights (e.g., but not limited to, 6', 8', 9', etc.), widths (e.g., but not limited to, 18", 2', 4', 6', 8', etc.), and thicknesses (e.g., but not limited to, 4", 6", 8", etc.) and may include two outside vertical support members 3910 attached to opposite ends of a top plate 3920 and opposite ends of a bottom plate. Although FIG. 39 only shows single top and bottom plates and a solid wall, alternative embodiments are contemplated in which two or more top and/or bottom plates may be used, and openings for windows and doors, may be framed and may include multiple abutting outside and/or inside vertical support members as well as header supports. Pre-manufactured wall system 3900 may also include multiple inside vertical support members 3940 that, in general, are substantially equidistantly spaced between outside vertical support members 3910 and opposite ends of each of the multiple inside vertical support members 3940 is attached to top plate 3920 and bottom plate 3930.

In FIG. 39, pre-manufactured wall system 3900 may also include a blast-resistant panel 3950 that may be attached to a front side of, a back side of and/or in the middle of pre-manufactured wall system 3900. Pre-manufactured wall system 3900 may also include multiple vertical frame members 3960 that may be attached to an inner side 3911 of each one of multiple vertical frame members 3960. Pre-manufactured wall system 3900 may also include multiple horizontal bottom frame members 3970 that may be attached to an inner side 3911 of bottom plate 3930 between outside vertical support members 3910 and the multiple inside vertical support members 3940, and may also include multiple horizontal top frame members 3980 that may be attached to an inner side 3921 of top plate 3920 between outside vertical support members 3910 and opposite ends of each of the multiple inside vertical support members 3940. Blast-resistant panel 3950 may be attached to each vertical support member 3910, 3940 and each horizontal support member 3970, 3980 and may be further attached to each individual frame member 3960, 3970, 3980.

FIG. 40 is a partial cross sectional-view of the pre-manufactured wall system of FIG. 40 with an embedded shrapnel and projectile-resistant panel therein along line 40-40, in accordance with an embodiment of the present invention. In FIG. 40, pre-manufactured wall system 3900 may include vertical fastening means 4010 inserted vertically through each of multiple horizontal top frame members 3980 and into top plate 3920 to attach the multiple horizontal top frame members 3980 thereto. Similarly, horizontal fastening means 4020 may be inserted horizontally through each of multiple horizontal top frame members 3980 on one side of pre-manufactured wall system 3900, through shrapnel and projectile resistant panel 3950, and into another multiple horizontal top frame members 3980 on the other side of shrapnel and projectile resistant panel 3950. Horizontal fastening means 4020 may be inserted into multiple horizontal top frame members 3980 from both sides of pre-manufactured wall system 3900. Likewise, vertical fastening means 4010 may also be inserted either through horizontal frame member 3980 and into top plate 3920 or through top plate 3920 and into horizontal frame member 3980. Both fastening means 4010, 4020 may include, but are not limited to, screws, nails, lag bolts, nuts/bolts/washer(s), etc., and may also be used with and/or without an adhesive between the frames and plates/vertical support members. Although now shown for ease of illustration, horizontal and vertical fastening means 4020, 4010 may be used at the bottom plate 3930.

As seen in FIG. 40, blast and projectile resistant panel 3950 may be disposed, in general, in the center of pre-manufactured wall system 3900. As a result, multiple inside vertical support members 3940 may be split longitudinally into two substantially equal halves between may be sandwiched blast and projectile resistant panel 3950. Although not shown, in some embodiments, it may be that horizontal fastening means 4020 may also be used to fasten the two halves and blast and projectile resistant panel 3950 together, both with and without adhesive between blast and projectile resistant panel 3950 and the horizontal fastening means 3950.

FIG. 41 is a side-view of the pre-manufactured wall system of FIG. 40 with an embedded shrapnel and projectile-resistant panel therein, in accordance with another embodiment of the present invention. In FIG. 41, blast and projectile resistant panel 3950 is shown to be inserted through an opening through and running along the longitudinal axis of one of the multiple inside vertical support members 3940. Blast and projectile resistant panel 3950 may be sandwiched around a periphery thereof by and attached to frames 3960, 3970, 3980 using the fastening and adhesive means described herein.

FIG. 42 is a close-up side-view of a top portion of pre-manufactured wall system of FIG. 41 with an embedded shrapnel and projectile-resistant panel therein, in accordance with an embodiment of the present invention. In FIG. 42, one of the inside vertical support members 3940 may be seen with a slot/opening 4210 along a longitudinal axis of one of inside vertical support members 3940 through which is disposed blast and projectile resistant panel 3950. Blast and projectile resistant panel 3950 may be a single piece to extend the length of pre-manufactured wall system 3900 and be notched at predetermined distances at its top and bottom to permit it to pass through slot/opening 4210 in each of inside vertical support members 3940 in pre-manufactured wall system 3900. Horizontal fastening means 4020 may be inserted through horizontal frame 3980 on one side of pre-manufactured wall system 3900, through blast and projectile resistant panel 3950 and into horizontal frame 3980 on the other side of blast and projectile resistant panel 3950.

Although not shown, horizontal fastening means 4020 may also be inserted on one side of and through each of inside vertical support members 3940 perpendicular to and along slot/opening 4210, through blast and projectile resistant panel 3950 and into the other side of inside vertical support members 3940. An adhesive may also be used between frame and blast and projectile resistant panel 3950 and in slot/opening 4210 between inside vertical support members 3904 and blast and projectile resistant panel 3950 inserted therein.

In FIG. 42, blast and projectile resistant panel 3950 may also be provided as multiple separate pieces and fastened together in, for example, but not limited to, slot/opening 4210. This may be accomplished by overlapping edges of adjacent pieces of blast and projectile resistant panel 3950 and inserting multiple horizontal fastening means 4020 from one side of inside vertical support members 3940 through the overlapped blast and projectile resistant panel 3950 in slot/opening 4210 and into the other side of inside vertical support members 3940. This may be done both with and/or without adhesive in slot/opening 4210.

It can thus be seen that the present invention provides an economical means of greatly enhancing the safety of workers and/or equipment or other objects located inside a building or other structure which is subjected to an explosive blast or other form of large impact, which would otherwise send shrapnel of pieces of the wall projecting through the interior of the structure. The system of the present invention can readily be retrofitted into existing buildings and structures, especially when the pre-sprayed panel version is employed, or can be installed in any new building or structure being constructed. The finished interior wall may have an appearance substantially identical to an interior wall not outfitted with the system of the present invention, and thereby no compromise is made with regard to workplace aesthetics.

While principally disclosed as being useful in shielding the interior of a wall and containing shrapnel therefrom in the event of a blast or other impact, the system and method of the present invention, particularly the system in panel form, is believed to provide high levels of resistance to penetration therethrough in more focused or localized impact situations. As such, the panels or the system are expected to be suitable for use as armor "plate" in applications that require energy absorption and resistance to penetration against, for example, generally smaller projectiles fired by rifles and other firearms and guns, including use in defeating or defending against projectiles that are designed to be "armor-piercing" in nature. This property is regarded herein as being encompassed by the terms, "blast resistant," and as used for "shrapnel containment," as those terms are employed herein.

Figure 43:
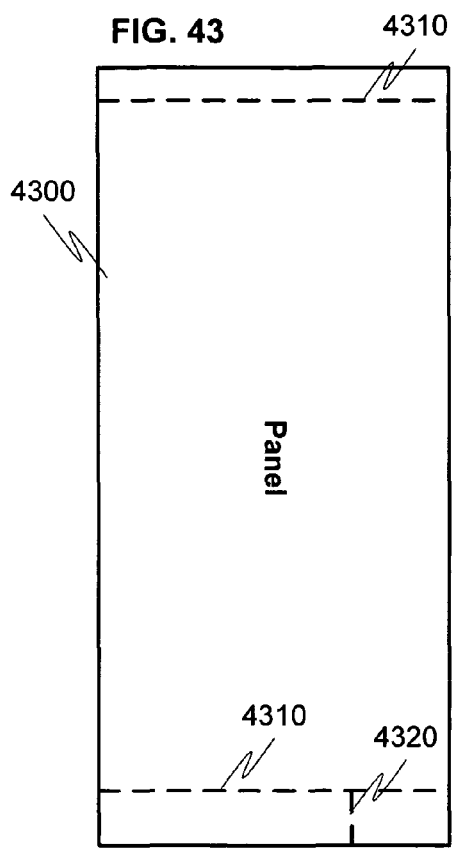
FIG. 43 is a view of a blast/shrapnel containment panel in accordance with another embodiment of the present invention.

FIG. 43 is a front view of a blast/shrapnel containment panel in accordance with an exemplary embodiment of the present invention. In FIG. 43, a panel 4300 is shown with a top dashed line 4310 and a bottom dashed line 4320 to indicate an approximate location for bending of the panel to form top and bottom flaps. Panels may be manufactured in any size, for example, 4'×8', 4.5'×10', etc. In general, top and bottom dashed lines 4310, 4320 may be located approximately 3 to 4 inches from the top and bottom edges of panel 4300. The bending may be performed by heating panel 4300 substantially along top and bottom dashed lines 4310, 4320 until panel 4300 becomes pliable in the heated regions and then folding each end of panel 4300 over to form the flap. For example, the ends of panel 4300 may be folded over a hard surface to help form the flaps. The process may be performed in steps with, for example, the heating of the panel being done using a standard heat gun. In addition, the panel may be heated using a bar heater, which may be as long as, shorter than, or longer than the panel width. The panel 4300 may also have flaps formed on one or more of the sides. The flaps may also be cut, or include perforations, as illustrated by dashed line 4320. The perforations allow, for example, the panel to be installed around objects in a structure. A portion of the panel 4300 could also be heated and placed into or around a mold thereby shaping the panel. The mold need not however be a mold in the traditional sense, but could also include any object over which or into which the panel is placed, heated and deformed thereto. For example, the panel could be bent around structural features of a building on-site with the appropriate heating equipment.

Figure 44:
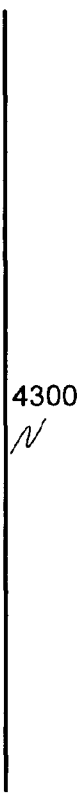
FIG. 44 is a side-view of the blast/shrapnel containment panel of FIG. 43.

FIG. 44 is a side view of the blast/shrapnel containment panel of FIG. 43, in accordance with an exemplary embodiment of the present invention.

Figure 45:
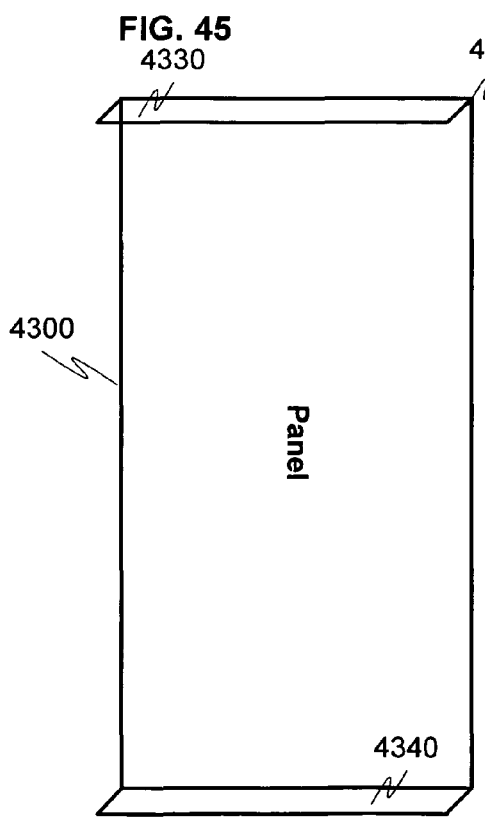
FIG. 45 is a view of the blast/shrapnel containment panel of FIG. 43 in accordance with the present invention.

FIG. 45 is a front perspective view of the blast/shrapnel containment panel of FIG. 43 showing the panel after being bent to produce flaps 4330, 4340 on the top and bottom sides, in accordance with an embodiment of the present invention. While panel 4300 is shown with flaps being approximately perpendicular to the panel, it is to be appreciated that the flaps can be bent to any angle and in different directions. Moreover, as discussed above, a flap may be cut thereby allowing a single flap to be bent in different directions. The panels may be installed using mechanical fasteners both with and without fenders and/or washers into the ceiling and floor through the flaps. In addition, similar or different fasteners may be used with channels, fenders, and/or washers to fasten the panels to a wall surface. In general, installing a fastener involves optionally pre-drilling a hole through the panel and into the wall/ceiling/floor, optionally coating the fastener with an epoxy and screwing the fastener with and/or without a fender/washer/etc., through the panel and into the hole until the fastener has expanded or gripped the inner walls of the hole. For example, the fasteners used in the face of the wall may include a Tap-con®, which is a concrete screw design that allows the screw to anchor into concrete, brick and block. Tapcon® concrete screws tap threads into a predrilled hole in concrete, brick or block.

Figure 46:
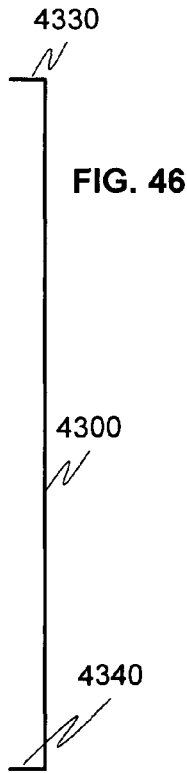
FIG. 46 is a side-view of the blast/shrapnel containment panel of FIG. 45.

FIG. 46 is a side view of the blast/shrapnel containment panel of FIG. 45 showing the top and bottom flaps 4330, 4340, in accordance with an embodiment of the present invention. The overall method to create the panels illustrated in FIGS. 43 to 46 may include: precutting a panel to fit the wall, heating and bending the approximately 90 degree flap at the bottom of the panel to fit the bottom of the wall/floor junction; heating the top of the panel; positioning the panel against the wall and ceiling and fastening the bottom flap to the floor; bending the top of the panel along the contour of the ceiling; and fastening the top flap to the ceiling.

Figure 47:
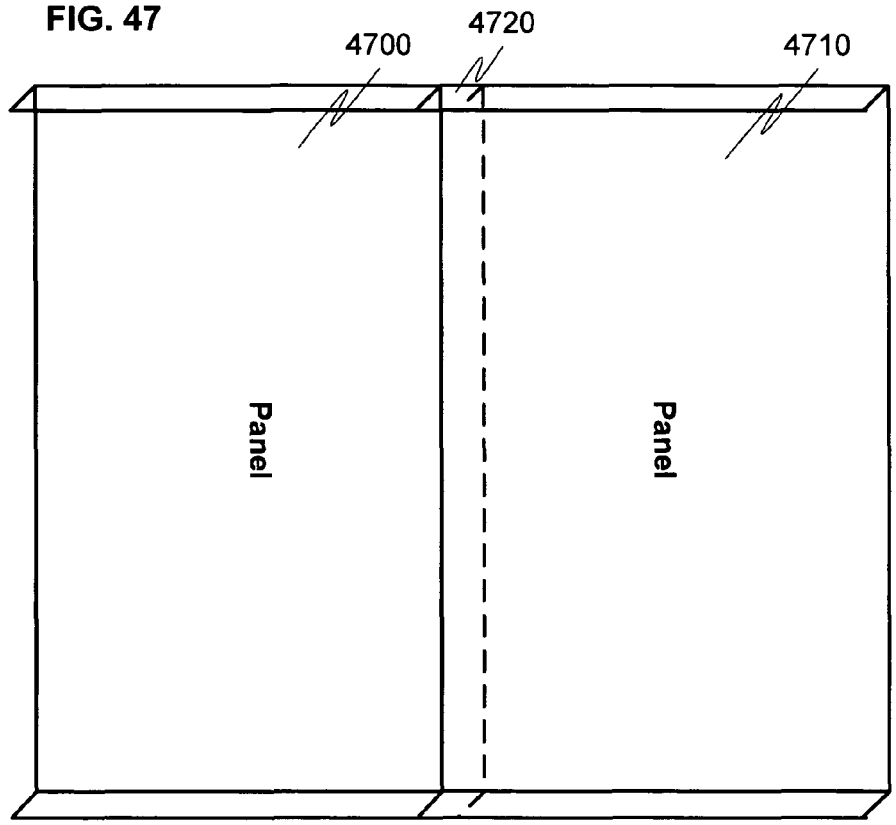
FIG. 47 is a view of a blast/shrapnel containment panel system in accordance with another embodiment of the present invention.

FIG. 47 is a front perspective view of two overlapped blast/shrapnel containment panels of FIG. 43 showing an installation configuration of the panels, in accordance with an embodiment of the present invention. In FIG. 47, in general 2 or more panels 4700 and 4710 may be overlapped at 4720 approximately 4 to 8 inches and may or may not be fastened to a wall through the overlapped section using mechanical fasteners, channels with mechanical fasteners, adhesives, tape, and/or any combination thereof.

Figure 48:
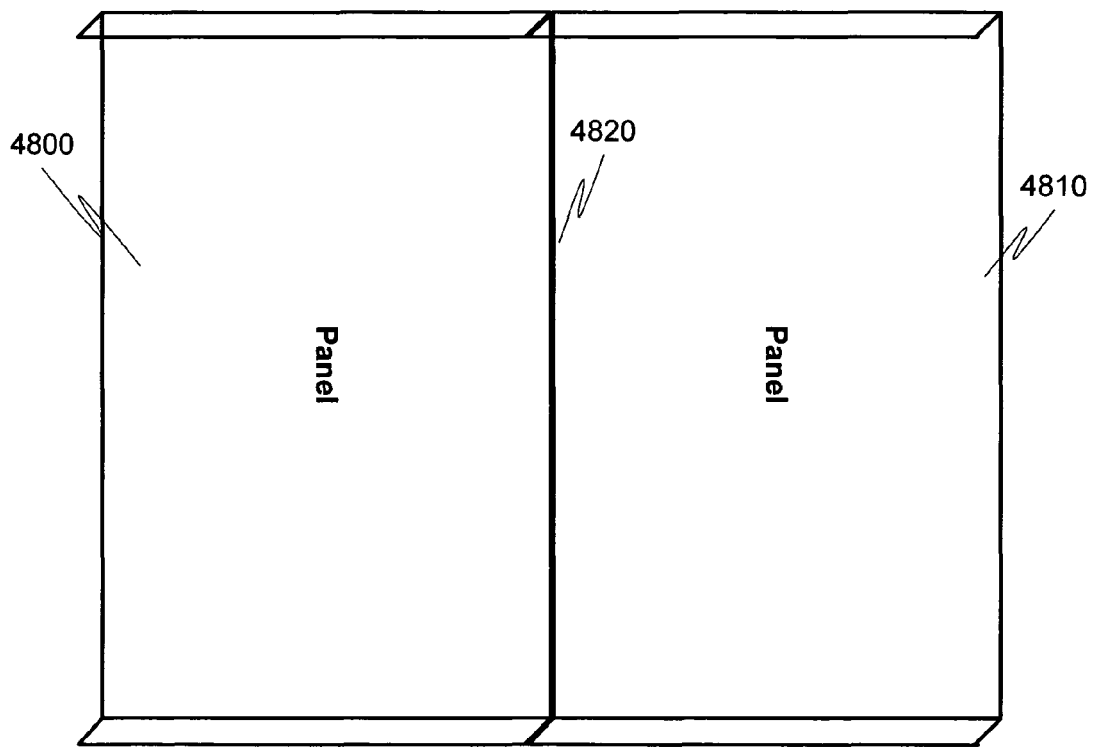
FIG. 48 is a view of a blast/shrapnel containment panel system in accordance with another embodiment of the present invention.

FIG. 48 is a front perspective view of two abutted blast/shrapnel containment panels of FIG. 43 showing an installation configuration of the panels, in accordance with another embodiment of the present invention. In FIG. 48, the panels 4800 and 4810 are abutted side-to-side at joint 4820 and may or may not be fastened to a wall using mechanical fasteners, channels with mechanical fasteners, adhesives and/or any combination thereof.

Figure 49:
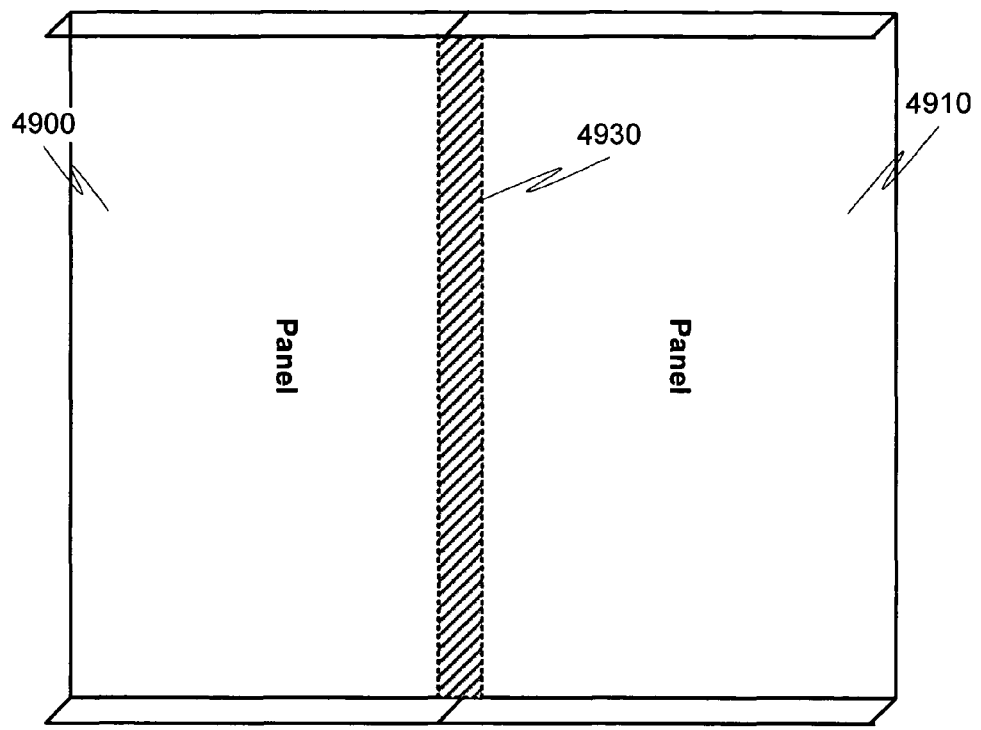
FIG. 49 is a view of a blast/shrapnel containment panel system in accordance with another embodiment of the present invention.

FIG. 49 is a front perspective view of the two overlapped blast/shrapnel containment panels 4900, 4910 similar to FIG. 47 with a tape 4930, such as an elastic type tape, component covering substantially all of the overlapped seam on the side of the panels with flaps, in accordance with an embodiment of the present invention. In FIG. 49, the tape may be applied over an overlapped seam, generally on the side that will be to the interior of the structure, along substantially the entire length of the seam, which may or may not include the flaps. The tape could also be applied to the other side or to both sides of the seam. For example, the tape could be the Metal-Gard "E" tape system manufactured by Best Roofing Systems, Inc. of Oklahoma City, Okla.

Figure 50:
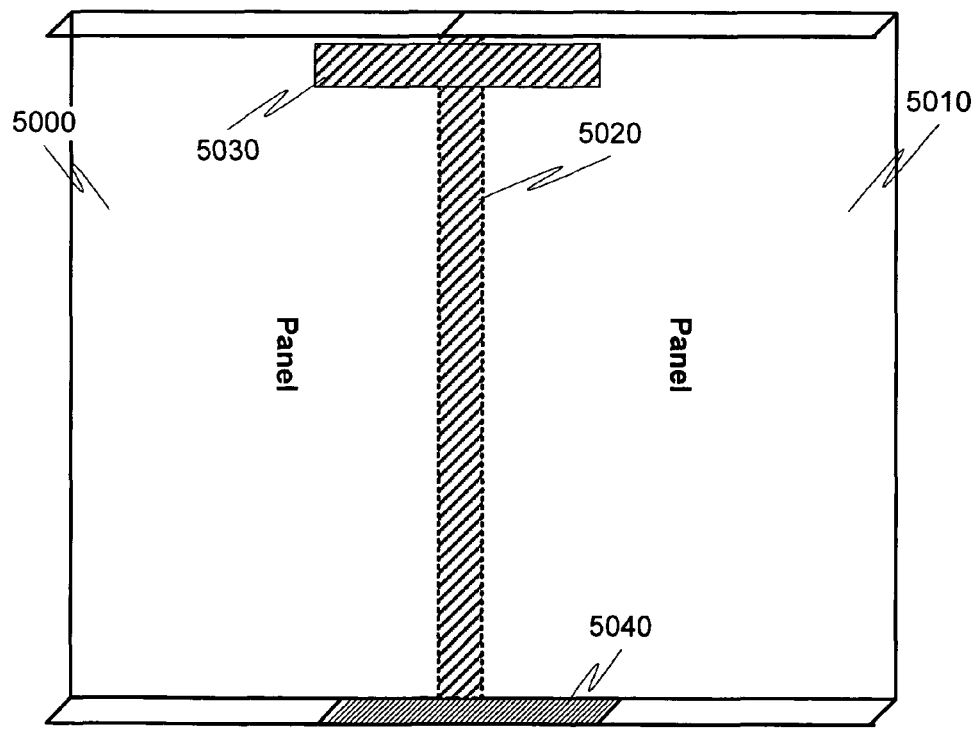
FIG. 50 is a view of a blast/shrapnel containment panel system in accordance with another embodiment of the present invention.

FIG. 50 is a front perspective view of the two overlapped or abutted blast/shrapnel containment panels of FIG. 47/48 with an elastic tape 5020 component covering substantially all of the overlapped seam on the side of the panels with flaps, in accordance with an embodiment of the present invention. Tape could also be placed in any orientation, such as tape strip 5030 and can also be placed along a flap as illustrated by tape 5040.

FIG. 51 is a partial cross-sectional side-view of an outside concrete wall portion with ceiling 5110 and floor 5120 slabs of a building with a blast/shrapnel containment panel 5140 positioned next to the concrete wall 5130, in accordance with an embodiment of the present invention. Flaps 5150 and 5160 are illustrated as adjacent to slabs 5110 and 5120, respectively.

FIG. 52 is a partial cross-sectional side-view of the outside concrete wall portion with ceiling 5110 and floor 5120 slabs in FIG. 51 showing the addition of wall framing 5150 and an inner cosmetic wall surface 5160 with a blast/shrapnel containment panel 5140 positioned next to the concrete wall 5130, in accordance with an embodiment of the present invention.

FIG. 53 is a partial cross-sectional side-view of the outside concrete wall portion with ceiling 5110 and floor 5120 slabs in FIG. 52 showing the wall framing 5150 and inner cosmetic wall surface 5160 fastened through the blast/shrapnel containment panel into the top and bottom slabs positioned next to the concrete wall 5130, in accordance with an embodiment of the present invention. In FIG. 53, fasteners 5170 may be a Hilti® HSLB M 16/50 with a diameter of approximately 16 mm, which is manufactured by Hilti, Inc. of Tulsa, Okla. and described on page 155 of the 2005 Hilti® Product Technical Guide. In general, these fasteners may be installed by pre-drilling holes through flaps 5150, 5160 and inserting the fasteners through the flaps and into the slabs, with or without an epoxy adhesive on the threads of the fastener. In addition, an approximately ¼" to ½" thick plate (not shown) may be fastened on top of the flaps by the fasteners. Alternatively, ¼" to ½" threaded pieces of rod may be used with bolts and plate/washer/etc. as the fastener. In this case, the rod would be epoxied into the hole, the epoxy would be allowed to set (up to 24 hours), the panel and plate/washer/etc. installed, and the nut fastened down on the exposed end of the threaded rod. The size of the fastener, plate and type of epoxy may vary depending on the threat level.

FIG. 54 is a cross-sectional, side-view of a blast/shrapnel containment panel 5400 manufactured with alternating layers of polymer 5410 and aluminum oxide granules 5420, in accordance with an embodiment of the present invention. In FIG. 54, the aluminum oxide granules 5420 may vary in size from a small grain to a large grain. The thickness of each polymer layer may be from approximately 5 to 10 mils and the overall thickness of the finished panel may be approximately 1". Other panel thicknesses and types/sizes of granules are also possible with more or less alternating layers as appropriate. In general, polymer layers can be alternated with any other type(s) of material to produce a blast/shrapnel containment panel. The granules can also be intermixed with one or more layers of the polymer. Cure time is approximately 7 days at room temperature and 24 hours at approximately 140 degrees.

Figure 55:
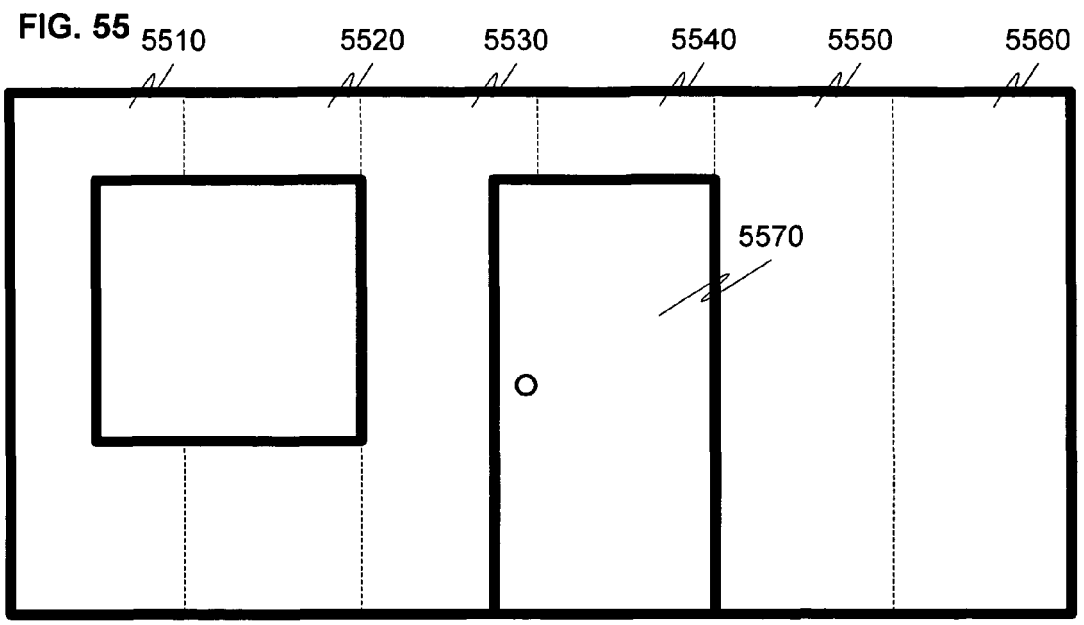
FIG. 55 is an environmental view of a blast/shrapnel containment panel system in accordance with another embodiment of the present invention.

FIG. 55 is a front-view of a wall in a building outfitted with multiple blast/shrapnel containment panels 5510, 5520,

5530, 5540, 5550 and 5560, in accordance with an embodiment of the present invention. In general the panels will be cut to fit around windows, doors and other elements in the wall and caulking and/or fastening systems may be used around the edges of the window(s) and door(s). Panels may be abutted against, placed beneath, and/or secured to the door and window frames. The door 5570 may also include an integrated blast/shrapnel containment panel as discussed in relation to FIG. 24. The blast/shrapnel containment panels can be secured together, for example, through the use of a tape such that the panels act as a single element in the event of a blast.

Figure 56:
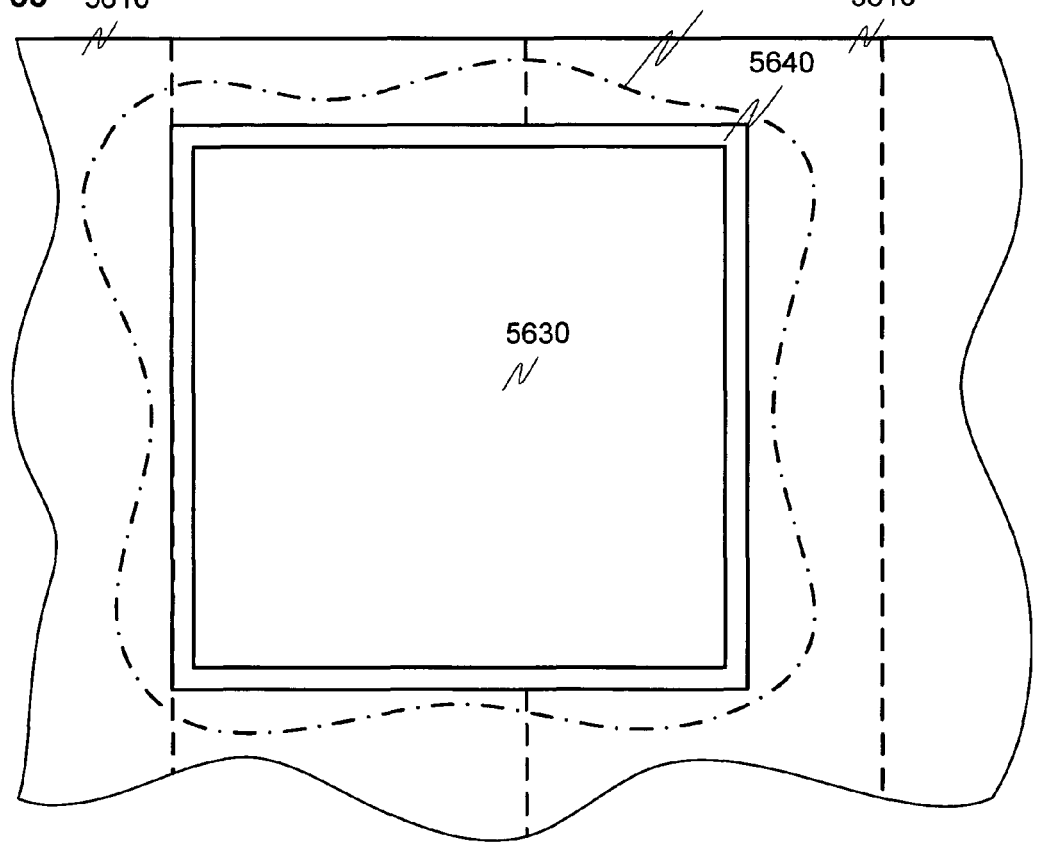
FIG. 56 is an environmental view of a blast/shrapnel containment panel system in accordance with another embodiment of the present invention.

FIG. 56 is a partial front-view of a wall with a window in a building outfitted with multiple blast/shrapnel containment panels 5610 and a polymer glass coating 5620 covering a window 5630 and associated frame 5640 and extending onto the wall, in accordance with an embodiment of the present invention. In FIG. 56 a clear polyurea (aliphatic) layer 5620 (for example, Polypro 6062 clearcoat from Visuron Technologies, Inc. of Bay City, Mich.) may be spray applied to cover the window (e.g., glass, frame and surrounding wall surface). This may be done using an airless spray unit operating at approximately 5000 psi and 120 degrees Fahrenheit to generally a minimum thickness of approximately 30 mils in two coats. Each coat is allowed to dry before the next is applied. Thickness depends on the threat level protection requirements. Surfaces are cleaned and dried before application, for example, using denatured alcohol. Panels may be installed over the coating around the window and fastening elements may be used through the panel and the clear glass coating into the wall. The clear glass may be applied to one or both sides of the window and, generally, if only one side is to be treated, then the inside is the side treated.

FIGS. 57-59 are partial cross-sectional side-views of an outside concrete wall portion 1502 with ceiling and floor slabs showing a method for installing a blast/shrapnel containment panel using an adjustable jack mechanism 5750, in accordance with an embodiment of the present invention.

In FIG. 57 a pre-cut blast/shrapnel containment panel 5710 is secured to a floor slab with fasteners 5730 secured through flap 5720. Next, in FIG. 58, an adjustable jack mechanism 5750 is utilized to position the flap 5740 adjacent to the ceiling slab. Fasteners 5760 are then used to secure the flap 5740 to the ceiling slab as shown in FIG. 59.

FIG. 60 is a partial cross-sectional side-view of an outside concrete wall portion 6010 with ceiling 6020 and floor 6030 slabs showing a blast/shrapnel containment panel 6040 installed over framing 6060 and an inner cosmetic wall 6050 and fastened, with fasteners 6070, to the ceiling 6020 and floor 6030 slabs, in accordance with an embodiment of the present invention. The panels 6040 may be painted, wall papered, etc. and may be skim-coated prior to painting, etc to provide a smoother finish. In this exemplary embodiment, floor covering 6080 is folded back to provide access to the slabs during installation.

FIG. 61 is a partial cross-sectional side-view of the outside concrete wall portion 6010 with ceiling 6020 and floor 6030 slabs showing the blast/shrapnel containment panel 6040 installed over an inner cosmetic wall 6050, fastened, with fasteners 6070, to the ceiling 6020 and floor 6030 slabs. In this embodiment the floor covering 6080 is shown in the finished position with the panel 6040 extending above an installed drop ceiling 6170.

Figure 62:
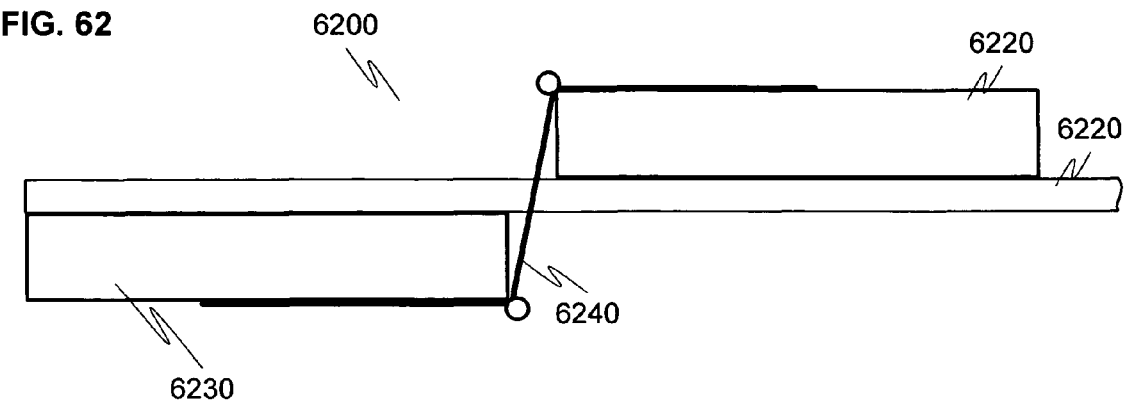
FIG. 62 illustrates an exemplary methodology for shaping a blast/shrapnel containment panel system in accordance with an embodiment of the present invention.

FIG. 62 is a side-view of a hinged forming jig for forming flaps or contours on a blast/shrapnel containment panel in accordance with an exemplary embodiment of the present invention. In an initial position, panel 6210 is placed in between top plate 6220 and bottom plate 6230 of the hinged forming jig 6200.

Figure 63:
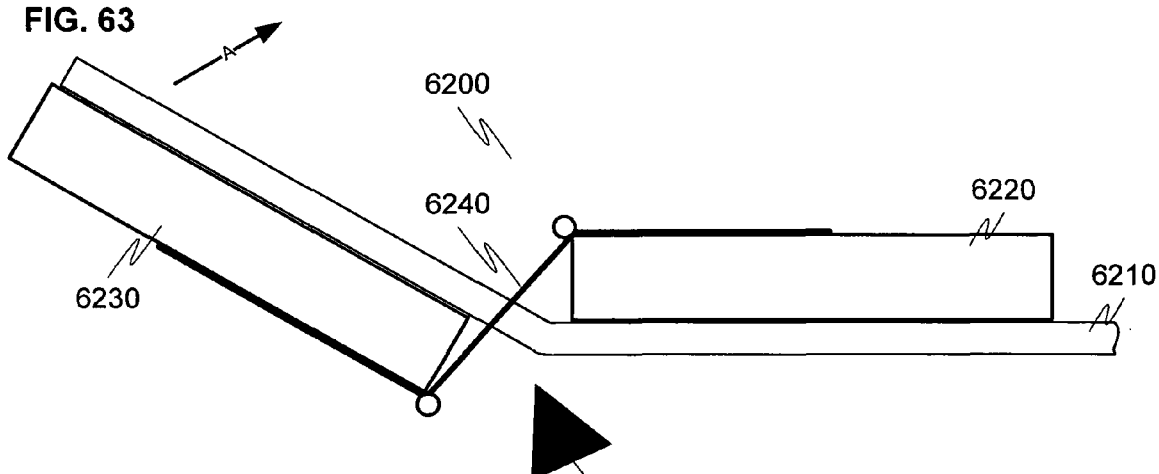
FIG. 63 illustrates an exemplary methodology for shaping a blast/shrapnel containment panel system in accordance with an embodiment of the present invention.

FIG. 63 is a side-view of the hinged forming jig 6200 with the panel 6210 in an intermediate position in accordance with an embodiment of the present invention. More particularly, heat is applied to the area of panel 6210 in the hinged area between top plate 6220 and bottom plate 6230. As the panel 6210 begins to warm and become pliable, the bottom plate 6230 is rotated about hinge 6240 in direction A causing the panel 6210 to start bending.

Figure 64:
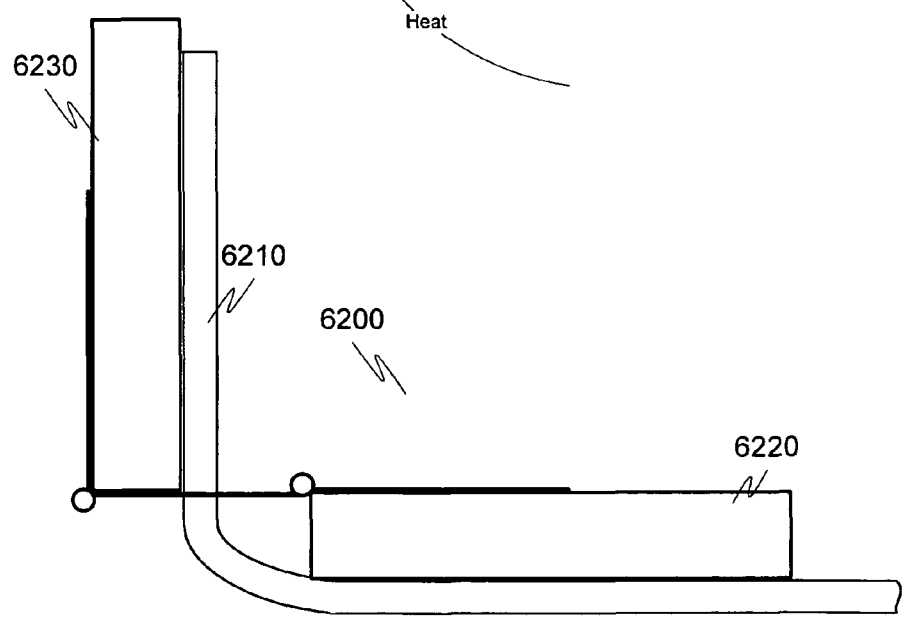
FIG. 64 illustrates an exemplary methodology for shaping a blast/shrapnel containment panel system in accordance with an embodiment of the present invention.

FIG. 64 is a side-view of the hinged forming jig 6200 with the panel 6210 in an exemplary final position in accordance with an embodiment of the present invention. In this exemplary embodiment, panel 6210 has been bent into a 90° bend with top plate 6220 being perpendicular to bottom plate 6230. The hinged forming jig 6200 is left in this position until the panel 6210 has cooled and set. While not illustrated, the hinged forming jig could also include a form over which the panel is bent to impart a shape, such as a specific radius, crease, or the like, into the bent portion of the panel.

FIG. 65 is a side-view of a hinged forming jig 6500 for forming flaps on a blast/shrapnel containment panel 6210 having an integrated heating element 6510 with a panel 6210 in an initial position in accordance with another embodiment of the present invention. The heating element can include an on/off switch 6520 and can be plugged into a power source. The heating element may also include a thermostat to regulate temperature, and thus pliability, of the panel 6210. FIG. 66 is a side-view of the hinged forming jig with an exemplary panel 6210 in an exemplary final position in accordance with an embodiment of the present invention.

FIG. 67 is a front-view of a hinged forming jig for forming flaps on a blast/shrapnel containment panel 6210 in an initial position in accordance with an embodiment of the present invention. The forming jig may also include levers, for manual operation, and/or mechanically actuated devices to assist with bending the panel 6210 to the desired configuration.

Polymers that may be used to manufacture the panels may include Envirolastic 425 from Sherwin Williams and Versaflex 45DC from Dow Chemical Company, which may be mixed with an isocyanate just prior to spraying a panel. For example, the isocyanate may include TONE polycaprolactone from Dow.

The blast/shrapnel containment panels can be used in conjunction with a prefabricated wall section used to build prefabricated buildings. Within the section is embedded a blast/shrapnel containment panel. The section includes exterior aluminum wall surfaces between which have been injection molded a layer of foam insulation, and the panel is embedded within the foam insulation. Around the edges of each wall section may be a gasket to form a seal with adjoining sections when they are assembled. In general the panel may be positioned near the inside of one or the other of the aluminum surfaces.

FIGS. 68-73 illustrate another exemplary embodiment of a blast/shrapnel containment panel. Associated with one or more sides of the panel is a reinforcing layer, such as the fabrics discussed herein, that has a given amount of slack, such as a pocket, to facilitate the elastic expansion of the panel. The panel may or may not have embedded within the polyurea or other elastomeric material another reinforcing layer(s) or fabric.

FIG. 68 illustrates a panel 6800. The panel 6800 includes a polyurea or other elastomeric material portion 6810 and a reinforcing layer 6820. The reinforcing layer 6820 may be affixed to the panel 6810 on one or more of the top, bottom or side(s), and through any manner of attachment including one or more of gluing, fastening, embedding of a portion of the reinforcing layer 6820 into the polyurea or other elastomeric material portion 6810, or the like. The reinforcing layer 6820 may also be associated with the panel 6810 through the use of one or more of fasteners, adhesive, channels, or the like as discussed hereinafter in relation to FIG. 73.

FIGS. 69-72 illustrate alternative cross-sectional views of panel 6800 of FIG. 68 taken along A-A. In FIG. 69, the polyurea or other elastomeric material portion 6810 has embedded therein the reinforcing layer 6820. The reinforcing layer 6820 also includes an expansion portion 6910 that allows for elongation of the polyurea or other elastomeric material portion 6810.

FIG. 70 illustrates another configuration of associating the reinforcing layer 6820 with the polyurea or other elastomeric material portion 6810. The end(s) of the reinforcing layer 6820 are embedded within the polyurea or other elastomeric material portion 6810 in a manner to increase the hold between the reinforcing layer 6820 and the polyurea or other elastomeric material portion 6810.

FIG. 71 shows the reinforcing layer 6820 wrapped around a portion of the polyurea or other elastomeric material portion 6810. In addition to the wrapping, the reinforcing layer 6820 may also be secured to the polyurea or other elastomeric material portion 6810 with an adhesive, mechanical fastener(s) or the like.

In FIG. 72 the reinforcing layer 6820 is associated with the polyurea or other elastomeric material portion 6810 through the use of brackets 7210. The brackets 7210 securely hold the reinforcing layer 6820 and can be associated with the polyurea or other elastomeric material portion 6810 through the use of fasteners, adhesive, or the like.

FIG. 73 illustrates a side view of an installed a blast/shrapnel containment panel having a reinforcing layer 6820 and a polyurea or other elastomeric material portion 6810 installed on a concrete wall 7300 with ceiling 7310 and floor 7320 slabs. Fasteners 7330 fasten through the blast/shrapnel containment panel 6810 and the reinforcing layer 6820 into the top and bottom slabs positioned next to the concrete wall 7300, in accordance with an embodiment of the present invention. The fasteners 7330 may be a Hilti® HSLB M 16/50 with a diameter of approximately 16 mm, which is manufactured by Hilti, Inc. of Tulsa, Okla. and described on page 155 of the 2005 Hilti® Product Technical Guide. In general, these fasteners may be installed by pre-drilling holes through flaps 7340 and the portion of the reinforcing layer 6820 adjacent thereto and inserting the fasteners through the flaps and into the slabs, with or without an epoxy adhesive on the threads of the fastener. In addition, an approximately ¼" to ½" thick plate (not shown) may be fastened on top of the flaps and adjacent reinforcing layer 6820 by the fasteners. The reinforcing layer 6820 may also be wrapped around the plate before fastening. ¼" to ½" threaded pieces of rod may also be used with bolts and plate/washer/etc. as the fastener. In this case, the rod would be epoxied into a hole drilled in the slab, and the epoxy would be allowed to set (up to 24 hours), the panel and plate/washer/etc. installed, and the nut fastened down on the exposed end of the threaded rod. The size of the fastener, plate and type of epoxy may vary depending on the threat level.

While overly simplified for ease of illustration, during a blast, force B is exerted on the concrete wall 7300. The concrete wall 7300 buckles toward the blast/shrapnel containment panel. As the concrete wall buckles, the polyurea or other elastomeric material portion 6810 deforms in direction B and fills the void between the polyurea or other elastomeric material portion 6810 and the reinforcing layer 6820 thereby taking up the slack and transferring forces to the reinforcing layer 6820.

The expansion portion, and thus the length of the reinforcing layer, can be configured to allow a predetermined amount of elongation of the polyurea or other elastomeric material. For example, if 400-800% elongation of the polyurea or other elastomeric material is desired, the length of the polyurea or other elastomeric material portion can be determined at this elongation and the reinforcing layer installed such that it is substantially equal to this elongated length. The reinforcing layer can thus provide additional support when the polyurea or other elastomeric material reaches the elongated length.

The panel 6800, and in particular the side of the panel with the reinforcing fabric, could also be coated with a skim coat of material that would allow a finishing product, such as paint, to be applied to the panel.

Another exemplary embodiment of the invention relates to systems to be installed on or adjacent to a structure including windows, floor or ceiling in a structure or a side, bottom or top of a vehicle to contain shrapnel from a blast and/or a projectile fired from a projectile launcher, and a method for producing such systems.

The system includes producing pre-formed panels, which may be formed in a variety of shapes, cut to size, as necessary, and installed onto or adjacent to a surface of a wall, floor, ceiling and/or door of a structure or a side, bottom or top of a vehicle. The panels may in part be produced by spraying a polyurea or other elastomeric material specifically selected to facilitate the production process and the performance of the finished panels, in producing a material having improved elongation and tensile strength properties. The panels also may be produced by brushing, rolling and/or trowelling the polyurea material or other elastomeric material to the desired thickness to form the finished panels. Alternatively, the polyurea material or other elastomeric material may be applied (i.e., sprayed, brushed, rolled and/or trowelled) and bonded directly to the interior surface of a structural wall or building. In addition, one or more fabric reinforcing layers may be attached and/or adhered to each other and to a first layer of elastomeric material and the layers may be covered by second layer of elastomeric material. In yet other embodiments, panels with multiple layers of fabric, as will be described herein, may also have applications in the field of personal body armor.

Elastomers such as polysiloxane, polyurethane and polyurea/polyurethane hybrids may be employed as an alternative to polyurea in constructing the panels or in bonding a layer or layers of the material directly to the wall.

FIG. 74 is a top view of a diagram of a portion of a process for making a blast/shrapnel/projectile containment panel, in accordance with an embodiment of the present invention. In FIG. 74, a first layer (Layer 1) of a fabric may be seen with a run in an up and down direction and a weave in a left to right direction and a second layer (Layer 2) of the fabric being positioned substantially perpendicular to first layer so that the run in second layer is in a left to right direction and the weave is up and down. Although the alternating pattern of the run and weaves of the layers is only described here as being perpendicular to each other, other patterns may also be used either alone or in combination, for example, diagonally in any increment between 0 and 180 degrees, diagonally off-set, same run and weave direction but off-set up and down and/or side-to-side, etc. In general, the layers can be arranged with any orientation therebetween.

In one exemplary embodiment, a first layer may have applied to one side, for example, a top side, a layer of epoxy and then a bottom side of the second layer may be positioned in an off-set orientation with first layer and then placed against the layer of epoxy to form a multi-layer fabric component, which may be seen in FIG. 75 as Layers 1 & 2. Alternatively, the epoxy may be applied to the under side of second layer and then second layer may be positioned and placed against first layer as described above. Still alternatively, Layers 1 & 2 may both be pretreated with epoxy by spraying, rolling, brushing, soaking, etc. prior to being placed against each other.

In FIG. 74, pressure may and/or may not be applied to help Layer 1 and Layer 2 adhere to and bond with the epoxy and to reduce and/or remove air pockets between the layers of fabric. For example, the pressure may be applied by use of a press, roller(s) and/or other means of applying pressure. Ideally the pressure may be applied evenly across the entire surface of the developing panel and to permit the escape of any air that may be trapped between the fabric layers. The same application of pressure may be used for each subsequently added layer of fabric and a final and/or only pressure may applied to all of the fabric and epoxy layers. The epoxy may be spray applied as well as rolled, brushed and/or poured on to the first layer and each subsequent layer. The epoxy may be of any suitable air and/or heat curable epoxy material generally having good wetting properties, for example, but not limited to, General Polymers 3504 High Solids Primer/Sealer epoxy product from Sherwin-Williams Company.

For ease of illustration of the process, Layers 1 and 2 in FIG. 74 are shown as single, substantially equal sized pieces, for example, 1'×1'. Larger panels having various sizes and configurations are contemplated. For example, the panels may be square, round, oval, ovoid, rectangular, and/or any other shape sheets (e.g., 2'×2', 4'×8', 2'×4', 3.5' diameter, etc.) as well as variously shaped conformal patterns. However, it is contemplated that the process will be implemented using automated equipment to facilitate the mass production of multiple embodiments of the panels, as disclosed and described herein. The equipment described herein may be modified to include application of alternating run/weave pattern layers of fabric with epoxy therebetween, as described herein. For example, rolls, sheets and/or other units of fabric that may be appropriately oriented before or during the process and the epoxy may be automatically applied between the layers by spraying, rolling, etc., in accordance with embodiments of the present invention. In addition, alternative materials may be included in the panels, for example, other fabrics, materials and/or mesh materials, such as, metal mesh, wire mesh, composites, or any combination thereof. Similar to the fabric, the alternative materials may also be feed to the equipment from rolls, sheets and/or other units of the material(s) in the appropriate orientation.

In FIG. 74, as well as the other related figures associated with this embodiment, the fabric may include fabrics produced from aramid and/or polyester yarns or fibers, with an open grid (opening between warp and fill yarns) on the order of 0.25 in. by 0.25 in., or 0.5 in. by 0.25 in. Smaller or larger grid opening sizes are, however, believed to be suitable for use. The tensile strength of the fabric employed in the panels may be on the order of 1200 psi by 1200 psi. Fabric made from Technora and Twaron-brand aramid yarns or fibers produced by Teijin Fibers are believed to be particularly suitable for use in this application, for example, but not limited to, Technora T200 fabric with a 0.5"×0.25" grid opening and/or Twaron T1000 fabric with a 0.25"×0.25" grid opening.

Figure 76:
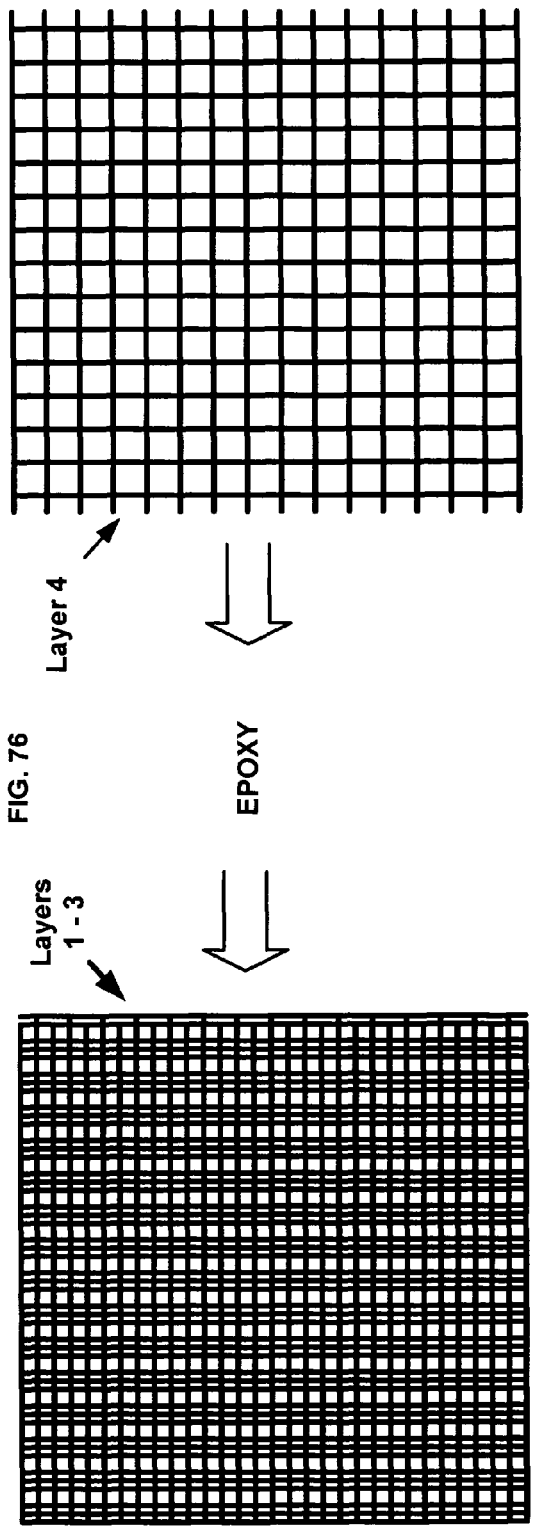
FIG. 76 illustrates in further detail the blast/shrapnel/projectile containment panel of FIG. 75.

In FIG. 75, the result of the process shown and described in FIG. 74 above is shown by Layers 1 & 2, to which another layer of epoxy may be applied to a top side of Layer 2, or as described above relative to FIG. 74, and a third layer (Layer 3), which may be seen to have an up and down run and side to side weave, may be appropriately oriented and placed on the top side of second layer to result in the pattern shown in FIG. 76 as Layers 1-3. The alternating pattern and orientation of the fabric layers is to achieve a finished panel substantially devoid of direct paths through the original grid openings in the fabric layers. In other words, a panel having substantially solid core of off-set and perpendicularly-oriented fabric layers.

Figure 77:
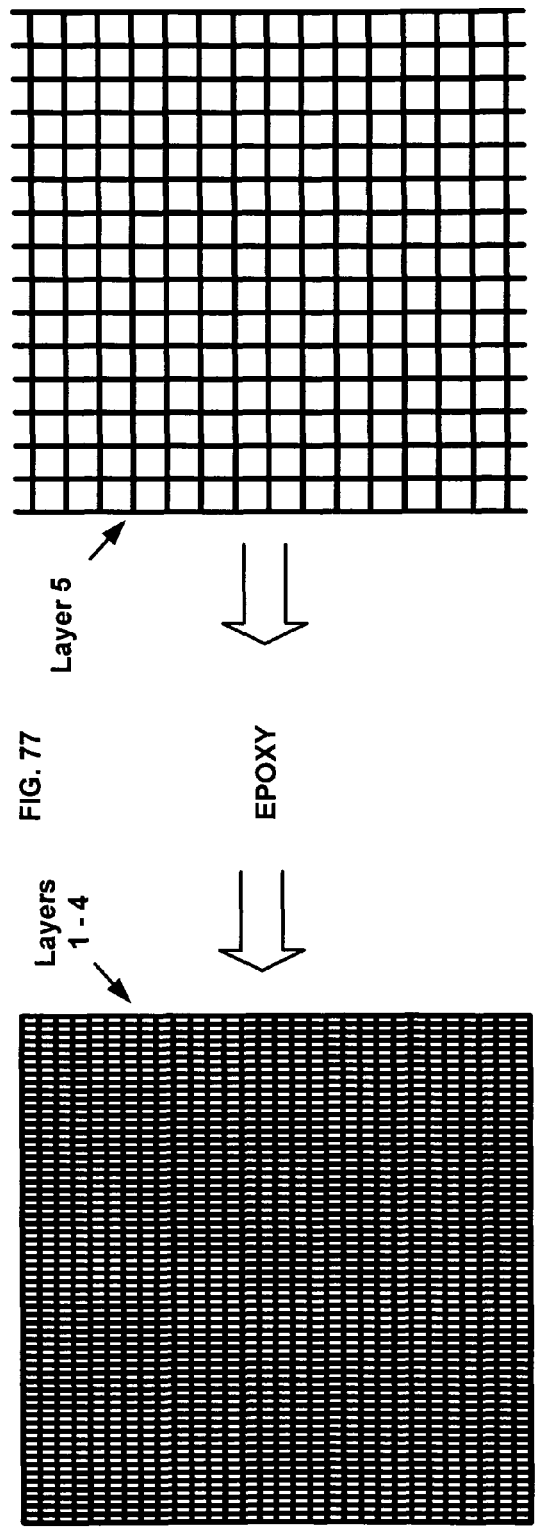
FIG. 77 illustrates in further detail the blast/shrapnel/projectile containment panel of FIG. 76.

In FIG. 76 the result of the process shown and described in FIGS. 74 and 75 above is shown by Layers 1-3, to which another layer of epoxy may be applied to a top side of Layer 3, or as described above relative to FIGS. 74 and 75, and a fourth layer (Layer 4), which may be seen to have a side to side run and an up and down weave, may be appropriately oriented and placed on the top side of the third layer to result in the pattern shown in FIG. 77 as Layers 1-4.

FIGS. 77-79 continue the process described in FIGS. 74-76, which results in multiple layers of fabric with decreasingly smaller and smaller openings. As will be appreciated by the above description, the process of the present invention may be continued until a panel having a substantially solid core of off-set and perpendicularly-oriented fabric layers has been achieved.

To complete the process of manufacturing the panel, each surface (e.g., top, bottom, and sides) of the partial panel described above may be coated with a polymer to produce a finished panel. The polymer may be applied to the top and bottom surfaces to thicknesses ranging from approximately 10 mil (1 mil=one-thousandth of an inch) to 100 mil or more and to the sides to thicknesses ranging from approximately 5 mil to 30 mil. The panel may be trimmed using conventional methods to achieve a more uniform thickness and finished appearance. The panel may be finished in a mold that may have a predetermined thickness available for the polymer on each side. In general, the panels are designed to have thicknesses ranging from approximately 0.50 in to 2.00 or so in., inclusive of the layers of fabric and polymer. In addition, the panels are designed to have weights ranging from approximately 1 lb. per sq. ft. to less than 10 lb. per sq. ft. with various areal densities based on the specific type of threat level, for example, but not limited to, types I, II-A, II, III-A, III, IV, and Special Type specified in the National Institute of Justice (NIJ) Standard 0101.04, Revision A, June 2001, Ballistic Resistance of Personal Body Armor.

The number of layers of fabric in a panel is determined by the level of protection desired, which for certain embodiments of the present invention may be defined in, for example, but not limited to, the NIJ Standard 0101.04, Revision A, June 2001, which defines performance and other requirements equipment should meet to satisfy the needs of criminal justice agencies for high quality service.

The panels may be installed using adhesives, lamination, mechanical fasteners and/or any combination thereof both with and without side channels/fenders and/or washers into the door, wall, surface, ceiling and/or floor depending on the implementation and/or orientation of the panel. In addition, similar or different fasteners may be used with channels, fenders, and/or washers to fasten the panels to a surface for example, nuts and bolts, rivets, etc. In general, in building situations with application to concrete or similar material, installing a fastener may involve pre-drilling a hole through the panel and into the wall/ceiling/floor, optionally coating the fastener with an epoxy and screwing the fastener with and/or without a fender/washer, etc. through the panel and into the hole until the fastener has expanded or gripped the inner walls of the hole. For example, the fasteners used in the face of the concrete wall may include a Tap-con®, which is a concrete screw that grips the inner wall of the hole.

Alternatively, the panels may also be manufactured with overhanging flaps on one, opposing and/or all sides of the panel similar to that previously described. In general, the flaps may not be as thick as the main body of the panel and may have some number of layers of fabric from the main body extending into and through at least a portion of each flap. The number and extent of the layers in the flaps may vary depending on the requirements of each application. For example, for low threat requirements, as few as one, two, and/or three layers of fabric may only be needed, while high/extreme threat requirements may require as many layers of fabric in the flaps as in the main body of the panel. As a result, a variety of manufacturing methods may be used including, for example, manufacturing the panel with flaps as a single two-dimensional sheet and then bending the flaps into the desired configuration at the installation site as the panels are being installed, or by molding the panels with the flaps in their already bent position as a three-dimensional panel.

Other alternative methods of fastening may include pre-positioned fastening means, for example, channels, anchor points, tabs, posts, etc., that the panels may be inserted into, over, under, etc. for fastening in the desired position. Further still, another alternative may include forming the panel directly on, in, and/or around the surface, etc. to be protected. In this alternative, the panel may be adhered to the surface by first applying (using one or more of the methods described herein) the exterior polymer layer directly to the surface and immediately attaching the first fabric layer, either with or without epoxy depending on the curing time of the polymer and when the first fabric layer is applied to the polymer layer.

An alternative panel, in accordance with an embodiment of the present invention, starting from the top of the layers, is a first group of multiple layers of fabric, followed by a single layer of a wire mesh fabric, a second group of multiple layers of fabric, a second layer of the wire mesh fabric, a third group of multiple layers of fabric, a third layer of the wire mesh fabric, and fourth group of multiple layers of fabric. As described above in relation to FIGS. 74-79, the fabric and wire mesh layers are alternated in an off-set pattern and epoxied together to produce a panel as described and shown above in FIGS. 74-79. The wire mesh layers may be positioned and aligned relative to each other so that the run and weave patterns in the wire mesh layers are off-set and alternated similar to the fabric layers. In general, the wire mesh fabric may have a tight/small weave and be flexible in both directions, for example, but not limited to, wire mesh fabric 452 KP from GKD-USA of Cambridge, Md.

Alternative embodiments of the panels may include various numbers and arrangements of layers of fabric, metal foil, and wire mesh fabric. For example, some of these embodiments may include, but are not limited to, a seven-tier panel with two exterior tiers having five layers of fabric with three interior tiers of a single layer of metal separated by two additional interior tiers of fabric of five layers fabric, and all of which are bonded together with epoxy and covered with polymer; the same panel as just described except the two internal tiers may contain more or less than five layers of fabric; an eleven-tier panel with two exterior tiers having four layers of fabric with five interior tiers of a single layer of metal separated by four additional interior tiers of fabric of four layers fabric, and all of which are bonded together with epoxy and covered with polymer; etc. The number of layers of fabric used on the exterior and interior tiers may be varied as needed, but, in general, the overall pattern should be symmetrical from along a planar center line parallel to and between the front and back surfaces of the panel. As described above relative to FIGS. 74-79, various configurations of alternating and off-set weave patterns may be implemented in various embodiments of panels containing wire mesh fabric.

Example embodiments (all of which include the external polymer coating) may include, but are not limited to, a 26-layer fabric and epoxy panel; a 40-layer fabric and epoxy panel; a 100-layer fabric and epoxy panel; and a 23-layer panel with 5 layers of fabric, followed by 1 wire mesh layer, followed by 5 layers of fabric, followed by 1 wire mesh layer, followed by 5 layers of fabric, followed by 1 wire mesh layer, and followed by 5 layers of fabric; and a 30-layer panel with 5 layers of fabric, followed by 1 wire mesh layer, followed by 5 layers of fabric, followed by 1 wire mesh layer, followed by 5 layers of fabric, followed by 1 wire mesh layer, followed by 5 layers of fabric; followed by 1 wire mesh layer, followed by 5 layers of fabric, followed by 1 wire mesh layer, and followed by 5 layers of fabric.

In applications in which two or more panels may be needed to cover a surface, they may be overlapped approximately 4 to 8 inches and may or may not be connected/adhered to each other and/or fastened to a wall through the overlapped section using mechanical fasteners, channels with mechanical fasteners, adhesives, etc. and/or any combination thereof. Alternatively, two or more panels may be abutted side-to-side and may or may not be fastened to a wall using mechanical fasteners, channels with mechanical fasteners, adhesives and/or any combination thereof. In general to provide the necessary level of protection a length of panel material of equivalent protective strength as the panels being installed may be fastened along the abutment of two panels on either the front or back sides of the panels using any of the fastening methods and means described previously herein and/or an elastic tape component covering substantially all of the overlapped and/or abutted seams. If a tape is used it may be applied over an overlapped seam, generally on the side that will be to the interior of the structure, along substantially the entire length of the seam. For example, the tape could include, but is not limited to, a Metal-Gard "E" tape system manufactured by Best Roofing Systems, Inc. of Oklahoma City, Okla.

Figure 80:
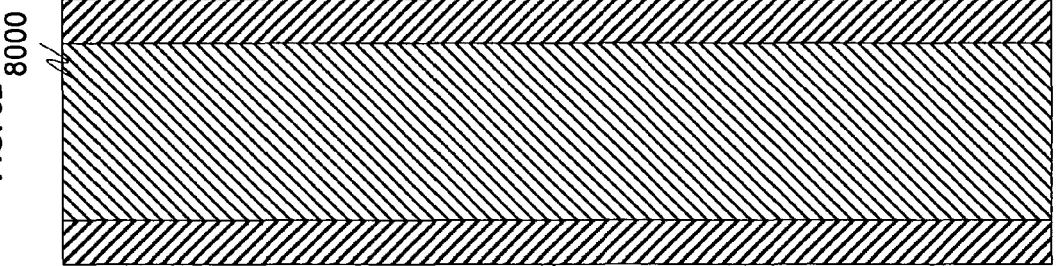
FIG. 80 illustrates a side-view of an exemplary blast/shrapnel/projectile containment panel.
Figure 81:
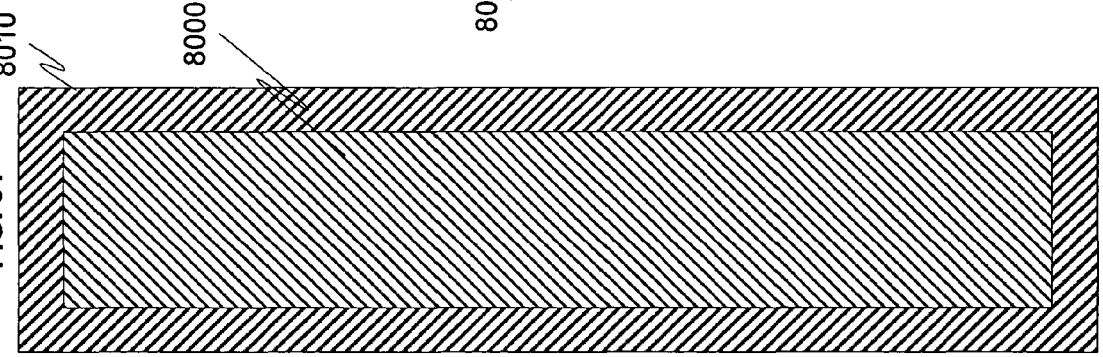
FIG. 81 illustrates a side-view of an exemplary blast/shrapnel/projectile containment panel.
Figure 82:
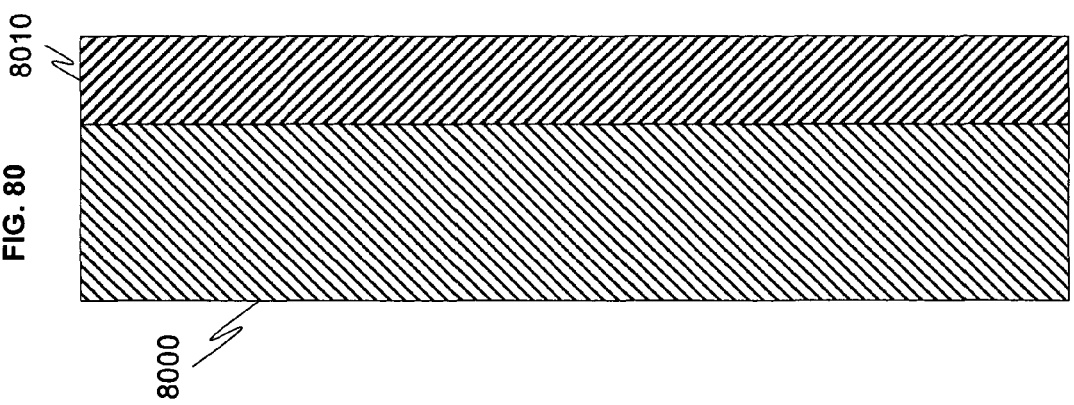
FIG. 82 illustrates a side-view of an exemplary blast/shrapnel/projectile containment panel.

FIGS. 80-82 illustrate exemplary blast/shrapnel/projectile containment panels. The panels in FIGS. 80-82 comprise the multilayer panel 8000, as illustrated in FIGS. 74-79, coated on one or more sides with the polyurea or other elastomeric material. FIG. 80 illustrates the panel 8000 having the polyurea or other elastomeric material 8010 on a first side. FIG. 81 illustrates the panel 8000 having the polyurea or other elastomeric material 8010 surrounding the panel 8000. FIG. 82 illustrates the panel 8000 having the polyurea or other elastomeric material 8010 on opposing sides. In general, the polyurea or other elastomeric material can be applied to any one or more surfaces of the panel 8000 and can be sandwiched between multiple panels 8000.

The foregoing description has been provided for illustrative purposes. Variations and modifications to the embodiments described herein may become apparent to persons of ordinary skill in the art upon studying this disclosure, without departing from the spirit and scope of the present invention. The specific feature(s) illustrated herein in relation to specific embodiments can be used with any other embodiment described herein.

What is claimed is:

1. A blast-resistant panel system comprising:
a layer of a pre-cured, flexible elastomeric material having a body portion and a plurality of flanges made only of the pre-cured, flexible elastomeric material, the layer of the pre-cured, flexible elastomeric material having only a single layer of a substantially uniform predetermined thickness, and each of the plurality of flanges depending away from a same side of the body portion, where the body portion has a length substantially equal to a height of a wall in a structure, the pre-cured, single layer of flexible elastomeric material having substantially entirely exposed front and back sides; and
a plurality of fastener elements for securing the pre-cured, flexible elastomeric material layer against the wall of the structure through the plurality of flanges and into a ceiling and a floor near the wall of the structure and anchoring the plurality of fastener elements in the ceiling and floor near the wall, the front and back sides of the flexible elastomeric material layer remaining substantially entirely exposed until the flexible elastomeric material layer is secured against the wall.

2. The system of claim 1, wherein the elastomeric material is selected from the group consisting of polyurea, polysiloxane, polyurethane, and a polyurea/polyurethane hybrid.

3. The system of claim 2 wherein the elastomeric material has a percent elongation at break in a range of about 100-800%.

4. The system of claim 1, wherein the elastomeric material is a polyurea material.

5. The system of claim 1 wherein the pre-cured, flexible layer of the predetermined thickness of elastomeric material is formed by spraying an uncured layer of the elastomeric material to the predetermined thickness.

6. The system of claim 1 further comprises a fabric reinforcement layer associated with the elastomeric material including the body portion and at least two opposing flanges.

7. The system of claim 1 wherein the plurality of fastener elements comprises at least one of a plurality of lengths of U-channel, a plurality of lengths of Z-channel, a plurality of lengths of continuous fastening strips, a plurality of lengths of non-continuous fastening strips, and a plurality of washers; at least one of a plurality of nails, a plurality of screws, a plurality of concrete nails and a plurality of concrete screws; and a glue or an epoxy.

8. The system of claim 1, wherein the panel includes one or more perforations to facilitate bending of the flanges.

9. The system of claim 1, wherein the flanges are bent using a heat source.

10. The system of claim 1, wherein at least two panels are placed adjacently to one another with either a first panel partially overlapping a portion of a second panel or with the first panel abutting an edge portion of the second panel.

11. The system of claim 10, wherein a tape secures adjacent panels.

12. The system of claim 1, wherein framing and a finishing panel is secured over the panel.

13. The system of claim 1, further comprising a door having associated therewith a blast-resistant panel.

14. The system of claim 1, further comprising a clear polyurea layer covering one or more windows and integrated with one or more blast-resistant panels.

15. The system of claim 1, wherein the body portion has a width of at least eighteen inches.

16. A blast-resistant panel comprising:
a layer of a pre-cured, flexible elastomeric material having a body portion and a plurality of flanges made only of the pre-cured elastomeric material, each of the plurality of flanges depending away from a same side of the body portion, where the body portion has a length substantially equal to a height of a wall in a structure, and the layer of the pre-cured, flexible elastomeric material having only a single layer of a substantially uniform predetermined thickness, the pre-cured, single layer of flexible elastomeric material having substantially entirely exposed front and back sides;
at least one fabric layer, the fabric layer being secured within the layer of pre-cured, flexible elastomeric material and the fabric layer configured to allow deformation and elongation of the layer of pre-cured, flexible elastomeric material; and
a plurality of fastener elements for securing the blast-resistant panel to a surface of a structure, the front and back sides of the flexible elastomeric material layer remaining substantially entirely exposed until the blast-resistant panel is secured to the surface of the structure.

17. The panel of claim 16, wherein the at least one fabric layer has a length equal to a length of the pre-cured, flexible elastomeric material at a percentage elongation.

18. The panel of claim 16, wherein the elastomeric material is selected from the group consisting of polyurea, polysiloxane, polyurethane, and a polyurea/polyurethane hybrid.

19. The panel of claim 16, wherein the elastomeric material is a polyurea material.

20. The panel of claim 18, wherein the elastomeric material has a percent elongation at break in a range of about 100-800%.

21. The panel of claim 16, wherein the pre-cured, flexible layer of the predetermined thickness of elastomeric material is formed by spraying an uncured layer of the elastomeric material to the predetermined thickness.

22. The panel of claim 16, wherein the fabric layer associated with the elastomeric material is within the body portion and at least two opposing flanges of the pre-cured, single layer of flexible elastomeric material.

23. The system of claim 16, wherein the plurality of fastener elements comprises at least one of a plurality of lengths of U-channel, a plurality of lengths of Z-channel, a plurality of lengths of continuous fastening strips, a plurality of lengths of non-continuous fastening strips, and a plurality of washers; at least one of a plurality of nails, a plurality of screws, a plurality of concrete nails and a plurality of concrete screws; and a glue or an epoxy.

24. The panel of claim 16, wherein the panel includes one or more perforations to facilitate bending of the flanges.

25. The panel of claim 16, wherein the flanges are bent using a heat source.

26. The panel of claim 16, further comprising at least two panels placed adjacently to one another with either a first panel partially overlapping a portion of a second panel or with the first panel abutting an edge portion of the second panel.

27. The panel of claim 26, wherein a tape secures adjacent panels.

28. The panel of claim 16, wherein framing and a finishing panel is secured over the panel.

29. The panel of claim 16, further comprising a door having associated therewith a blast-resistant panel.

30. The panel of claim 16, further comprising a clear polyurea layer covering one or more windows and integrated with one or more blast-resistant panels.

31. A blast-resistant panel comprising:
a layer of a pre-cured, flexible elastomeric material having a body portion and a plurality of flanges constructed using only the pre-cured, flexible elastomeric material, each of the plurality of flanges depending away from a same side of the body portion, where the body portion has a length substantially equal to a height of a wall in a structure and a width of at least eighteen inches, and the pre-cured, flexible elastomeric material having only a single layer of a predetermined thickness in the range of about 100 mil to about 250 mil, the pre-cured, single layer of flexible elastomeric material having substantially entirely exposed front and back sides;

at least one fabric layer, the fabric layer being secured within the layer of pre-cured, flexible elastomeric material and the fabric layer configured to allow deformation and elongation of the layer of pre-cured, flexible elastomeric material; and a plurality of fastener elements for securing the blast-resistant panel to a surface of a structure, the front and back sides of the flexible elastomeric material layer remaining substantially entirely exposed until the blast-resistant panel is secured to the surface of the structure.

32. The panel of claim 31, wherein the at least one fabric layer has a length equal to a length of the pre-cured, flexible elastomeric material at a percentage elongation.

33. A blast-resistant panel layer system comprising:

a continuous blast-resistant layer made only of a single layer of a pre-cured, flexible elastomeric material having a substantially uniform predetermined thickness, the blast-resistant layer having substantially entirely exposed front and back sides; and a plurality of fastener elements for securing at least one panel from the blast-resistant layer of the pre-cured, flexible elastomeric material layer against a wall of a structure through a plurality of flanges formed from top and bottom sections of the panel and into a ceiling and a floor near the wall of the structure and anchoring the plurality of fastener elements in the ceiling and floor near the wall, the front and back sides of the blast-resistant layer remaining substantially entirely exposed until the pre-cured flexible elastomeric material layer is secured against the wall.

34. The blast-resistant panel layer system of claim 33, wherein the continuous blast-resistant layer of the pre-cured, flexible elastomeric material has a width of at least eighteen inches.

35. The blast-resistant panel layer system of claim 33, wherein the continuous blast-resistant layer of the pre-cured, flexible elastomeric material includes perforations across a width of the continuous blast-resistant layer.

36. The blast-resistant panel layer system of claim 33 further includes a plastic sheeting applied to one side of the continuous blast-resistant layer of the pre-cured, flexible elastomeric material.

37. The blast-resistant panel layer system of claim 33 wherein the plurality of fastener elements includes an adhesive.

38. The blast-resistant panel layer system of claim 37 wherein the plurality of fastener elements further comprises at least one of a plurality of lengths of U-channel, a plurality of lengths of Z-channel, a plurality of lengths of continuous fastening strips, a plurality of lengths of non-continuous fastening strips, and a plurality of washers; and at least one of a plurality of nails, a plurality of screws, a plurality of concrete nails and a plurality of concrete screws.

39. The blast-resistant panel layer system of claim 33 wherein the plurality of flanges also includes at least one flange formed from a side section of the panel of the blast-resistant layer of the pre-cured, flexible elastomeric material layer.

40. A blast-resistant panel layer comprising:

a continuous blast-resistant layer constructed only of a single layer of a pre-cured, flexible elastomeric material, the blast-resistant layer having substantially entirely exposed front and back sides, the front and back sides of the blast-resistant layer remaining substantially entirely exposed until the blast-resistant layer of the pre-cured flexible elastomeric material layer is secured against a wall in a structure; and at least one fabric layer secured within the continuous blast-resistant layer of pre-cured, flexible elastomeric material such that the blast-resistant panel has a substantially uniform predetermined thickness, and the at least one fabric layer configured to allow deformation and elongation of the layer of pre-cured, flexible elastomeric material.

41. The blast-resistant panel layer of claim 40, wherein the continuous blast-resistant layer of the pre-cured, flexible elastomeric material has a width of at least eighteen inches.

42. The blast-resistant panel layer of claim 40, wherein the continuous blast-resistant layer of the pre-cured, flexible elastomeric material includes perforations across a width of the continuous blast-resistant layer.

43. The blast-resistant panel layer of claim 40 further includes a plastic sheeting applied to one side of the continuous blast-resistant layer of the pre-cured, flexible elastomeric material.

44. A blast-resistant panel layer system comprising:

a continuous blast-resistant layer made only of a single layer of a pre-cured, flexible elastomeric material, the blast-resistant layer having substantially entirely exposed front and back sides;

at least one fabric layer secured within the continuous blast-resistant layer of pre-cured, flexible elastomeric material such that the continuous blast-resistant layer of a pre-cured, flexible elastomeric material and the at least one fabric layer secured within the continuous blast-resistant layer of pre-cured, flexible elastomeric material together have a substantially uniform predetermined thickness, and the at least one fabric layer configured to allow deformation and elongation of the layer of pre-cured, flexible elastomeric material; and a plurality of fastener elements for securing at least one panel from the blast-resistant layer of the pre-cured, flexible elastomeric material layer against a wall of a structure through a plurality of flanges formed from top and bottom sections of the panel and into a ceiling and a floor near the wall of the structure and anchoring the plurality of fastener elements in the ceiling and floor near the wall, the front and back sides of the blast-resistant layer remaining substantially entirely exposed until the blast-resistant layer of the pre-cured flexible elastomeric material layer is secured against the wall.

45. The blast-resistant panel layer system of claim 44, wherein the continuous blast-resistant layer of the pre-cured, flexible elastomeric material has a width of at least eighteen inches.

46. The blast-resistant panel layer system of claim 44, wherein the continuous blast-resistant layer of the pre-cured, flexible elastomeric material includes perforations across a width of the continuous blast-resistant layer.

47. The blast-resistant panel layer system of claim 44 further includes a plastic sheeting applied to one side of the continuous blast-resistant layer of the pre-cured, flexible elastomeric material.

48. The blast-resistant panel layer system of claim 44 wherein the plurality of flanges also includes at least one flange formed from a side section of the panel of the blast-resistant layer of the pre-cured, flexible elastomeric material layer.

49. The blast-resistant panel layer system of claim 44, wherein the elastomeric material is selected from the group consisting of polyurea, polysiloxane, polyurethane, and a polyurea/polyurethane hybrid.

* * * * *